United States Patent
Zagaynov et al.

(10) Patent No.: US 10,503,997 B2
(45) Date of Patent: Dec. 10, 2019

(54) METHOD AND SUBSYSTEM FOR IDENTIFYING DOCUMENT SUBIMAGES WITHIN DIGITAL IMAGES

(71) Applicant: ABBYY Development LLC, Moscow (RU)

(72) Inventors: Ivan Germanovich Zagaynov, Moscow oblast (RU); Vasily Vasilyevich Loginov, Moscow (RU); Stepan Yurievich Lobastov, Kirovskaya oblast (RU)

(73) Assignee: ABBYY Production LLC, Moscow (RU)

( * ) Notice: Subject to any disclaimer, the term of this patent is extended or adjusted under 35 U.S.C. 154(b) by 160 days.

(21) Appl. No.: 15/195,759

(22) Filed: Jun. 28, 2016

(65) Prior Publication Data
US 2017/0372134 A1     Dec. 28, 2017

(30) Foreign Application Priority Data

Jun. 22, 2016 (RU) ................................ 2016124833
Jun. 24, 2016 (RU) ................................ 2016125288

(51) Int. Cl.
*G06K 9/48* (2006.01)
*G06K 9/00* (2006.01)
(Continued)

(52) U.S. Cl.
CPC ....... *G06K 9/4604* (2013.01); *G06K 9/00442* (2013.01); *G06K 9/4642* (2013.01);
(Continued)

(58) Field of Classification Search
CPC ............ G06K 9/00442; G06K 9/4604; G06K 9/4642; G06T 2207/30176; G06T 7/0051
See application file for complete search history.

(56) References Cited

U.S. PATENT DOCUMENTS 5,825,906 A    10/1998  Obata et al.
6,138,045 A    10/2000  Kupinski et al.
(Continued)

FOREIGN PATENT DOCUMENTS

EP    1532585 B1    12/2008

OTHER PUBLICATIONS

Von Gioi, Rafael Grompone et al., "LSD: a Line Segment Detector", Published in Image Processing On Line on Mar. 24, 2012, 21 pages.
(Continued)

*Primary Examiner* — Vincent Rudolph
*Assistant Examiner* — Pinalben Patel
(74) *Attorney, Agent, or Firm* — Lowenstein Sandler LLP

(57) ABSTRACT

The current document is directed to automated methods and systems, controlled by various constraints and parameters, that identify document sub-images within digital images. Certain of the parameters constrain contour identification and document-subimage-hypothesis generation. The currently described methods and systems identify contours within the digital image, partition the identified contours into four contour sets corresponding to four different regions of the original digital image, construct hypotheses based on these contours for the edges or boundaries of a digital sub-image, and evaluate the hypotheses in order to select a most highly scored hypotheses as a representation of the borders of a digital sub-image within the original received digital image.

19 Claims, 46 Drawing Sheets

(51) Int. Cl.
*G06T 3/40* (2006.01)
*G06K 9/46* (2006.01)

(52) U.S. Cl.
CPC ......... *G06K 9/4647* (2013.01); *G06K 9/4652* (2013.01); *G06K 9/481* (2013.01); *G06T 3/4015* (2013.01); *G06K 2009/485* (2013.01); *G06T 2207/30176* (2013.01)

(56) References Cited

U.S. PATENT DOCUMENTS

| | | |
|---|---|---|
| 7,110,602 B2 | 9/2006 | Krause |
| 7,873,216 B2 | 1/2011 | Zandifar et al. |
| 8,107,766 B2 | 1/2012 | Kacher et al. |
| 8,285,077 B2 | 10/2012 | Fero et al. |
| 8,331,686 B2 | 12/2012 | Lee et al. |
| 8,897,600 B1 | 11/2014 | Ma et al. |
| 9,036,912 B2 | 5/2015 | Meyer et al. |
| 9,208,403 B1 | 12/2015 | Aviv |
| 9,390,342 B2 | 7/2016 | Campbell |
| 9,495,735 B2 | 11/2016 | Wilson et al. |
| 9,805,281 B2 | 10/2017 | Wu et al. |
| 2002/0048402 A1 | 4/2002 | Braspenning et al. |
| 2002/0126893 A1 | 9/2002 | Held et al. |
| 2003/0142884 A1 | 7/2003 | Cariffe |
| 2004/0008890 A1 | 1/2004 | Clark et al. |
| 2004/0037460 A1 | 2/2004 | Luo et al. |
| 2004/0037465 A1 | 2/2004 | Krause |
| 2004/0213460 A1 | 10/2004 | Chen |
| 2006/0118633 A1 | 6/2006 | He et al. |
| 2007/0127816 A1 | 6/2007 | Balslev et al. |
| 2009/0046930 A1 | 2/2009 | Lee et al. |
| 2009/0080738 A1 | 3/2009 | Zur et al. |
| 2009/0190833 A1 | 7/2009 | Alvino et al. |
| 2009/0238462 A1 | 9/2009 | Feris et al. |
| 2009/0274349 A1 | 11/2009 | Cascio et al. |
| 2010/0111400 A1 | 5/2010 | Ramirez et al. |
| 2011/0050703 A1 | 3/2011 | Artan et al. |
| 2012/0051606 A1 | 3/2012 | Saikia |
| 2012/0243796 A1* | 9/2012 | Saito ............... G06T 5/006 382/218 |
| 2012/0320427 A1 | 12/2012 | Zheng et al. |
| 2013/0064435 A1 | 3/2013 | Taerum |
| 2013/0148883 A1 | 6/2013 | Lee |
| 2013/0279801 A1 | 10/2013 | Scheuermann et al. |
| 2014/0064596 A1* | 3/2014 | He ............... G06K 9/4604 382/141 |
| 2014/0164927 A1* | 6/2014 | Salaverry ........... H04N 1/2112 715/727 |
| 2014/0198981 A1 | 7/2014 | Wilson et al. |
| 2014/0247470 A1 | 9/2014 | Hunt et al. |
| 2014/0270500 A1 | 9/2014 | Li et al. |
| 2015/0104098 A1* | 4/2015 | Axelsson ........... G06K 9/4604 382/165 |
| 2015/0104106 A1* | 4/2015 | Elinas ............ G06K 9/4638 382/201 |
| 2015/0110392 A1 | 4/2015 | Wang |
| 2016/0014392 A1 | 1/2016 | Liang et al. |
| 2016/0238737 A1 | 8/2016 | Janet et al. |
| 2017/0076169 A1 | 3/2017 | Campbell |
| 2017/0351931 A1 | 12/2017 | Agrawal |
| 2017/0365094 A1* | 12/2017 | Liu ............... G06T 17/05 |
| 2017/0372460 A1 | 12/2017 | Zagaynov et al. |
| 2018/0018774 A1 | 1/2018 | Kacher et al. |

OTHER PUBLICATIONS

Von Gioi, Rafael Grompone et al., "A Contrario Line Segment Detection," 2014.
Singh, et al., "A novel method for straightening curved text-lines in Stylistic documents" Springer, pp. 1-8, 2014.
Zhang et al., "Correcting document image warping based on regression of curved text lines" IEEE, pp. 1-6, 2003.

* cited by examiner

METHOD AND SUBSYSTEM FOR IDENTIFYING DOCUMENT SUBIMAGES WITHIN DIGITAL IMAGES

CROSS REFERENCE TO RELATED APPLICATIONS

The present application claims the benefit of priority to Russian Patent Application No. 2016125288, filed Jun. 24, 2016 and Russian Patent Application No. 2016124833, filed Jun. 22, 2016; the present application is also related to U.S. patent application Ser. No. 15/195,726, filed Jun. 28, 2016; disclosures of priority and related applications are incorporated herein by reference in their entirety for all purposes.

TECHNICAL FIELD

The current document is directed to image processing and, in particular, to a method and system that identifies document sub-images within digital images in preparation for various types of subsequent automated digital-image processing, including optical character recognition.

BACKGROUND

Printed natural-language documents continue to represent a widely used communications medium among individuals, within organizations, and for distribution of information among information consumers. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents. Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years. Computational optical-character-recognition methods and systems and electronic scanners together provide reliable and cost-effective imaging of printed documents and computational processing of the resulting digital images of text-containing documents to generate electronic documents corresponding to the printed documents.

SUMMARY

The current document is directed to automated methods and systems, controlled by various constraints and parameters, that identify document sub-images within digital images. Certain of the parameters constrain contour identification and document-subimage-hypothesis generation. The currently described methods and systems identify contours within the digital image, partition the identified contours into four contour sets corresponding to four different regions of the original digital image, construct hypotheses based on these contours for the edges or boundaries of a digital sub-image, and evaluate the hypotheses in order to select a most highly scored hypotheses as a representation of the borders of a digital sub-image within the original received digital image.

DETAILED DESCRIPTION

The current document is directed to methods and systems that identify contours, including curved contours, in digital images for use in subsequent digital-image processing tasks, including optical character recognition. In a first subsection, below, a short introduction to computer architecture, digital images, and digital-image methods is provided with reference to FIGS. 1-12. In a second subsection, a detailed description of contour-finding methods and systems is provided with reference to FIGS. 13-27G. In a final subsection, one implementation of the currently disclosed methods and systems is illustrated using control-flow diagrams, with reference to FIGS. 28-35E.

Overview

Figure 1:
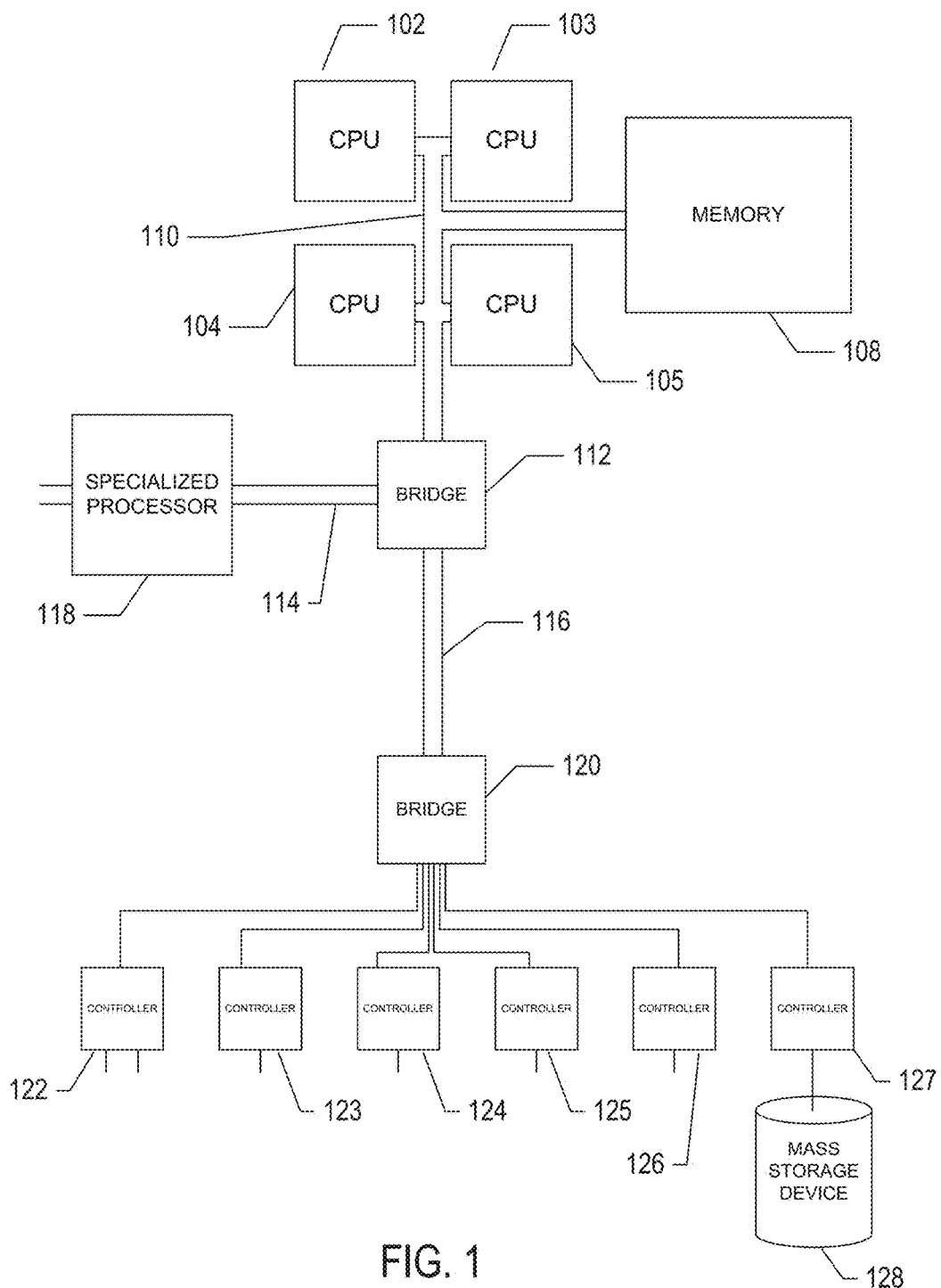
FIG. 1 provides a high-level architectural diagram of a computer system, such as a computer system in which the currently disclosed preliminary-sharpness-analysis method is employed to obtain a suitability metric for subsequent image processing.

FIG. 1 provides a high-level architectural diagram of a computer system, such as a computer system in which the currently disclosed document-subimage-identifying method is employed. Mobile imaging devices, including smart phones and digital cameras, can be similarly diagramed and also include processors, memory, and internal busses. Those familiar with modern technology and science well appreciate that a control program or control routine comprising computer instructions stored in a physical memory within a processor-controlled device constitute the control component for the device and are as physical, tangible, and important as any other component of an electromechanical device, including image-capturing devices. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

In a variety of different types of systems, including image-processing systems, the sharpness value produced by the above-described implementations of the preliminary-sharpness-analysis method can be used to compute an estimated level of accuracy or estimated level of inaccuracy for image processing of the image associated with the computed sharpness value. The sharpness value, along with additional intermediate values computed by the preliminary-sharpness-analysis method, may be input to various different types of classifiers, such as random-forest classifiers, to determine an estimated accuracy or inaccuracy for image processing or may be input to a trained regressor that is trained based on a database of photographed documents of various types, along with actual accuracies or inaccuracies obtained when the imaging processes were applied to them. In certain implementations, input to the classifier or trained regressor includes the sharpness values for each of the contour images, a computed contrast, the number of text blocks, the ratio of text-value pixels to total pixels in the binary image, and other such computed values. Additional information may be submitted to the classifier or regressor with regard to statistics regarding the size of text-symbol features in the text-containing portions of the document and other statistics computed from recognized symbols.

Figure 2B:
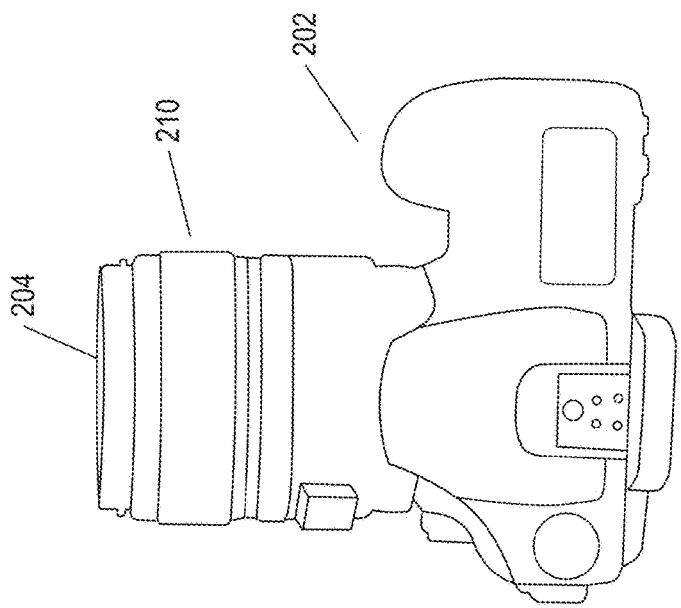
FIG. 2B illustrates two different types of hand-held imaging devices.
Figure 2A:
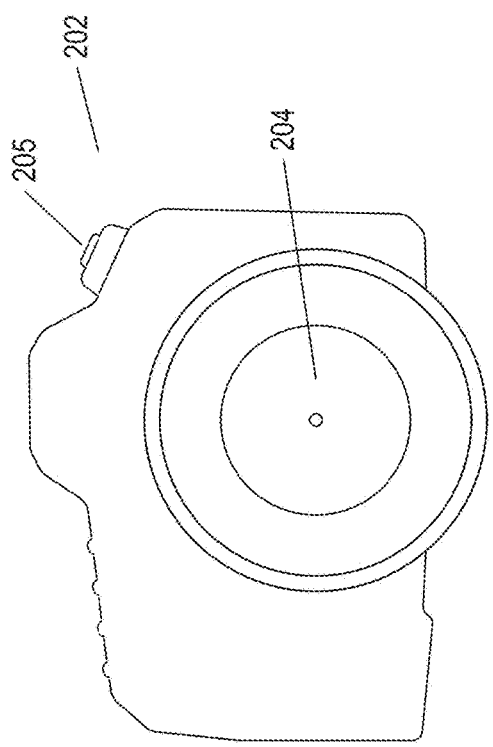
FIG. 2A illustrates two different types of hand-held imaging devices.
Figure 2C:
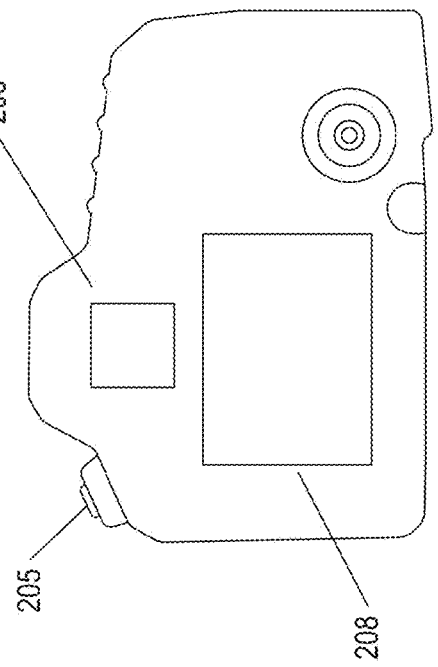
FIG. 2C illustrates two different types of hand-held imaging devices.

FIGS. 2A-D illustrate two different types of hand-held imaging devices. FIGS. 2A-C illustrate a digital camera 202. The digital camera includes an objective lens 204 and a shutter button 205 that, when depressed by a user, results in capture of a digital image corresponding to reflected light entering the lens 204 of the digital camera. On the back side of the digital camera, viewed by a user when the user is holding a camera to capture digital images, the digital camera includes a viewfinder 206 and an LCD viewfinder screen 208. The viewfinder 206 allows a user to directly view the image currently generated by the camera lens 204, while the LCD viewfinder screen 208 provides an electronic display of the image currently produced by the camera lens. Generally, the camera user adjusts the camera focus, using annular focus-adjusting features 210 while looking through the viewfinder 206 or observing the LCD viewfinder screen 208 in order to select a desired image prior to depressing the shutter button 105 to digitally capture the image and store the image in electronic memory within the digital camera.

Figure 2D:
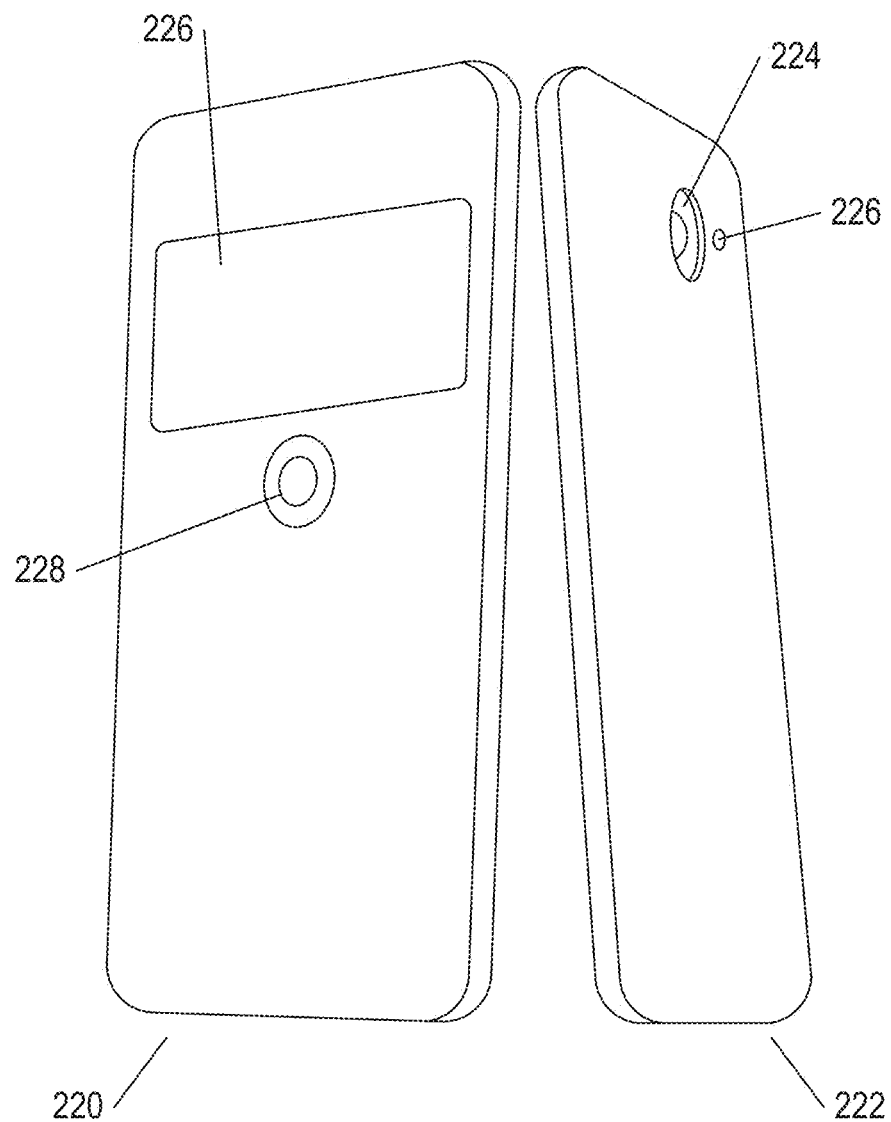
FIG. 2D illustrates two different types of hand-held imaging devices.

FIG. 2D shows a typical smart phone from the front side 220 and from the back side 222. The back side 222 includes a digital-camera lens 224 and digital light meter and/or proximity sensor 226. The front side of the smart phone 220 may, under application control, display the currently received image 226, similar to the LCD viewfinder display 208 of the digital camera, as well as a touch-sensitive shutter-button 228, input of a touch to which captures a digital image within the smart-phone memory.

Figure 3:
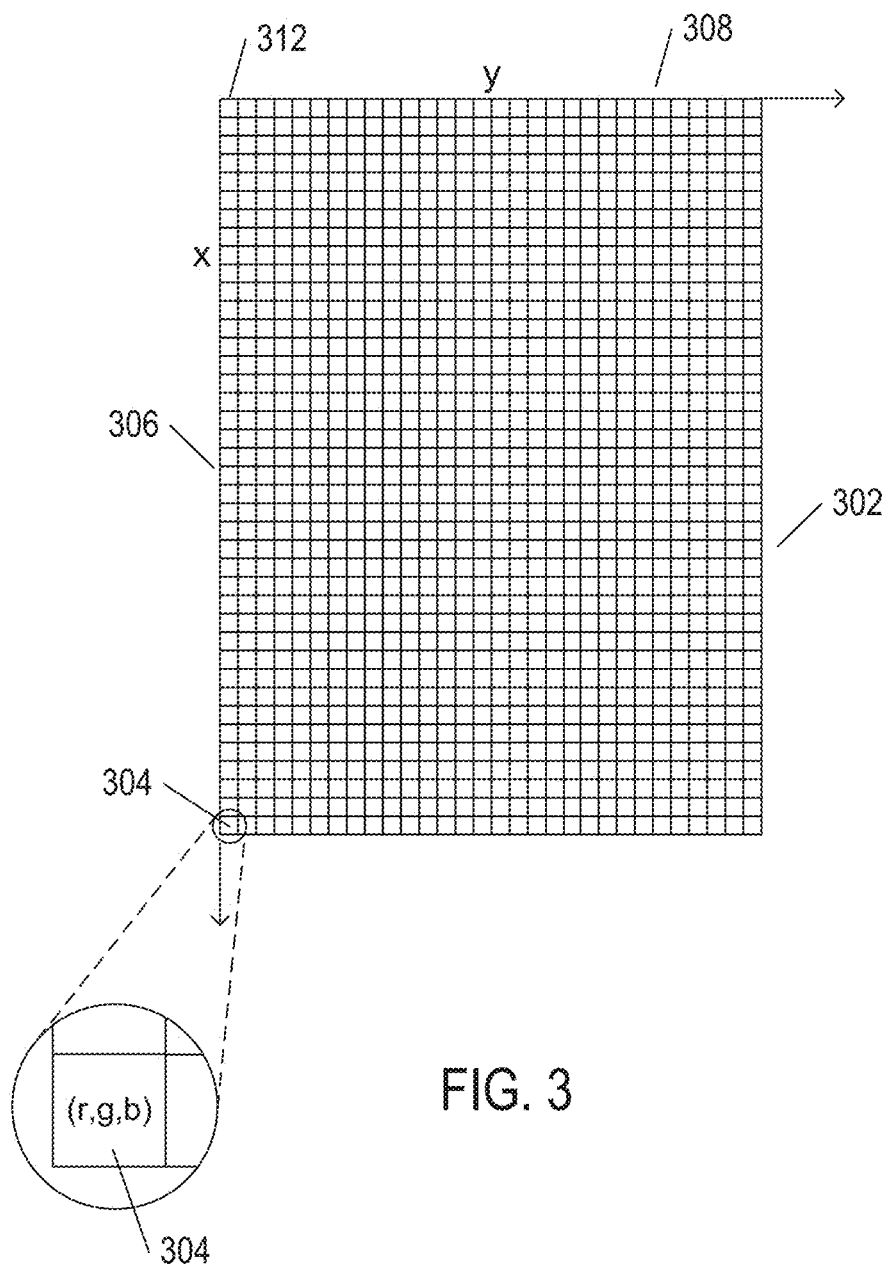
FIG. 3 illustrates a typical digitally encoded image.

FIG. 3 illustrates a typical digitally encoded image. The encoded image comprises a two dimensional array of pixels 302. In FIG. 3, each small square, such as square 304, is a pixel, generally defined as the smallest-granularity portion of an image that is numerically specified in the digital encoding. Each pixel is a location, generally represented as a pair of numeric values corresponding to orthogonal x and y axes 306 and 308, respectively. Thus, for example, pixel 304 has x, y coordinates (39,0), while pixel 312 has coordinates (0,0). In the digital encoding, the pixel is represented by numeric values that specify how the region of the image corresponding to the pixel is to be rendered upon printing, display on a computer screen, or other display. Commonly, for black-and-white images, a single numeric value range of 0-255 is used to represent each pixel, with the numeric value corresponding to the grayscale level at which the pixel is to be rendered. In a common convention, the value "0" represents black and the value "255" represents white. For color images, any of a variety of different color-specifying sets of numeric values may be employed. In one common color model, as shown in FIG. 3, each pixel is associated with three values, or coordinates (r,g,b), which specify the red, green, and blue intensity components of the color to be displayed in the region corresponding to the pixel.

Figure 4:
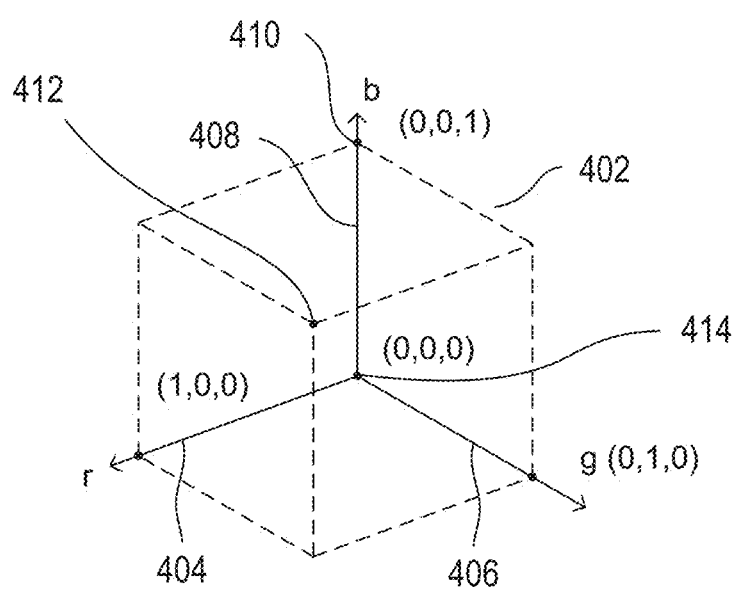
FIG. 4 illustrates one version of the RGB color model.

FIG. 4 illustrates one version of the RGB color model. The entire spectrum of colors is represented, as discussed above with reference to FIG. 3, by a three-primary-color coordinate (r,g,b). The color model can be considered to correspond to points within a unit cube 402 within a three-dimensional color space defined by three orthogonal axes: (1) r 404; (2) g 406; and (3) b 408. Thus, the individual color coordinates range from 0 to 1 along each of the three color axes. The pure blue color, for example, of greatest possible intensity corresponds to the point 410 on the b axis with coordinates (0,0,1). The color white corresponds to the point 412, with coordinates (1,1,1,) and the color black corresponds to the point 414, the origin of the coordinate system, with coordinates (0,0,0).

Figure 5:
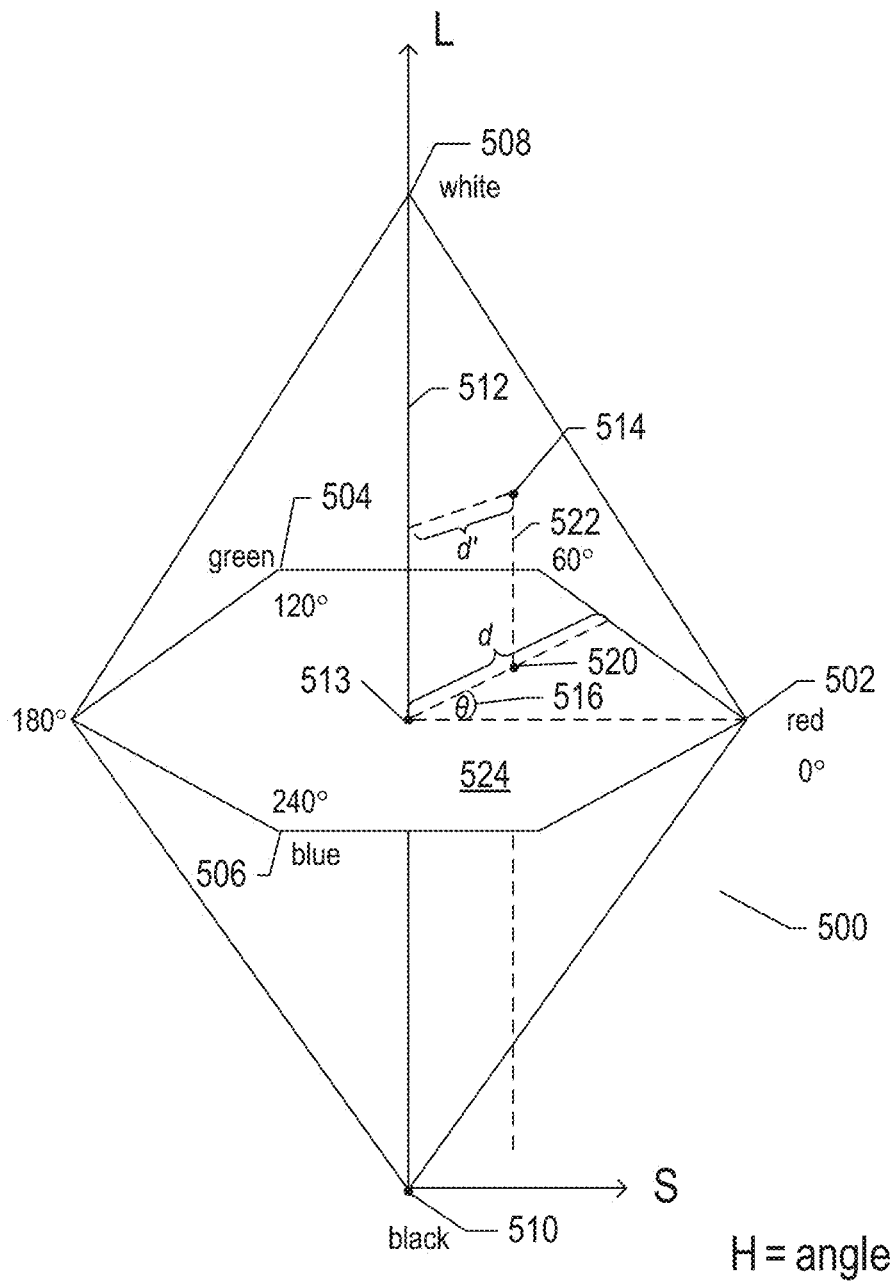
FIG. 5 shows a different color model, referred to as the "hue-saturation-lightness" ("HSL") color model.

FIG. 5 shows a different color model, referred to as the "hue-saturation-lightness" ("HSL") color model. In this color model, colors are contained within a three-dimensional bi-pyramidal prism 500 with a hexagonal cross section. Hue (h) is related to the dominant wavelength of a light radiation perceived by an observer. The value of the hue varies from 0° to 360° beginning with red 502 at 0°, passing through green 504 at 120°, blue 506 at 240°, and ending with red 502 at 660°. Saturation (s), which ranges from 0 to 1, is inversely related to the amount of white and black mixed with a particular wavelength, or hue. For example, the pure red color 502 is fully saturated, with saturation s=1.0, while the color pink has a saturation value less than 1.0 but greater than 0.0, white 508 is fully unsaturated, with s=0.0, and black 510 is also fully unsaturated, with s=0.0. Fully saturated colors fall on the perimeter of the middle hexagon that includes points 502, 504, and 506. A gray scale extends from black 510 to white 508 along the central vertical axis 512, representing fully unsaturated colors with no hue but different proportional combinations of black and white. For example, black 510 contains 100% of black and no white, white 508 contains 100% of white and no black and the origin 513 contains 50% of black and 50% of white. Lightness (l), or luma, represented by the central vertical axis 512, indicates the illumination level, ranging from 0 at black 510, with l=0.0, to 1 at white 508, with l=1.0. For an arbitrary color, represented in FIG. 5 by point 514, the hue is defined as angle θ 516, between a first vector from the origin 513 to point 502 and a second vector from the origin 513 to point 520 where a vertical line 522 that passes through point 514 intersects the plane 524 that includes the origin 513 and points 502, 504, and 506. The saturation is represented by the ratio of the distance of representative point 514 from the vertical axis 512, d', divided by the length of a horizontal line passing through point 520 from the origin 513 to the surface of the bi-pyramidal prism 500, d. The lightness is the vertical distance from representative point 514 to the vertical level of the point representing black 510. The coordinates for a particular color in the HSL color model, (h,s,l), can be obtained from the coordinates of the color in the RGB color model, (r,g,b), as follows:

$$l = \frac{(C_{max} - C_{min})}{2},$$

$$h = \begin{cases} 60° \times \left(\frac{g-b}{\Delta} \mod 6\right), & \text{when } C_{max} = r \\ 60° \times \left(\frac{b-r}{\Delta} + 2\right), & \text{when } C_{max} = g \\ 60° \times \left(\frac{r-g}{\Delta} + 4\right), & \text{when } C_{max} = b \end{cases}, \text{ and}$$

$$s = \begin{cases} 0, \Delta = 0 \\ \frac{\Delta}{1 - |2l - 1|}, \text{ otherwise} \end{cases},$$

where r, g, and b values are intensities of red, green, and blue primaries normalized to the range [0,1], $C_{max}$ is a normalized intensity value equal to the maximum of r, g, and b; $C_{min}$ is a normalized intensity value equal to the minimum of r, g, and b; and Δ is defined as $C_{max}-C_{min}$.

Figure 6:
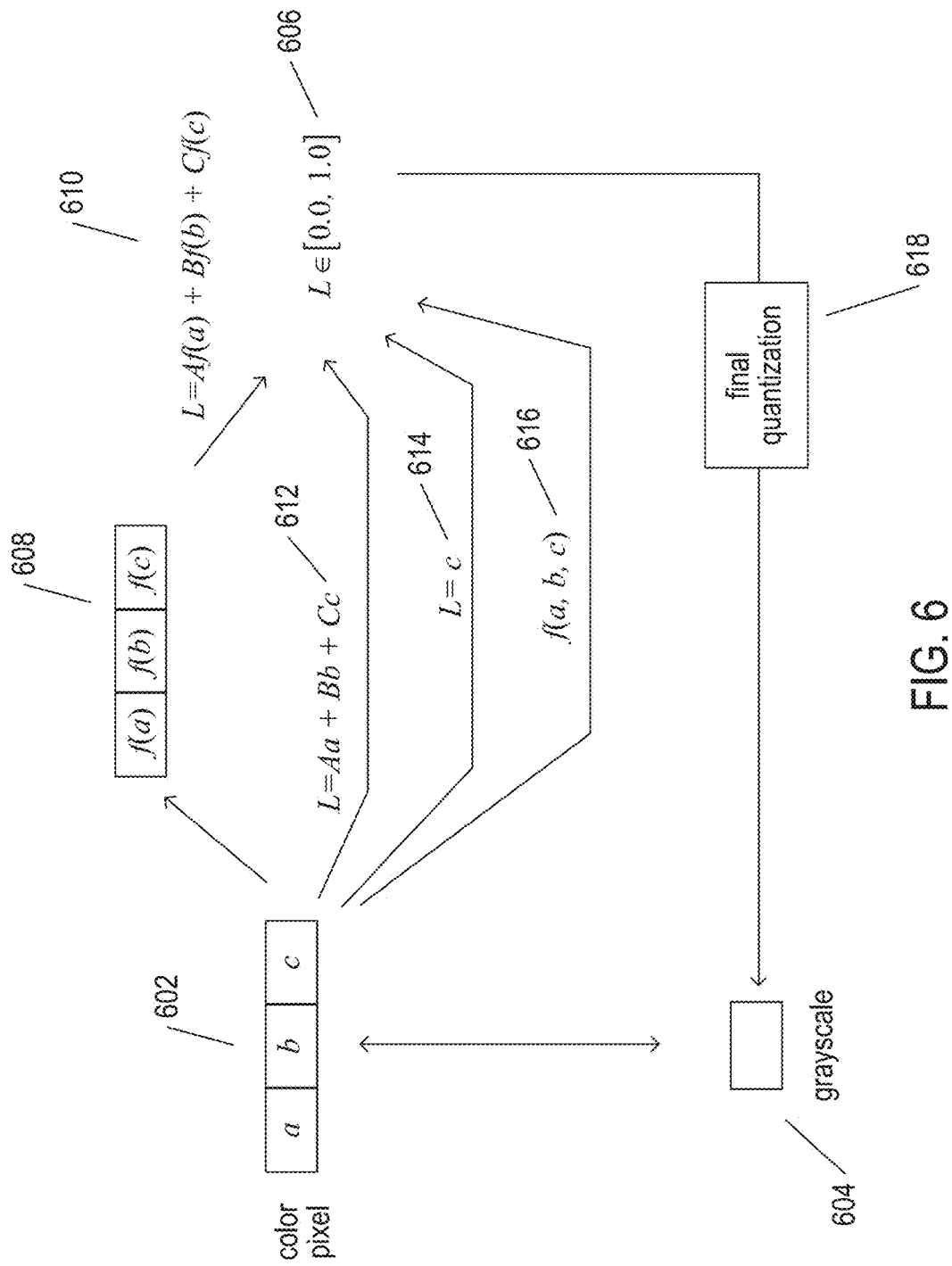
FIG. 6 illustrates generation of a grayscale or binary image from a color image.

FIG. 6 illustrates generation of a grayscale or binary image from a color image. In a color image, each pixel is generally associated with three values: a, b, and c 602. Different color models employ different values of a, b, and c to represent a particular color. A grayscale image includes only a single intensity value 604 for each pixel. A binary image is a special case of a grayscale image with only two different intensity values, 0 and 1. Commonly, grayscale images may have 256 or 65,536 different intensity values, with each pixel represented by a byte or 16-bit word, respectively. Thus, to transform a color image to grayscale, the three values a, b, and c in the color pixels need to be translated to single intensity values for the grayscale or binary image. In a first step, the three color values a, b, and c are transformed to a luminosity value L, generally in a range of [0.0, 1.0] 606. For certain color models, a function is applied to each of the color values 608 and the results are summed 610 to produce the luminosity value. In other color models, each color value is multiplied by a coefficient and the results are summed 612 to produce the luminosity value. In yet other color systems, one of the three color values is, in fact, the luminosity value 614. Finally, in the general case, a function is applied to the three color values 616 to produce the luminosity value. The luminosity value is then quantized 618 to produce a grayscale intensity value within the desired range, generally [0, 255] for grayscale images and (0,1) for binary images.

Figure 7:
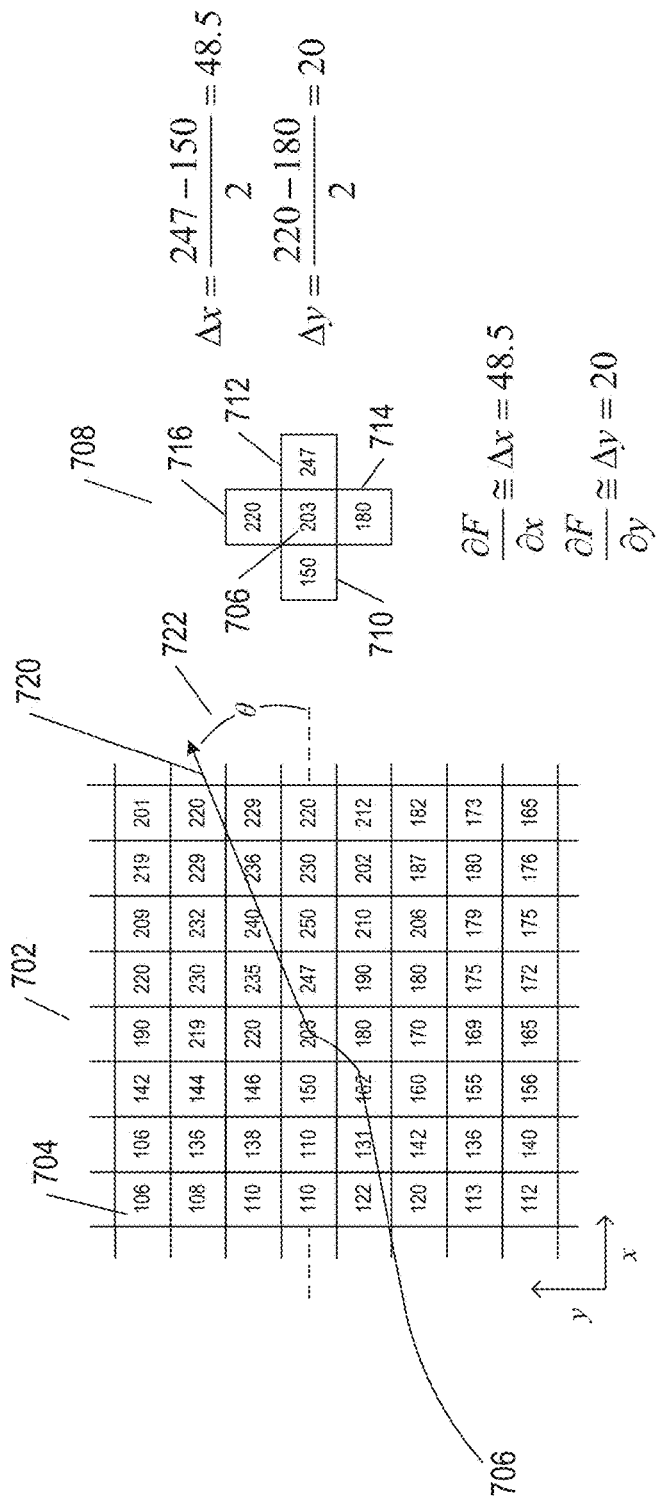
FIG. 7 illustrates a discrete computation of an intensity gradient.

FIG. 7 illustrates a discrete computation of an intensity gradient. In FIG. 7, a small square portion 702 of a digital image is shown. Each cell, such as cell 704, represents a pixel and the numeric value within the cell, such as the value "106" in cell 704, represents a grayscale intensity. Consider pixel 706 with the intensity value "203." This pixel, and four contiguous neighbors, are shown in the cross-like diagram 708 to the right of the portion 702 of the digital image. Considering the left 710 and right 712 neighbor pixels, the change in intensity value in the x direction, Δx, can be discretely computed as:

$$\Delta x = \frac{247 - 150}{2} = 48.5.$$

Considering the lower 714 and upper 716 pixel neighbors, the change in intensity in the vertical direction, Δy, can be computed as:

$$\Delta y = \frac{220 - 180}{2} = 20.$$

The computed Δx is an estimate of the partial differential of the continuous intensity function with respect to the x coordinate at the central pixel 706:

$$\frac{\partial F}{\partial x} \cong \Delta x = 48.5.$$

The partial differential of the intensity function F with respect to the y coordinate at the central pixel 706 is estimated by Δy:

$$\frac{\partial F}{\partial y} \cong \Delta y = 20.$$

The intensity gradient at pixel 706 can then be estimated as:

$$\text{gradient} = \nabla F = \frac{\partial F}{\partial x}i + \frac{\partial F}{\partial y}j = 48.5i + 20j$$

where i and j are the unit vectors in the x and y directions. The magnitude of the gradient vector and the angle of the gradient vector are then computed as:

$$|\text{gradient}| = \sqrt{48.5^2 + 20^2} = 52.5$$

$$\theta = \text{atan } 2(20, 48.5) = 22.4°$$

The direction of the intensity gradient vector 720 and the angle θ 722 are shown superimposed over the portion 702 of the digital image in FIG. 7. Note that the gradient vector points in the direction of steepest increase in intensity from pixel 706. The magnitude of the gradient vector indicates an expected increase in intensity per unit increment in the gradient direction. Of course, because the gradient is only estimated by discrete operations, in the computation illustrated in FIG. 7, both the direction and magnitude of the gradient are merely estimates.

Figure 8:
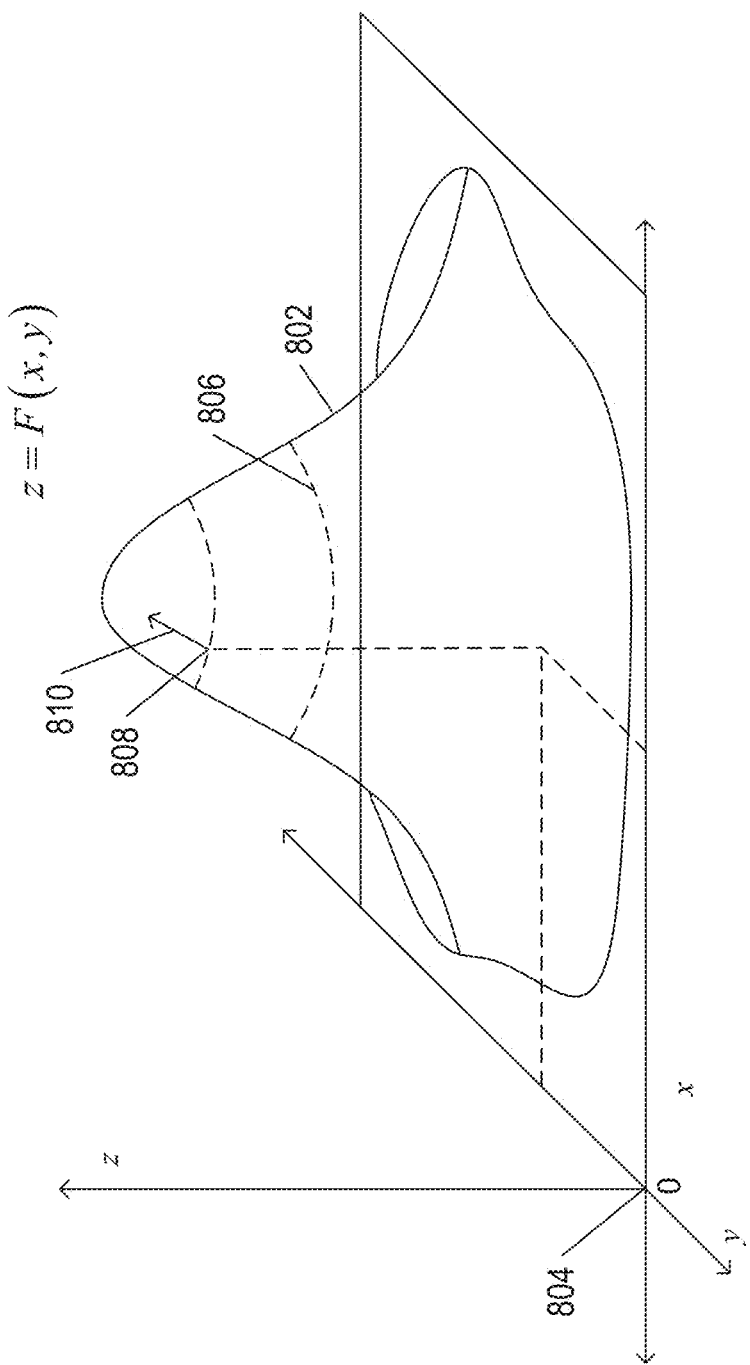
FIG. 8 illustrates a gradient computed for a point on a continuous surface.

FIG. 8 illustrates a gradient computed for a point on a continuous surface. FIG. 8 illustrates a continuous surface z=F(x,y). The continuous surface 802 is plotted with respect to a three-dimensional Cartesian coordinate system 804, and has a hat-like shape. Contour lines, such as contour line 806, can be plotted on the surface to indicate a continuous set of points with a constant z value. At a particular point 808 on a contour plotted on the surface, the gradient vector 810 computed for the point is perpendicular to the contour line and points in the direction of the steepest increase along the surface from point 808.

Figure 9:
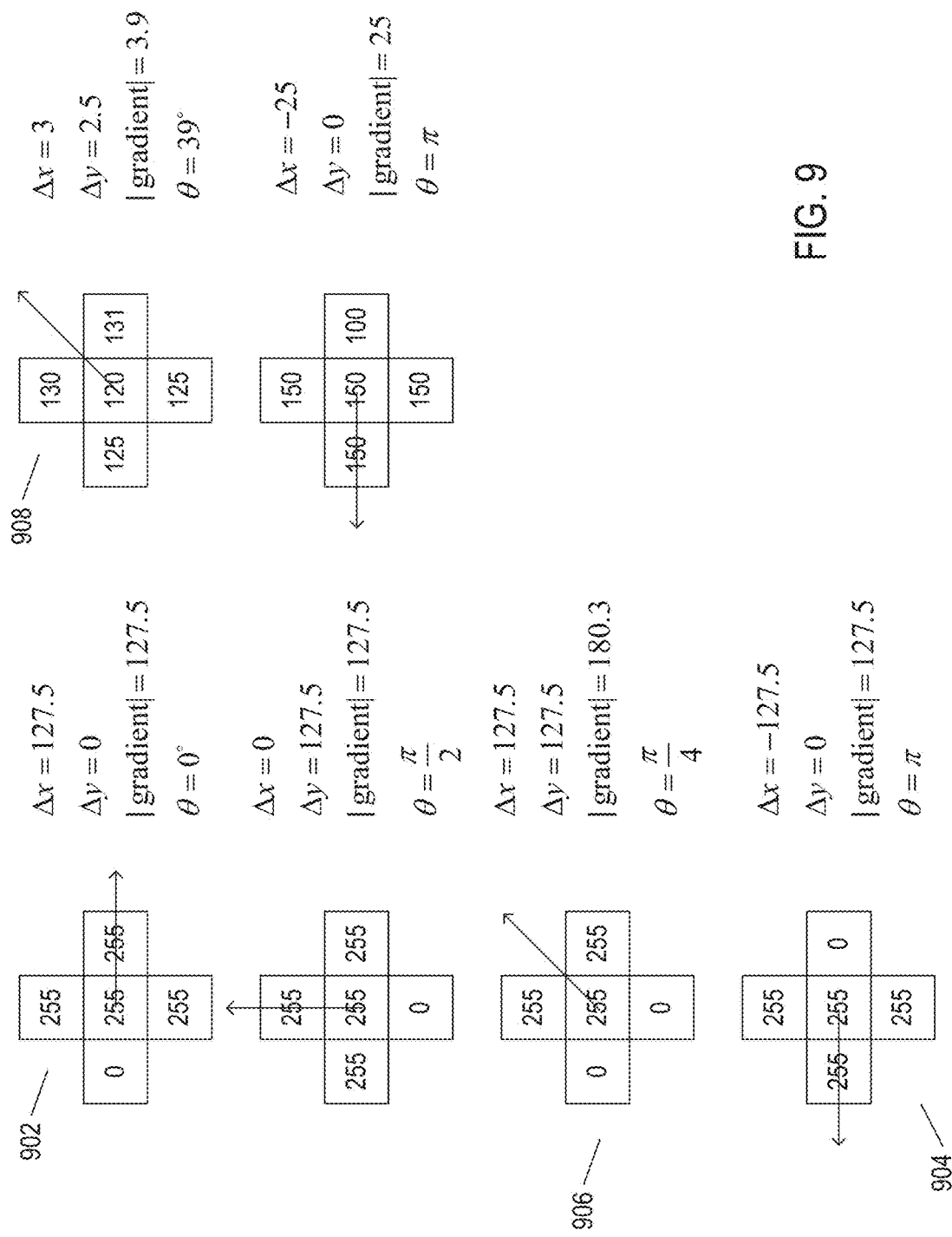
FIG. 9 illustrates a number of intensity-gradient examples.

In general, an intensity gradient vector is oriented perpendicularly to an intensity edge, and the greater the magnitude of the gradient, the sharper the edge or the greatest difference in intensities of the pixels on either side of the edge. FIG. 9 illustrates a number of intensity-gradient examples. Each example, such as example 902, includes a central pixel for which the gradient is computed and the four contiguous neighbors used to compute Δx and Δy. The sharpest intensity boundaries are shown in the first column 904. In these cases, the magnitude of the gradient is at least 127.5 and, for the third case 906, 180.3. A relatively small difference across an edge, shown in example 908, produces a gradient with a magnitude of only 3.9. In all cases, the gradient vector is perpendicular to the apparent direction of the intensity edge through the central pixel.

Figure 10:
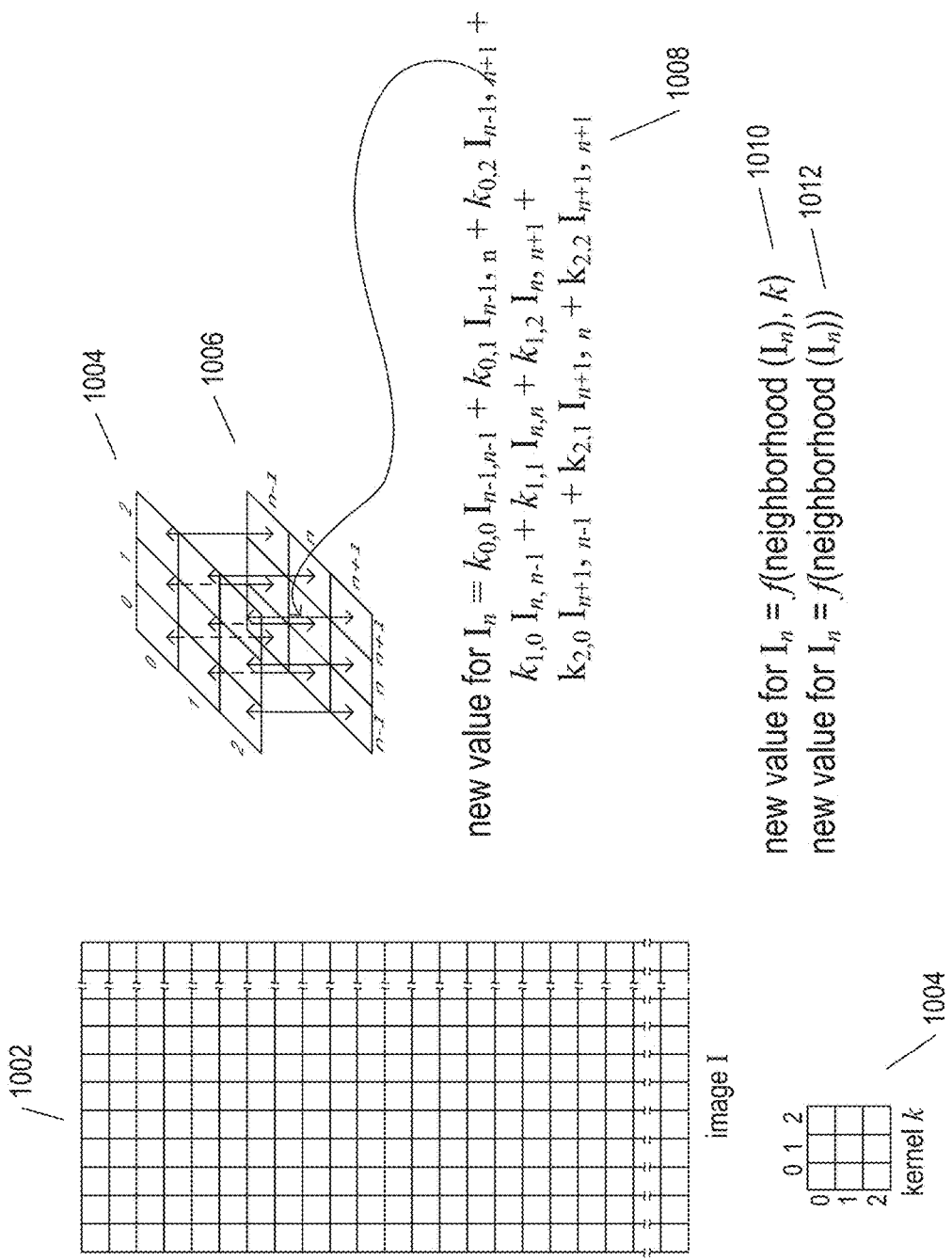
FIG. 10 illustrates application of a kernel to an image.

Many image-processing methods involve application of kernels to the pixel grid that constitutes the image. FIG. 10 illustrates application of a kernel to an image. In FIG. 10, a small portion of an image 1002 is shown as a rectilinear grid of pixels. A small 3×3 kernel k 1004 is shown below the representation of image I 1002. A kernel is applied to each pixel of the image. In the case of a 3×3 kernel, such as kernel k 1004 shown in FIG. 10, a modified kernel may be used for edge pixels or the image can be expanded by copying the intensity values in edge pixels to a circumscribing rectangle of pixels so that the kernel can be applied to each pixel of the original image. To apply the kernel to an image pixel, the kernel 1004 is computationally layered over a neighborhood of the pixel to which the kernel is applied 1006 having the same dimensions, in pixels, as the kernel. Application of the kernel to the neighborhood of the pixel to which the kernel is applied produces a new value for the pixel in a transformed image produced by applying the kernel to pixels of the original image. In certain types of kernels, the new value for the pixel to which the kernel is applied, $I_n$, is obtained as the sum of the products of the kernel value and pixel aligned with the kernel value 1008. In other cases, the new value for the pixel is a more complex function of the neighborhood about the pixel and the kernel 1010. In yet other types of image processing, a new value for a pixel is generated by a function applied to the neighborhood of the pixel, without using a kernel 1012.

Figure 11:
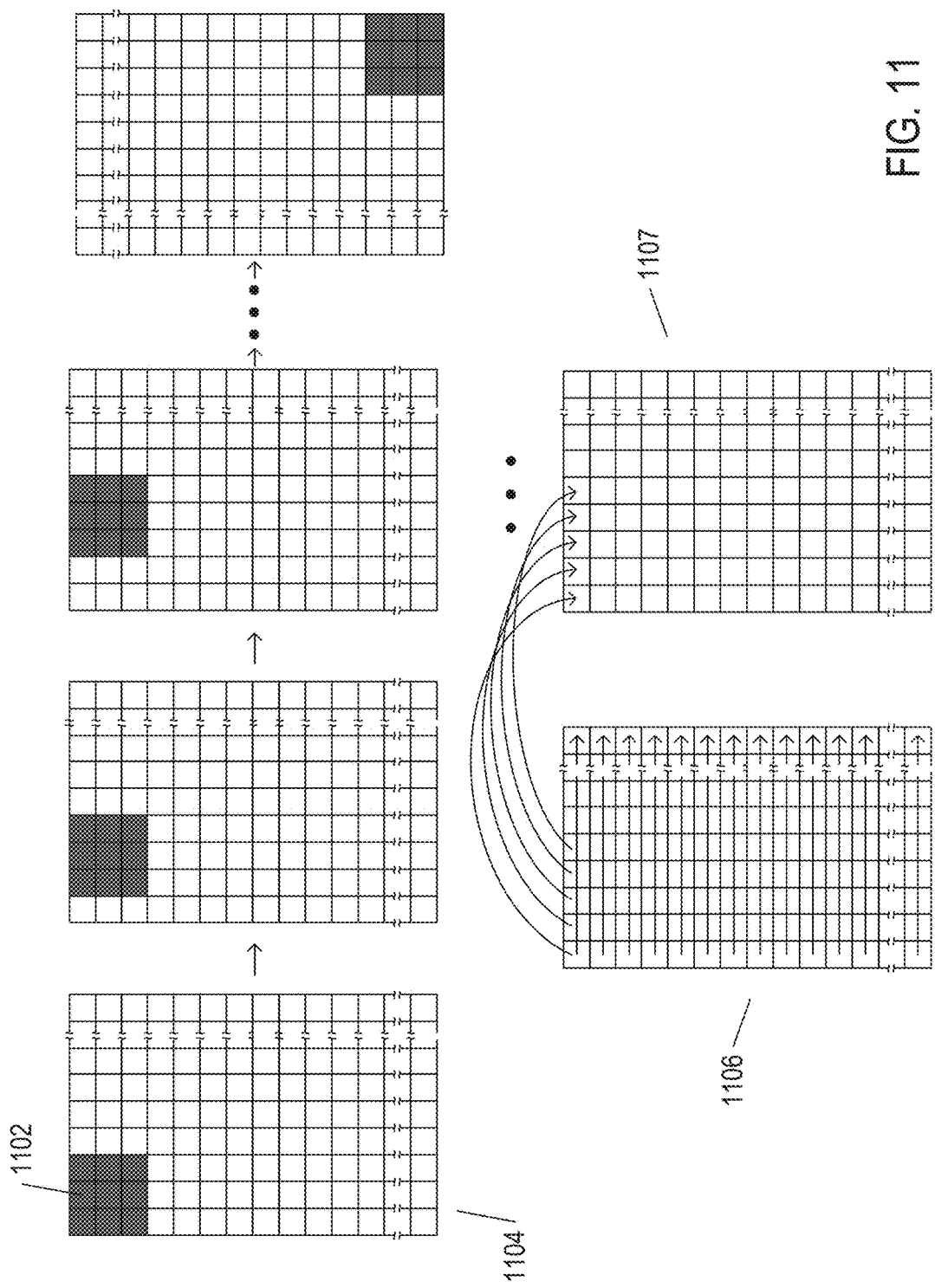
FIG. 11 illustrates convolution of a kernel with an image.

FIG. 11 illustrates convolution of a kernel with an image. In general, the kernel is sequentially applied to each pixel of an image, in some cases, into each non-edge pixel of an image; in other cases, to produce new values for a transformed image. In FIG. 11, a 3×3 kernel, shown by shading 1102, is sequentially applied to the first row of non-edge pixels in an image 1104. Each new value generated by application of a kernel to a pixel in the original image 1106 is then placed into the transformed image 1107. In other words, the kernel is sequentially applied to the original neighborhoods of each pixel in the original image to produce the transformed image. This process is referred to as "convolution," and is loosely related to the mathematical convolution operation computed by multiplying Fourier-transformed images and then carrying out an inverse Fourier transform on the product.

Figure 12:
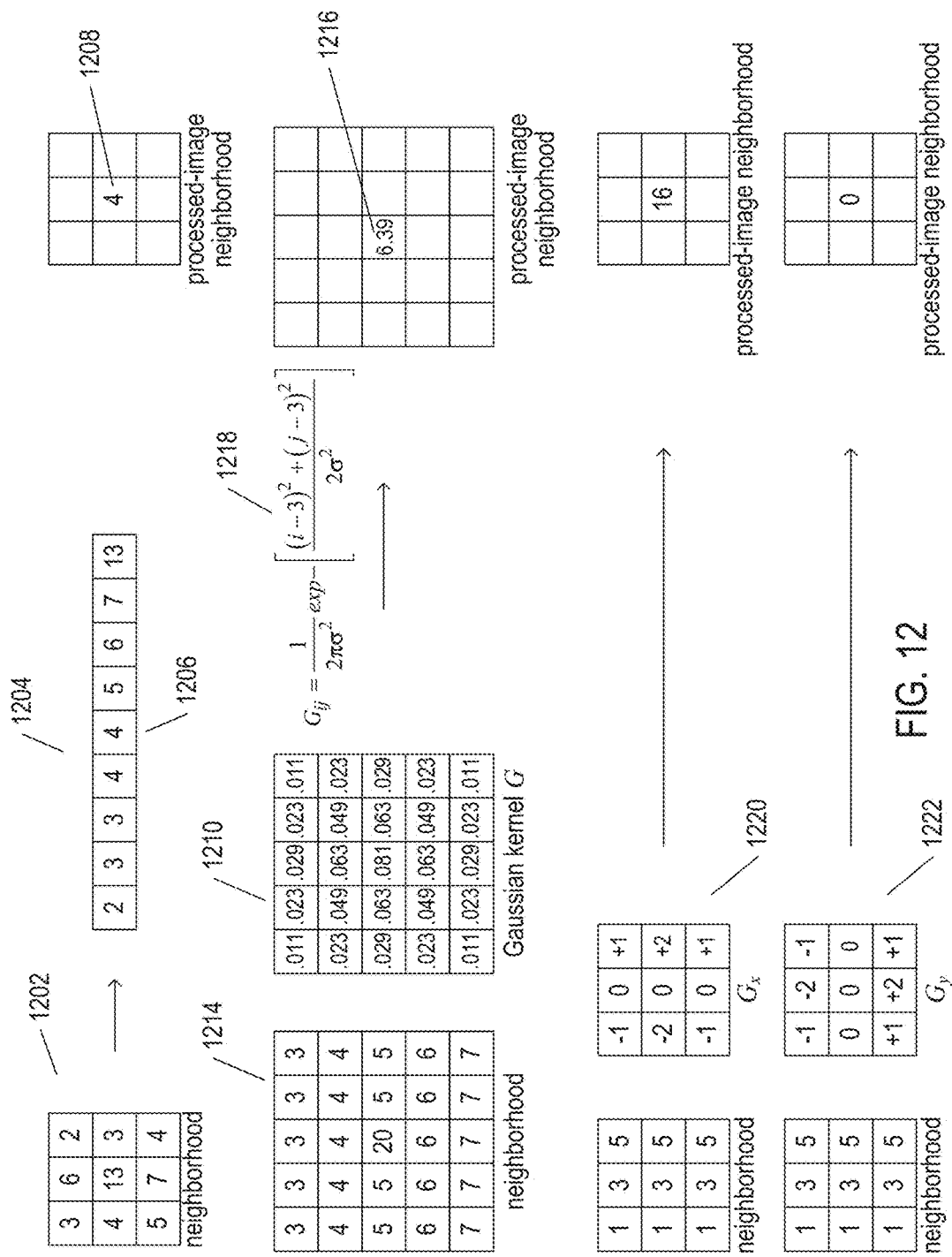
FIG. 12 illustrates some example kernel and kernel-like image-processing techniques.

FIG. 12 illustrates some example kernel and kernel-like image-processing techniques. In the process referred to as "median filtering," the intensity values in a neighborhood of the original image 1202 are sorted 1204 in ascending-magnitude order and the median value 1206 is selected as a new value 1208 for the corresponding neighborhood of the transformed image. Gaussian smoothing and denoising involves applying a Gaussian kernel 1210 to each neighborhood 1214 of the original image to produce the value for the central pixel of the neighborhood 1216 in the corresponding neighborhood of the processed image. The values in the Gaussian kernel are computed by an expression such as expression 1218 to produce a discrete representation of a Gaussian surface above the neighborhood formed by rotation of a bell-shaped curve about a vertical axis coincident with the central pixel. The horizontal and vertical components of the image gradient for each pixel can be obtained by application of the corresponding $G_x$ 1220 and $G_y$ 1222 gradient kernels. These are only three of the many different types of convolution-based image-processing techniques.

Methods and Systems that Identify Contours in Digital Images

Figure 13:
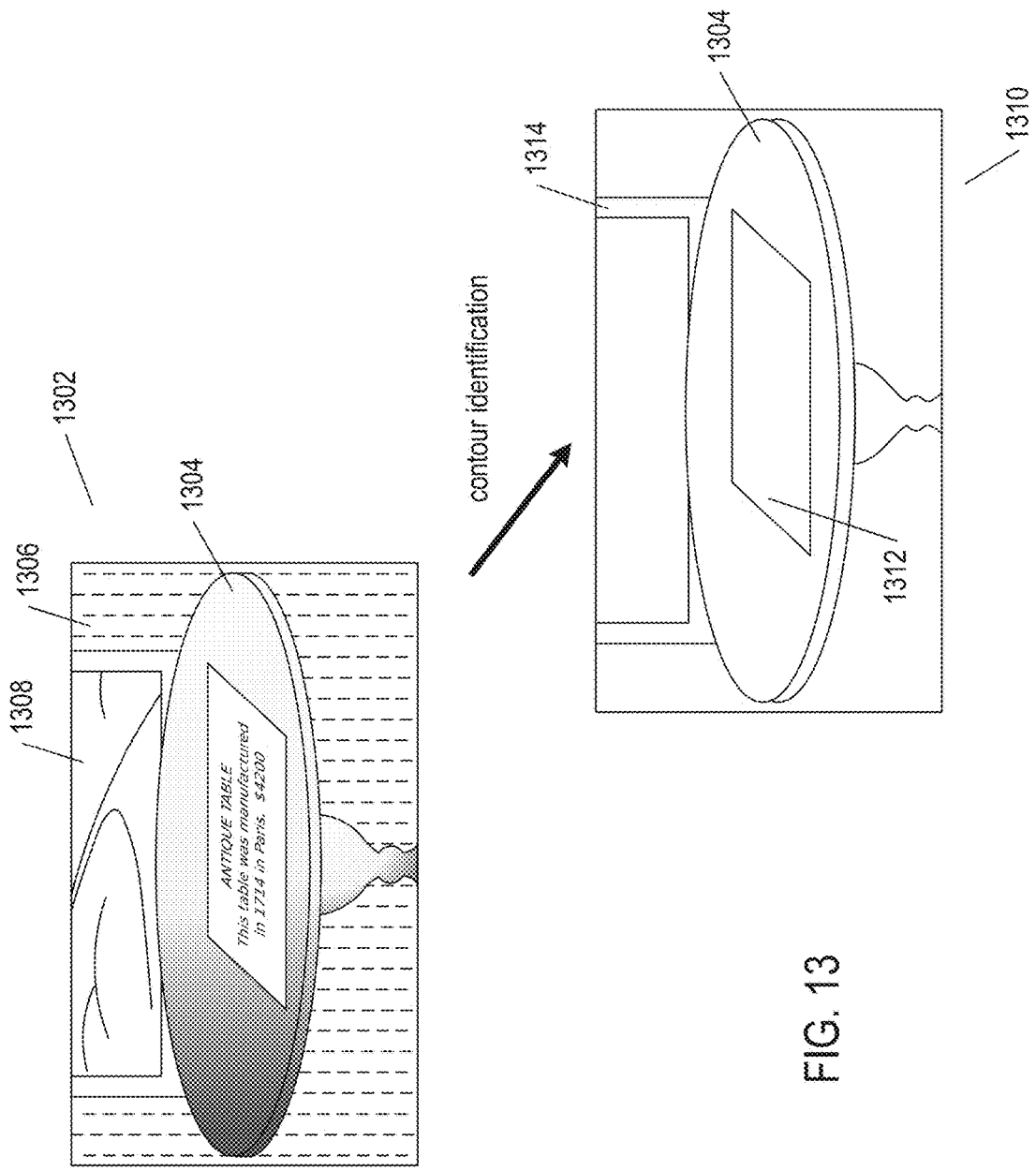
FIG. 13 illustrates a general approach to contour identification.
Figure 14:
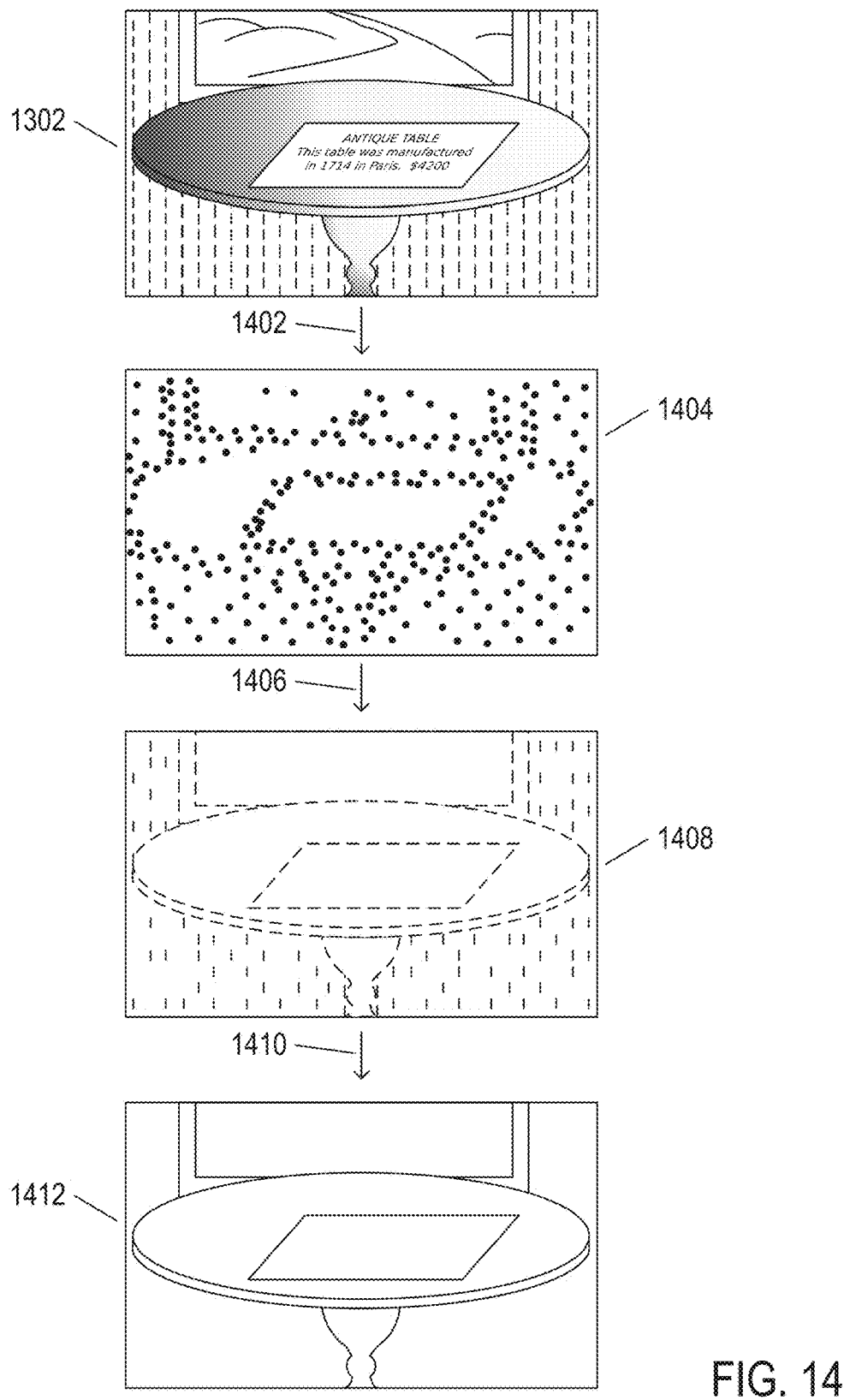
FIG. 14 illustrates a general approach to contour identification.

FIGS. 13-14 illustrate a general approach to contour identification. FIG. 13 illustrates an example contour-identification carried out on an example digital image. The digital image 1302 is a photograph of a table 1304 that is positioned near a wall covered with wallpaper 1306 in which a window 1308 looks out over an outside landscape scene. In this example, the digital image is automatically processed in order to identify physical objects of interest. In a first series of digital-image-processing steps, contours likely to correspond to edges and borders of physical objects of interest are identified, using the currently disclosed contour-identification methods. Contour identification produces the contour map 1310 that includes contours corresponding to the edges of the table 1304, contours corresponding to the edges of a document lying on the table 1312, and contours corresponding to a portion of a window frame 1314. Additional digital-image-processing steps can then be carried out to use these contours, along with additional information within the original image 1302, to recognize and classify physical objects in the image, including the table, document, and window frame. The currently discussed contour-identifying method employs various constraints and parameters to control contour identification in order to identify contours useful for specific purposes. For instance, in the example shown in FIG. 13, there are many intensity edges in the original image 1302 corresponding to a pattern of dashed stripes in the wallpaper on the wall 1306 behind the table. A parameter that controls the minimum length for identified contours can be set to a value that excludes the wallpaper pattern.

FIG. 14 illustrates the overall approach to contour identification used in the currently discussed method. In a first step 1402, the original image 1302 is processed to identify candidate starting points, or seed points, from which contours can be constructed and extended. The result of the first step can be thought of as a seed-point map 1404. In a second step 1406, initial edges are extended, in two directions, from each seed point to generate incipient contours 1408. In a final step 1410, the incipient edges are extended and combined to produce contours, which may be then filtered in order to produce a set of identified contours 1412 that can be used for subsequent image-processing tasks. As discussed in detail below, each of the steps 1402, 1406, and 1410 shown in FIG. 14 involve numerous processes. These processes rely on generating and storing numerous different types of intermediate results and data. Different implementations of the currently disclosed methods and systems may use various different types of data representations and intermediate results. For example, an intermediate result may be a two-dimensional map, with elements corresponding to pixels of the digital image in one implementation, but may, in a different implementation, constitute stored data with references to the original image.

FIGS. 15-26 illustrate a particular implementation of a contour-finding method and subsystem. FIGS. 15-26 provide detailed, step-by-step illustrations to facilitate understanding of the flow-control diagrams and the discussion of the flow-control diagrams with respect to which the implementation is described in a following subsection.

Figure 15:
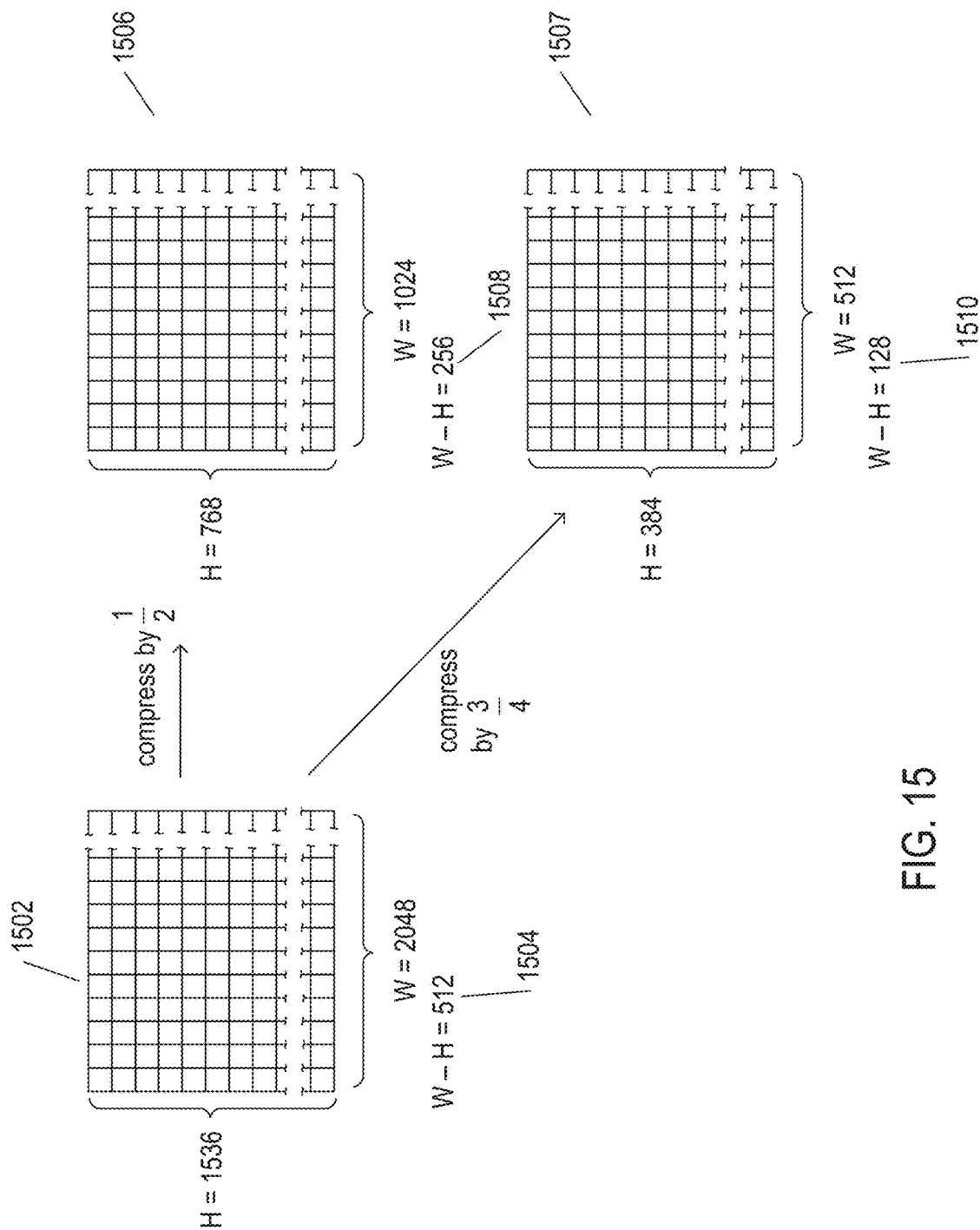
FIG. 15 illustrates a particular implementation of a contour-finding method and subsystem.

FIG. 15 illustrates a first compression step. In FIG. 15, the originally received digital image 1502 has a height, in pixels, of 1536 and a width, in pixels, of 2048. The difference between the height and width is 512 pixels 1504. The original image 1502 is compressed to produce compressed images 1506 and 1507, each compressed by a different compression ratio. The first compressed image 1506 is compressed by a compression ratio of ½ and has, as a result, a height of 768 pixels and a width of 1024 pixels. The difference between the width and height of the compressed image is 256 pixels 1508. The second compressed image is compressed by a compression ratio of ¾, with the difference between the width and height in the second compressed image equal to 128 pixels 1510. In the currently described implementation, the original image is compressed, by one or more different compression ratios, to generate one or more corresponding compressed images in which the difference between the width and height of the image is below a threshold number of pixels, such as below 300 pixels. Various different methods can be used to compress the digital image. In one simple method, evenly spaced rows and columns of pixels are removed from the original image to generate the compressed images. More complex methods may carry out various smoothing, shifting, and interpolation methods to ensure that desired detail is not inadvertently removed or altered during the compression operation.

Figure 16:
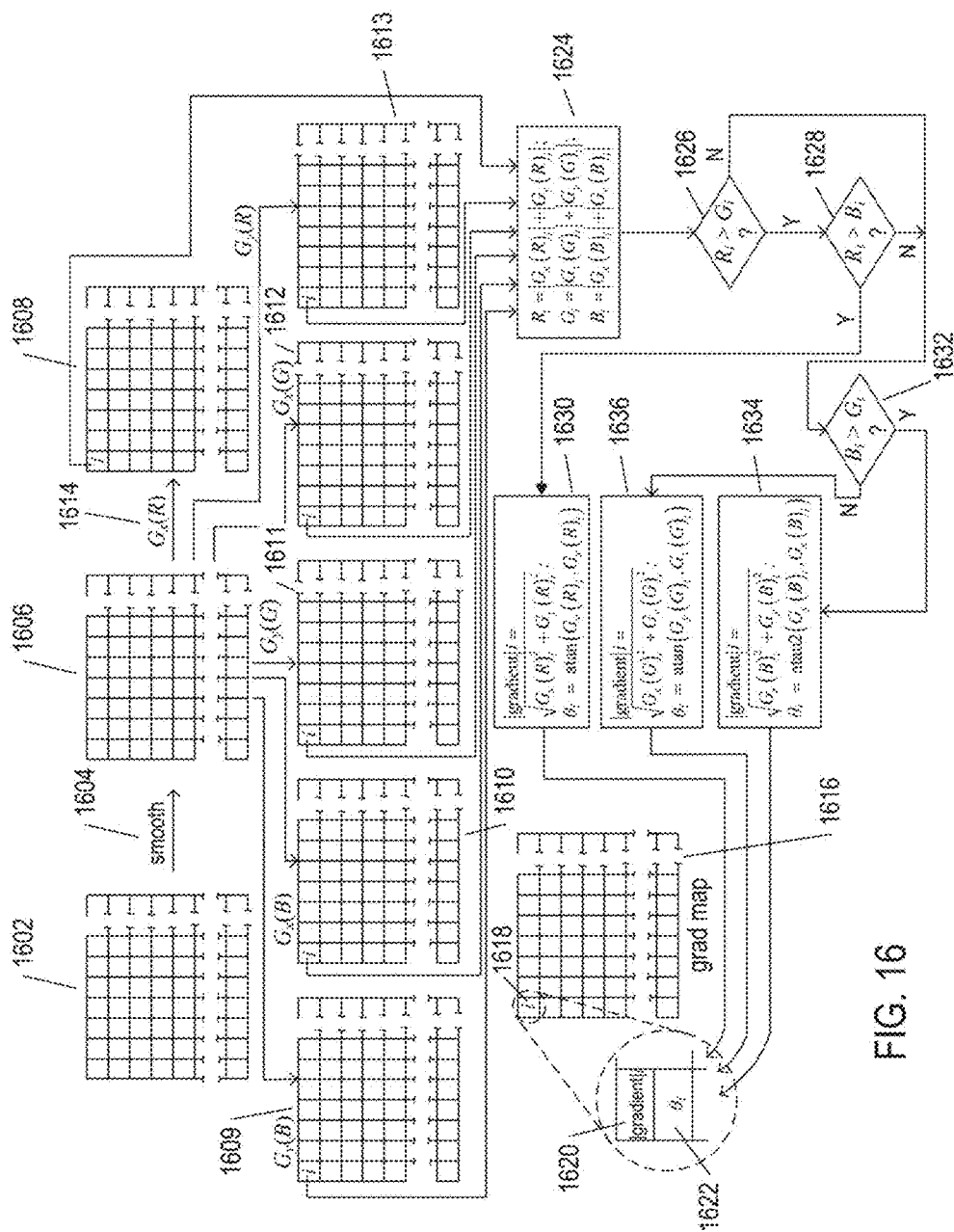
FIG. 16 illustrates a particular implementation of a contour-finding method and subsystem.

FIG. 16 shows a next processing step in the contour-identification-process implementation. The original image, or a compressed version of the original image 1602, is smoothed 1604 using a median filter or convolution with a Gaussian kernel, to produce a corresponding smoothed image 1606. Then, the gradient kernels $G_x$ and $G_y$ are applied to each color channel of the smoothed image to produce three pairs of horizontal-gradient-component- and vertical-gradient-component maps 1608-1613. For example, the horizontal-gradient-component kernel convolved with the red channel of the smoothed image 1614 produces the horizontal-gradient-component map for the red channel 1608. The notation "$G_i(X)$" is used both to indicate convolution of the gradient-component kernel in the i direction with the X color channel of an image as well as to indicate the gradient-component map produced by the convolution. With the six gradient-component maps 1608-1613 generated and stored in memory, or, alternatively, generated on the fly, the magnitudes of the gradient components are then used to produce a gradient map, referred to as the "grad map," 1616.

Each element of the grad map, such as element i 1618, includes the gradient magnitude 1620 and the orientation angle of the gradient 1622. The small control-flow diagram in FIG. 16 illustrates how the grad map is generated. First, in step 1624, the sum of the absolute values of the gradient components are computed for each color channel and stored in the variables $R_i$, $G_i$, and $B_i$. When $R_i$ is greater than $G_i$, as determined in step 1626, and when $R_i$ is greater than $B_i$, as determined in step 1628, the gradient for cell or pixel i is computed, in step 1630, using the gradient components for the red channel. When $R_i$ is not greater than both $G_i$ and $B_i$, then, in step 1632, a determination is made whether $B_i$ is greater than $G_i$. When $B_i$ is greater than $G_i$, the gradient magnitude and orientation for cell or pixel i is computed from the blue-channel gradient components, in step 1634. Otherwise, the gradient magnitude and orientation angle are computed from the green-channel gradient components in step 1636. This process, illustrated in the control-flow diagram 1624, 1626, 1628, 1630, 1632, 1634, and 1636 is repeated for each pixel or cell i within the smoothed image 1606. Note that, in certain implementations, convolutions are carried out only on pixels of an image over which the kernel can be overlaid, so that the map produced by convolution has fewer columns and rows than the original map. In other implementations, either the original image is extended, by copying, so that kernels can be applied to all pixels or cells within the image or modified kernels are used for border pixels and cells. The grad map 1616 is therefore a map of the magnitudes and orientations of the gradients for each pixel or cell of the smoothed image, with the gradient for each pixel based on the color channel of the smoothed image for which the sum of the gradient components is maximum.

Figure 17:
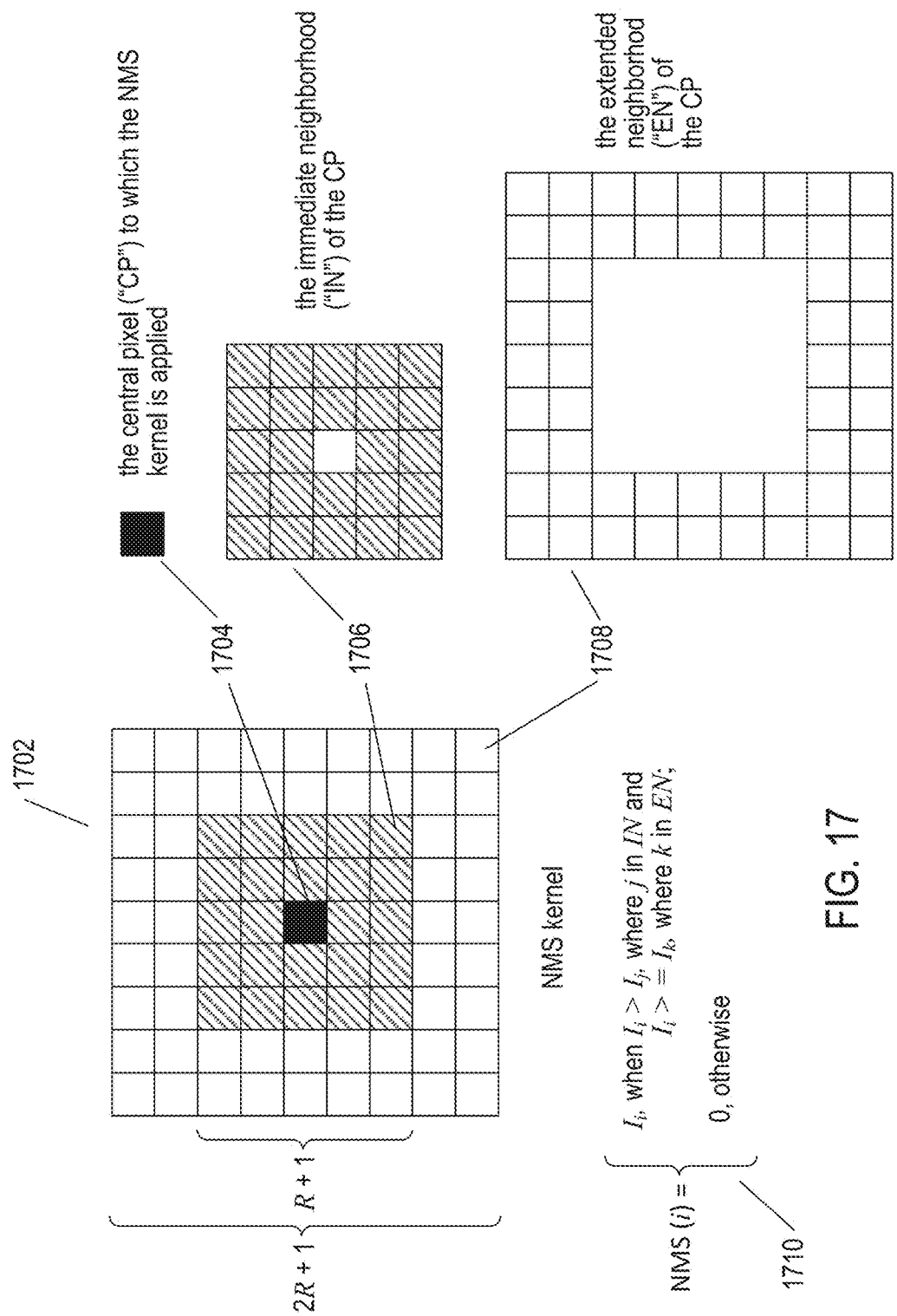
FIG. 17 illustrates a particular implementation of a contour-finding method and subsystem.

FIG. 17 illustrates a non-maximum-suppression kernel ("NMS kernel"). The NMS kernel 1702 includes three regions: (1) the central pixel 1704; (2) an immediate neighborhood 1706; and (3) an extended neighborhood 1708. Application of the NMS kernel to a pixel involves, as usual, overlaying the NMS kernel so that the central-pixel region 1704 of the NMS kernel overlies the pixel to which the kernel is applied. Application of the kernel decides whether or not the intensity of the pixel to which the kernel applied is transferred to the result image or map, or whether, instead, a 0 intensity value is transferred to the map or image. When the intensity of the underlying central pixel is greater than the intensity of any underlying pixel of the intermediate neighborhood and when the intensity of the pixel underlying the central-pixel region is greater or equal to the intensity of any pixel underlying the extended neighborhood, the intensity value of the central pixel is transferred to the resultant image or map. Otherwise, the value 0 is transferred to the resultant image or map. This decision process is formally expressed 1710 in FIG. 17. Convolution of the NMS kernel with an image or map selects pixels or cells of the image or map with local maximal intensities for transfer to the resultant map or image.

Figure 18:
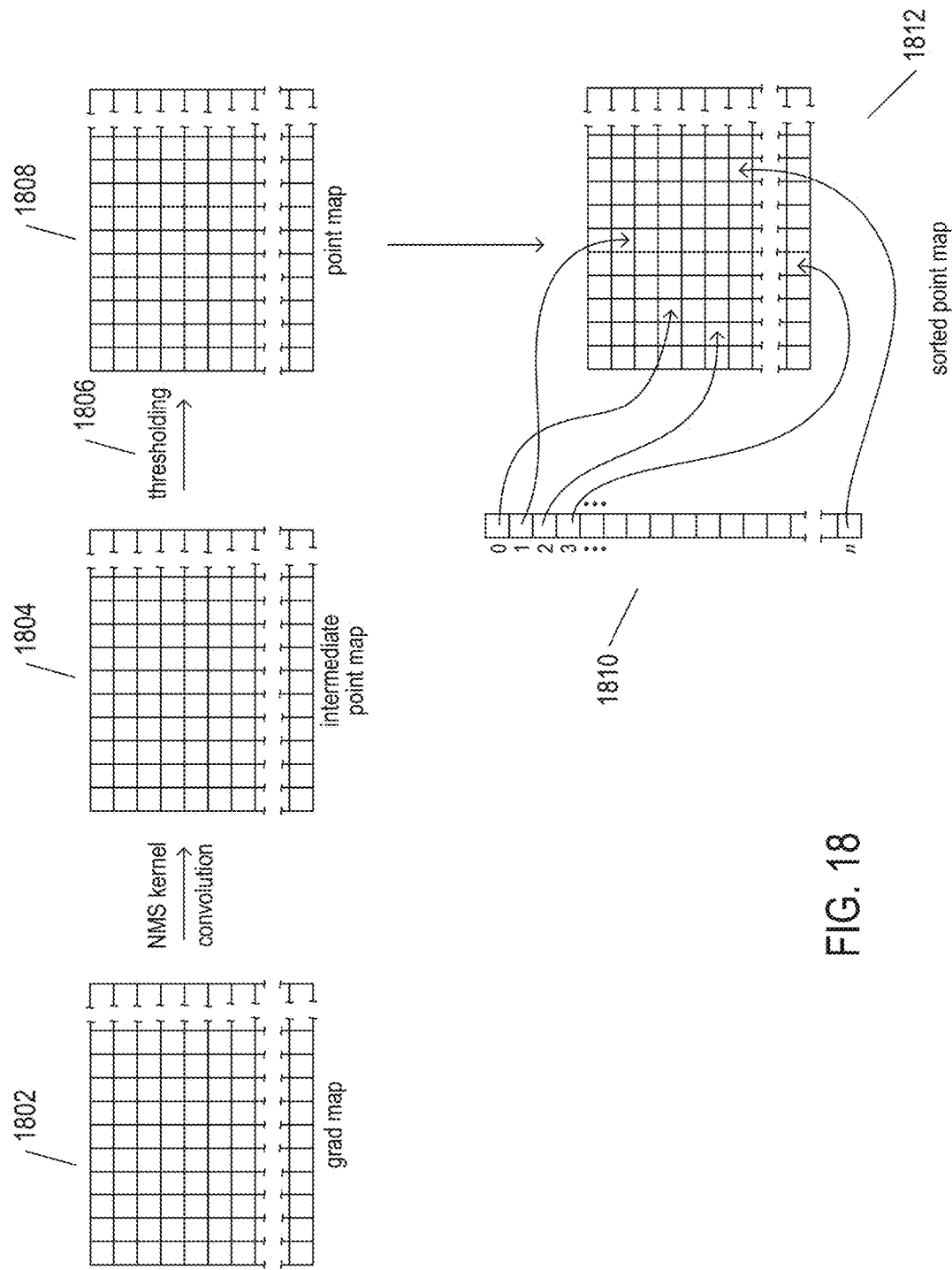
FIG. 18 illustrates a particular implementation of a contour-finding method and subsystem.

FIG. 18 illustrates additional steps in the contour-finding process that lead to generation of a point map that includes indications of the seed pixels from which contours are initiated, discussed above with reference to point map 1404 in FIG. 14. The grad map 1802, generated by the process discussed above with reference to FIG. 16, is convolved with an NMS kernel to produce an intermediate point map 1804. The NMS kernel considers the gradient magnitude component of each grad-map cell, transferring the local maximal gradient magnitudes from the grad map to the intermediate point map 1804. Next, thresholding 1806 is applied to the intermediate point map to produce a final point map 1808 containing the largest-valued gradient magnitudes, with all other cells containing the value 0 as a result of NMS-kernel convolution or thresholding. In certain implementations, an index 1810 is created to contain references to the seed pixels in the point map to produce a sorted point map 1812. The index is sorted in descending gradient-magnitude order, so that the most promising seed pixels are processed with greater priority than less-promising seed pixels. Note that alternative implementations may use a sorted array of data structures, each containing the coordinates and the gradient magnitude for a seed pixel, rather than retaining a sparse point map.

Figure 19:
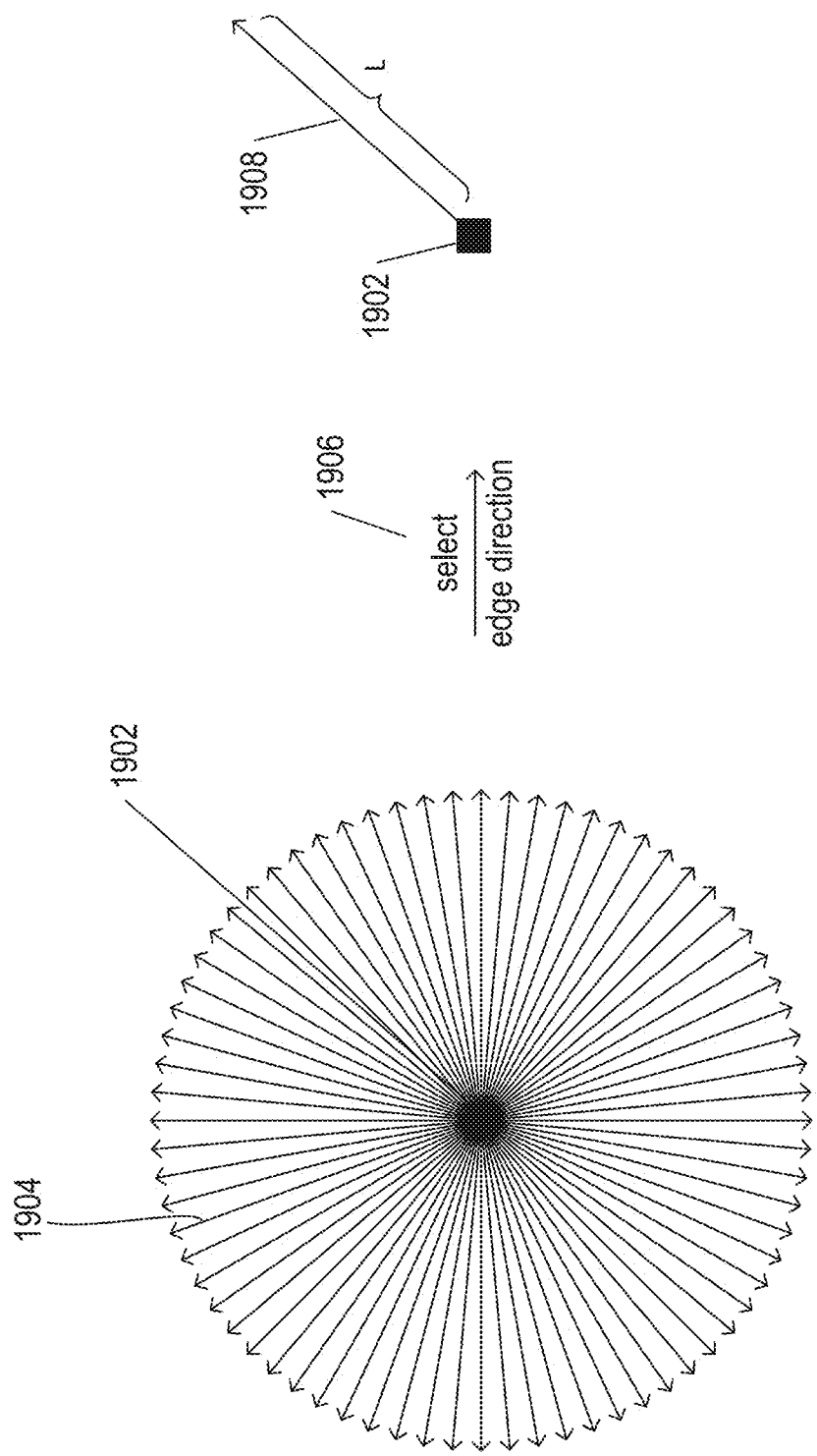
FIG. 19 illustrates a particular implementation of a contour-finding method and subsystem.

With a point map, sorted point map, or other seed-point-containing data structure in hand, the contour-finding process proceeds, as discussed above with reference to map or image 1408 in FIG. 14, to initiate contour construction from seed pixels or points. FIG. 19 illustrates the overall contour-initiation process. From a given seed pixel or point within the point map 1902, an initial contour may have one of many possible directions, indicated by arrows, such as arrow 1904. The initial edge-direction selection step 1906 selects a particular direction for the incipient contour and constructs a vector 1908 of length L with a tail coincident with the seed pixel 1902 and with a direction equal to the selected direction. The incipient contour is then a segment with two endpoints corresponding to the tail and head of the constructed vector. In the following discussion, the vectors may be alternatively referred to as "segments," since, as discussed below, a contour is represented by a series of head-to-tail vectors. These elements of a representation of a contour may be encoded either as vectors, with a starting point, magnitude, and orientation angle, or as segments, with coordinates for the starting and ending point of the segment.

Figure 20:
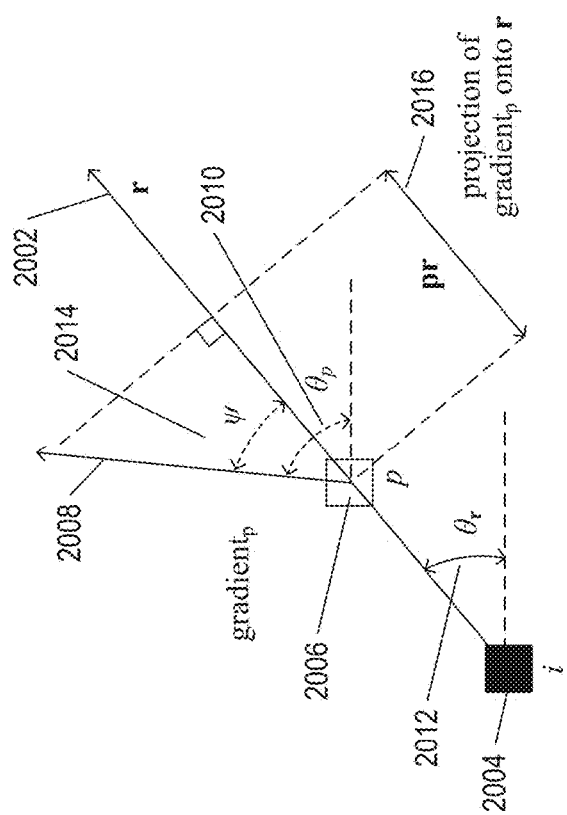
FIG. 20 illustrates a particular implementation of a contour-finding method and subsystem.

FIG. 20 illustrates computation of the magnitude of the projection of the gradient of a pixel p along an initial contour vector r emanating from a seed pixel or seed point i. As shown in FIG. 20, a proposed initial vector r 2002 for the contour coincident with a seed pixel i 2004 is considered during the process of selecting the direction for the incipient contour. Pixel p 2006 lies along vector r 2002. There is a gradient vector 2008 associated with pixel p in the grad map. This gradient vector has an orientation angle $\theta_p$ 2010, also available in the grad map. Angle 2012, $\theta_r$, is the orientation angle for vector r. The angle $\Psi$ 2014 is the angle between the gradient vector for pixel p and the vector r 2002. The vector pr 2016 is the projection of gradient vector 2008 onto vector r 2002. In the construction shown the angle $\Psi$ is easily computed from orientation angles $\theta_p$ and $\theta_r$ 2018. The ratio of the magnitudes of the vectors pr and the gradient vector for pixel p is equal to the cosine of angle $\Psi$ 2220. Thus, the magnitude of the projection vector pr is obtained as the product of the cosine of $\Psi$ and the magnitude of the gradient vector emanating from pixel p 2222. Alternatively, the dot product of the gradient vector 2002 and the vector r can be used to compute the magnitude of the projection vector pr 2224. Substituting the result 2222 into the dot-product expression produces an expression for the magnitude of the projection vector pr 2226.

Figure 21:
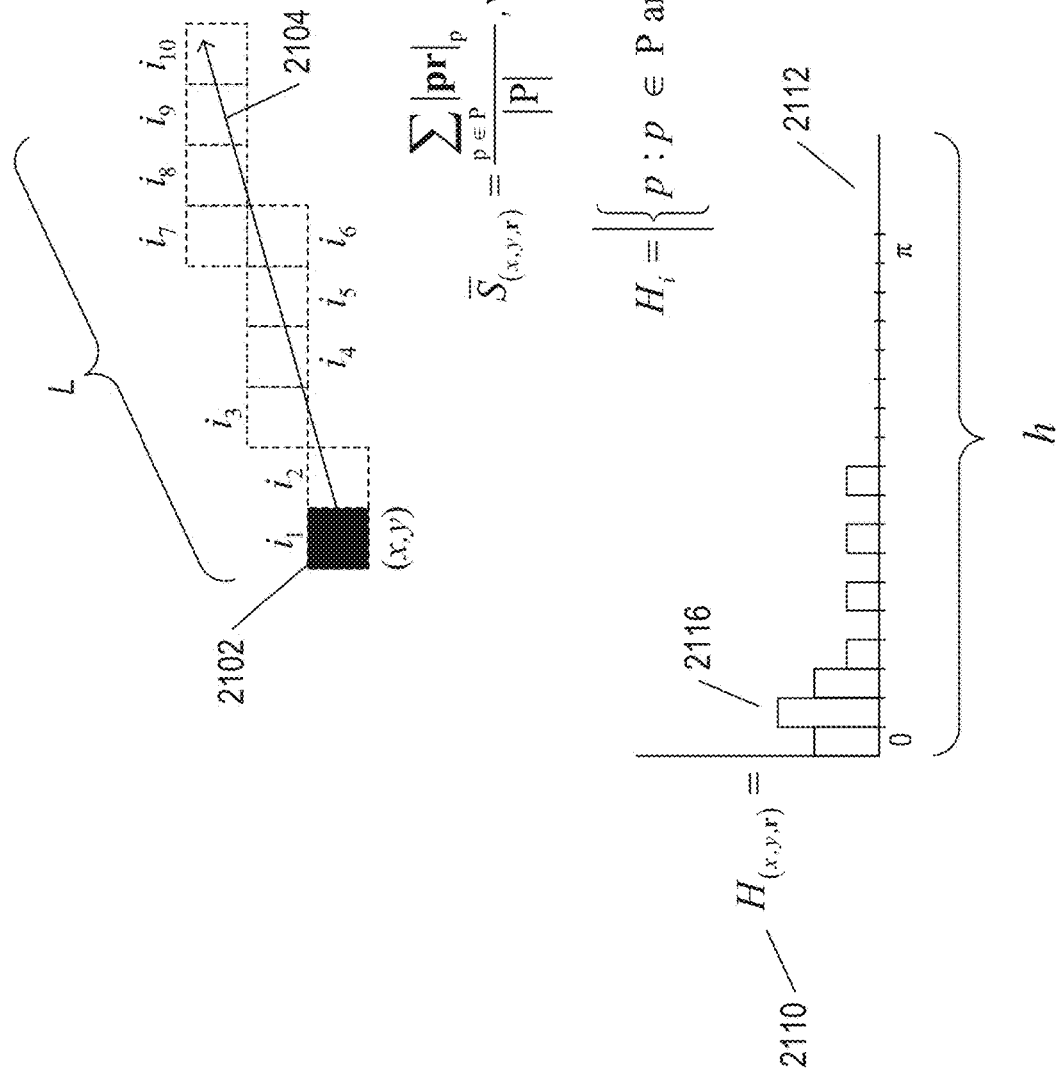
FIG. 21 illustrates a particular implementation of a contour-finding method and subsystem.

FIG. 21 illustrates generation of intermediate computed values used for the edge-direction-selection process for seed pixels. In FIG. 21, a seed pixel with coordinates (x,y) 2102 is shown along with a candidate incipient-contour vector 2104. Two intermediate results, $\overline{S}_{(x,y,r)}$ 2108 and $H_{(x,y,r)}$ 2110 are generated for the candidate edge vector, where r is vector 2104 and is also referred to as the direction of the incipient edge, in which case the references is actually made to the orientation angle of the vector r. There are 10 pixels, including seed pixel 2102, that underlie the vector 2104 representing the candidate incipient contour. The value $\overline{S}_{(x,y,r)}$ is computed as the sum of the magnitudes of the projections of the vector associated with pixels $i_1$-$i_{10}$ divided by the cardinality of the set of pixels underlying the incipient contour. $H_{(x,y,r)}$ is a histogram 2112 in which the gradient orientations of the pixels underlying the incipient-contour vector are tabulated in histogram bins. As shown by expression 2114, the number of pixels recorded in each bin $H_i$ of the histogram corresponds to the number of pixels with gradient orientations within the range of orientations represented by the bin. The maximally valued bin 2116 generally corresponds to the overall gradient direction of the pixels underlying the incipient contour. When incipient contour is correctly oriented, the direction of the vector 2104 should be generally perpendicular to the gradient directions of the pixels underlying vector 2104.

Figure 22:
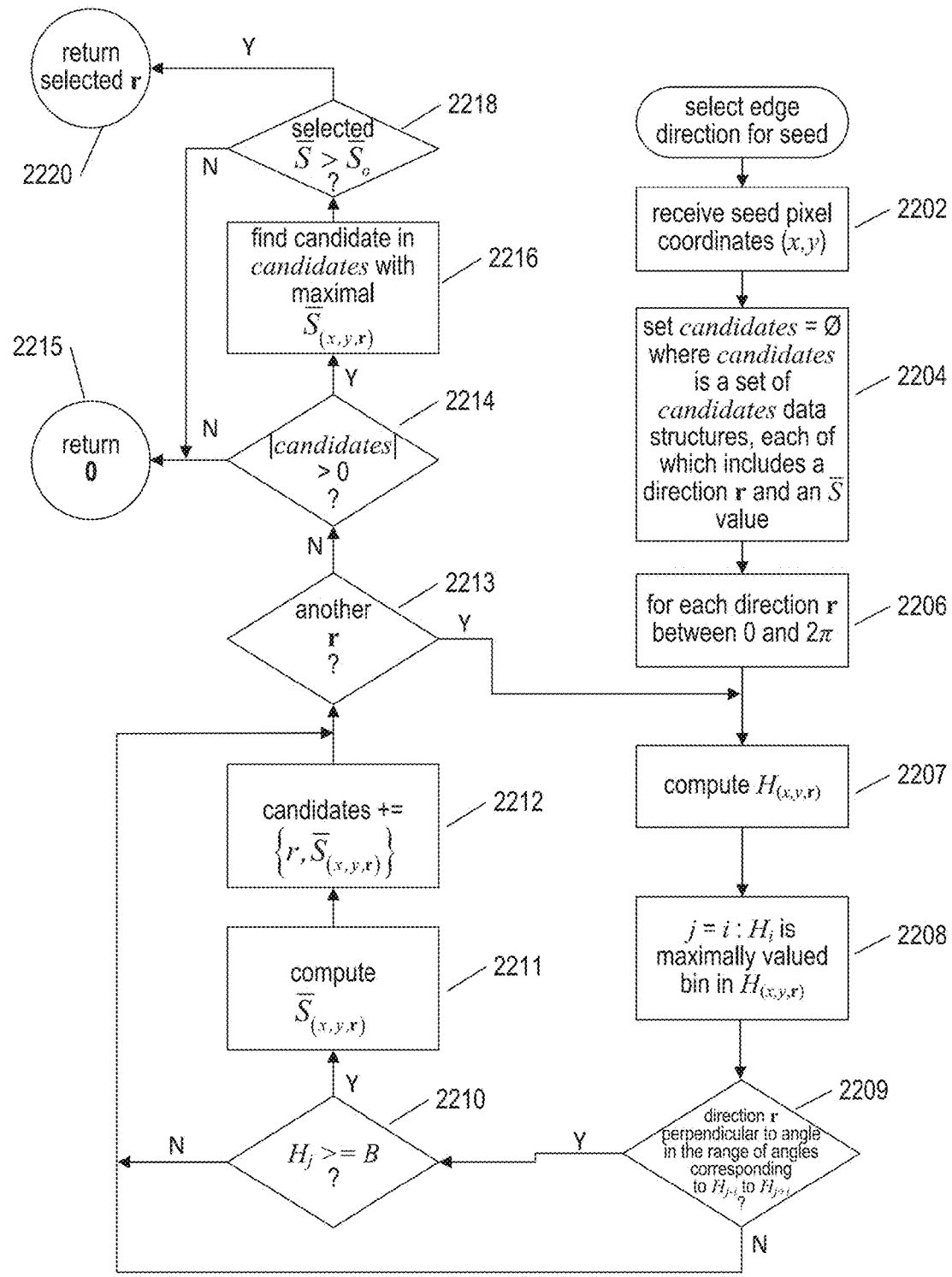
FIG. 22 illustrates a particular implementation of a contour-finding method and subsystem.

FIG. 22 provides a control-flow diagram for the edge-direction-selection process that selects an incipient contour direction for a seed pixel. In step 2202, the process receives the coordinates for the seed pixel. In step 2204, a candidate set is initialized to the empty set. The candidate set is a set of candidate data structures, each of which includes a direction r and an $\overline{S}$ value. In the for-loop of steps 2206-2213, each direction r between 0° and 360° is considered. Again, note that r is both considered to be a vector and a direction in the current discussion, where the direction is the orientation direction of vector r. In step 2207, the histogram $H_{(x,y,r)}$ is computed for the currently considered direction. The index j is set, in step 2208, to the index of the maximally valued bin in $H_{(x,y,r)}$. In step 2209, determination is made as to whether the direction r is perpendicular to an angle within the range of angles corresponding to the maximum valued bin and its adjacent neighbors. When the direction r is perpendicular to an angle in this range, then, in step 2210, a determination is made as to whether the value, or number of pixels assigned to, the maximally valued bin is greater than a threshold value B. When this is the case, then, in step 2211, the value $\overline{S}_{(x,y,r)}$ is computed for the currently considered direction and, in step 2212, an entry for the currently considered direction is added to the set candidates. Otherwise, the direction r is removed from the set of candidate directions. Upon completion of the for-loop of steps 2206-2213, when the cardinality of the set candidates is less than 0, as determined in step 2214, then the 0 vector is returned in step 2215 to indicate that no preferred contour direction can be determined for the seed pixel. Otherwise, in step 2216, the member of the set candidates with the greatest $\overline{S}_{(x,y,r)}$ value is selected. When the $\overline{S}$ value for the selected candidate is greater than a threshold value $\overline{S}_0$, as determined in step 2218, the direction r contained in the selected candidate is returned in step 2220. Otherwise, the 0 vector is returned, in step 2215 to indicate that no direction can be determined for the seed pixel. Thus, selection of an initial contour direction for a seed pixel involves selecting a direction that agrees with the directions of the gradient vectors of pixels in the neighborhood of the initial contour, when there is a consensus within the neighborhood with regard to the gradient direction.

Figure 23:
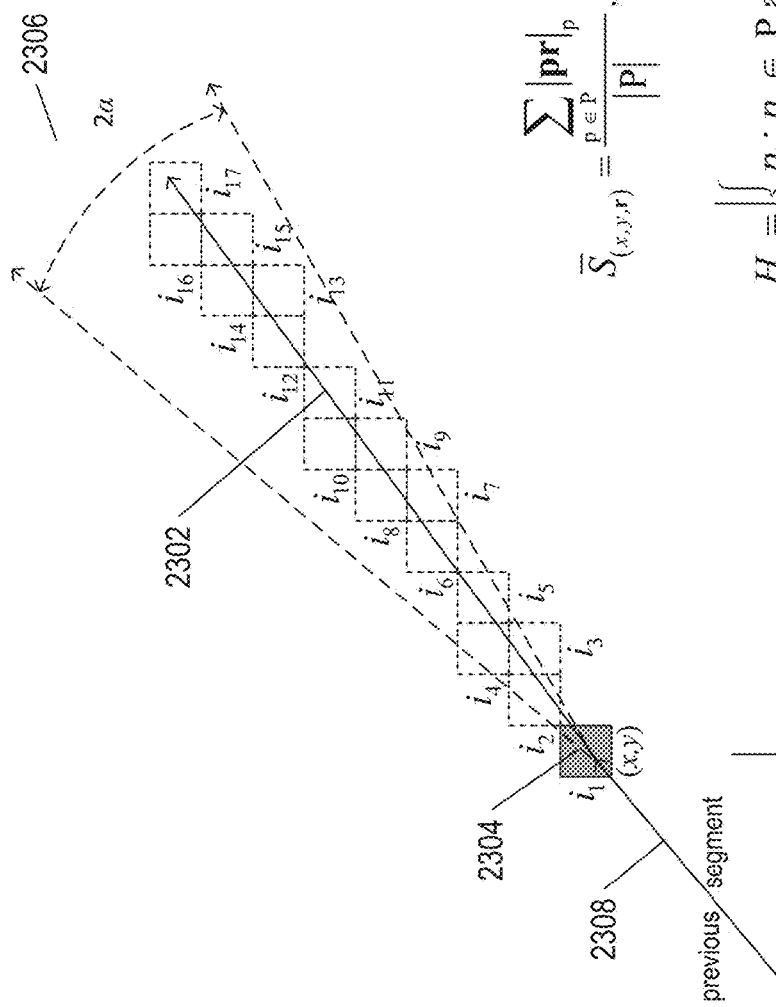
FIG. 23 illustrates a particular implementation of a contour-finding method and subsystem.
Figure 24:
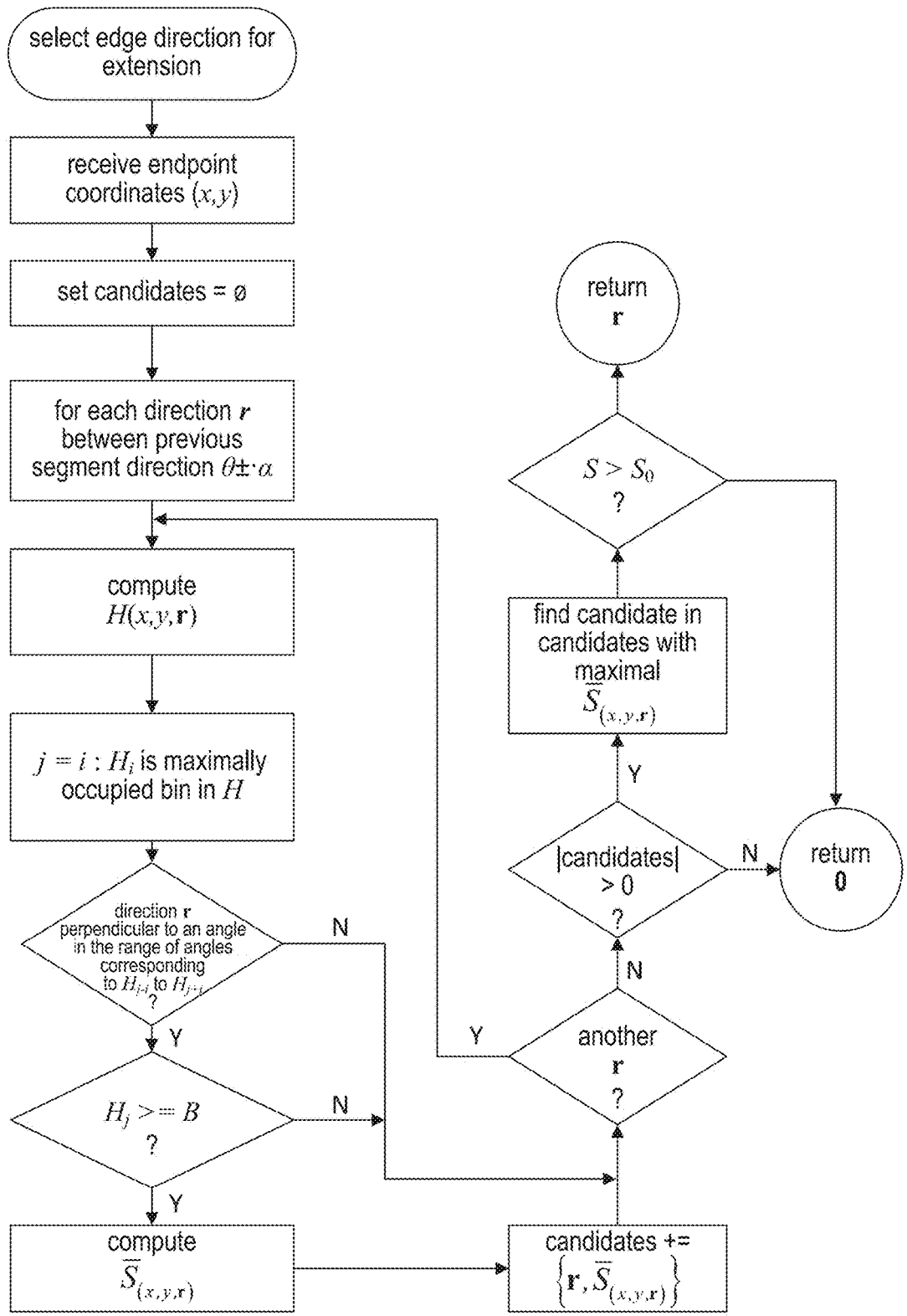
FIG. 24 illustrates a particular implementation of a contour-finding method and subsystem.

FIGS. 23 and 24 illustrate selection of a direction for an extension of a contour. The contour-extension-direction selection process is quite similar to the process for selecting initial contour directions for seed pixels, discussed above with reference to FIGS. 20-22. However, in the contour-extension process, a next vector of length L is extended from the endpoint pixel of a contour under construction rather than extending from a seed pixel in two opposite directions. In FIG. 23, a next candidate vector 2302 is shown extended from the endpoint pixel 2304 of a contour under construction. In this case, only directions within an angle 2α 2306 are considered as candidate directions. In other words, the next segment for the contour 2302 can be inclined with respect to the direction of the previous, already existing segment of the contour 2308 by up to an angle α. Otherwise, the direction-selection process is similar to that for selecting the direction of the initial vectors corresponding to an incipient contour for a seed pixel.

Figure 25:
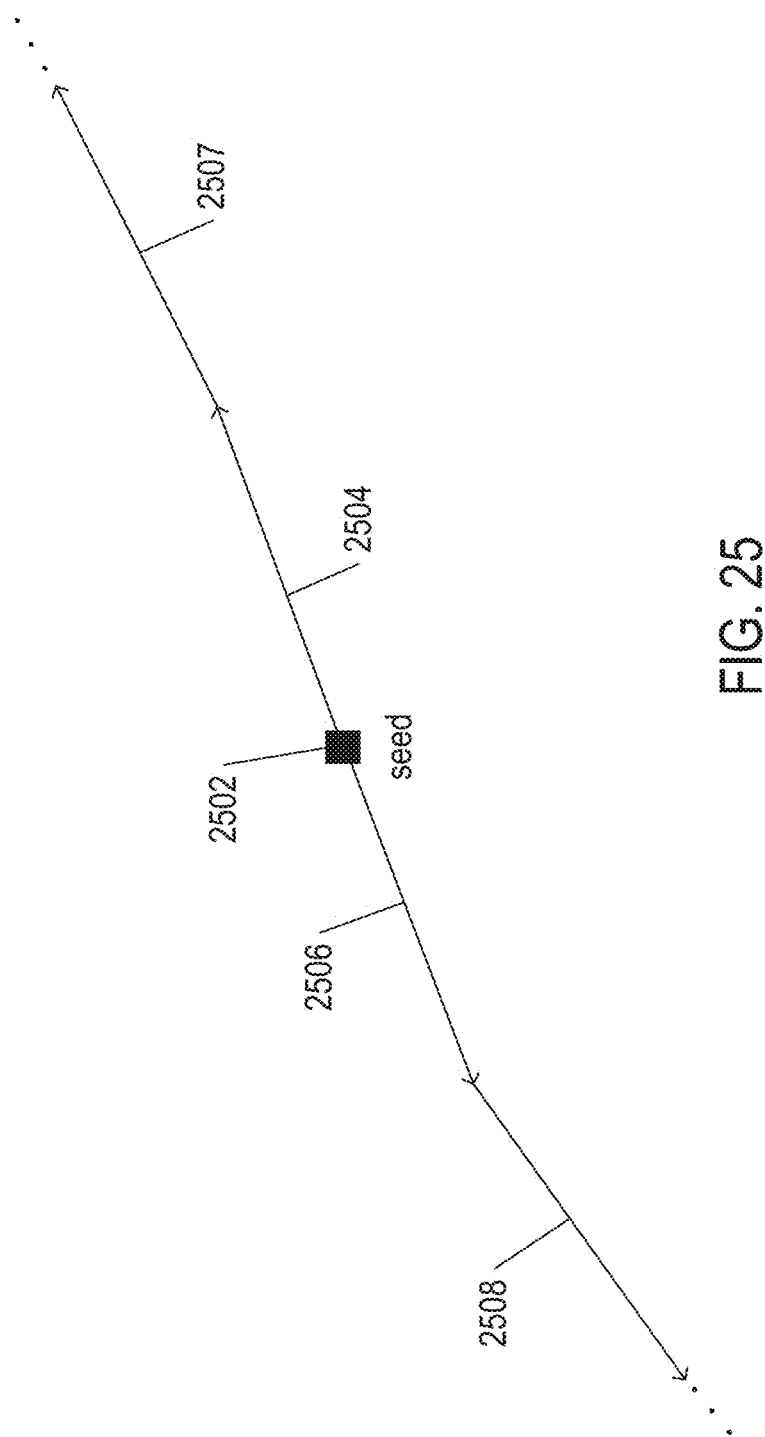
FIG. 25 illustrates a particular implementation of a contour-finding method and subsystem.

FIG. 25 illustrates the contour-construction process. The process starts with a seed pixel 2502. An initial vector 2504 is constructed to form an incipient contour with a direction selected as discussed above with reference to FIGS. 20-22. Then, the incipient contour is extended in each direction by successively adding extension vectors, such as vectors 2506-2508, to each end of the contour. When a direction for a next extension from a particular contour endpoint cannot be determined, then extension of the contour in that direction is terminated with the endpoint.

Figure 26:
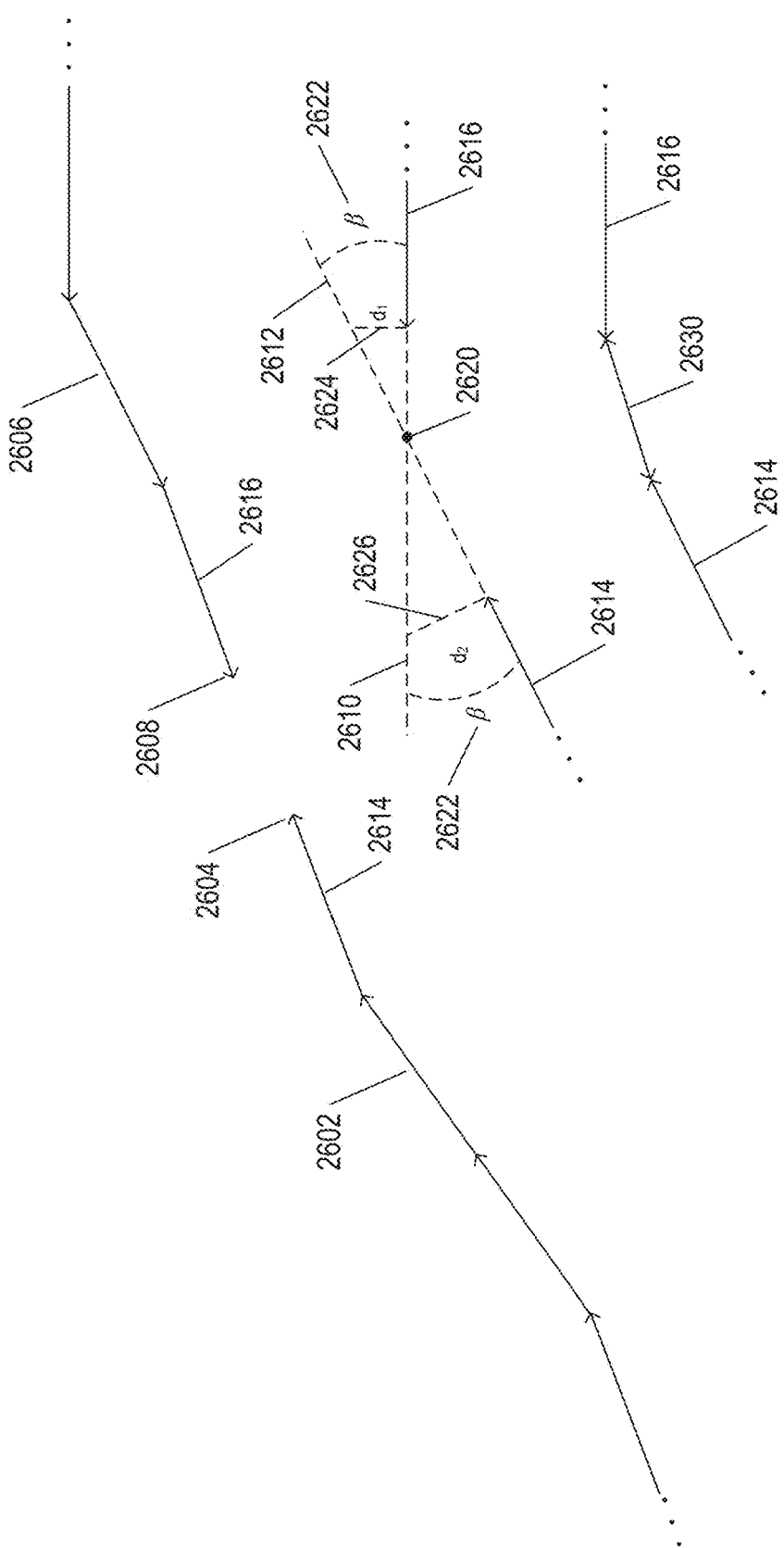
FIG. 26 illustrates a particular implementation of a contour-finding method and subsystem.

FIG. 26 illustrates the joining of two contours to form a single, result contour. In FIG. 26, a first multi-segment contour 2602 terminates at endpoint 2604 and a second multi-segment contour 2606 terminates at endpoint 2608. The first and second contours 2602 and 2606 may represent two discrete and distinct intensity edges within an image or may represent two portions of a single intensity edge with a gap separating the two portions. In the latter case, the two portions are joined to produce a single, continuous contour. In the joining process, the two contours are extended from their respective endpoints, as indicated by dashed vectors 2610 and 2612 extending from the final segments 2614 and 2616 of the first 2602 and second 2606 contours. The extension may be made by either using the direction of the final segment of each contour, preceding the endpoint, or may be made using an approximation method based on the directions of the final n segments in each contour. Many different approximation methods can be used, including linear-regression methods when the final portion of the contours appear to be linear and quadratic or cubic approximations when the final portions of the contours appear to be curved. The extensions intersect at a point 2620. The angle of the intersections, β 2622 and the perpendicular distances $d_1$ 2624 and $d_2$ 2626 are computed in order to determine whether or not to join the two contours. When the angle β does not exceed a threshold angle and when the minimum of the two distances $d_1$ and $d_2$ does not exceed a minimum distance, then a bridging segment 2630 is constructed to join the two contours to produce a single, result contour.

Figure 27A:
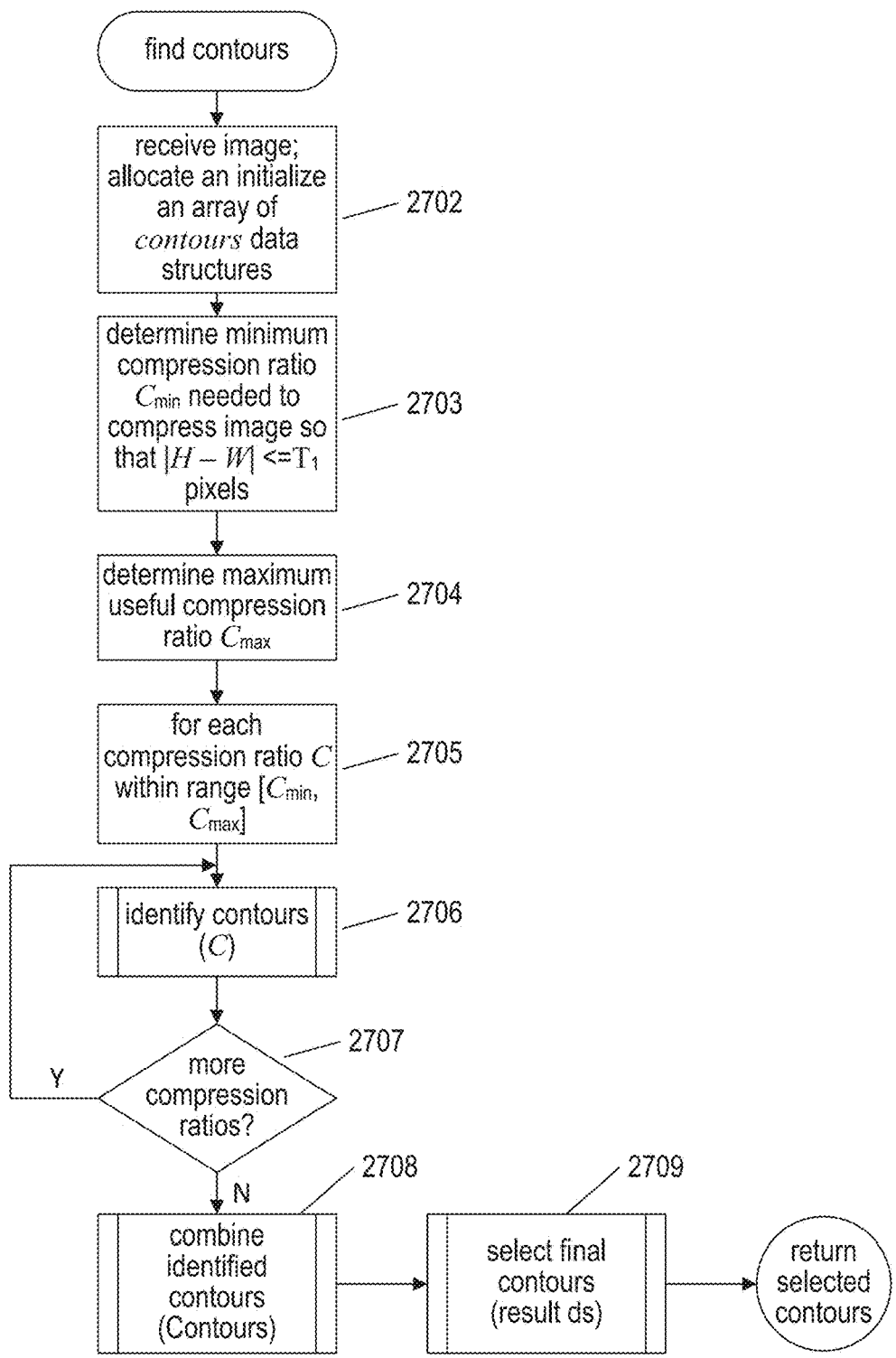
FIG. 27A illustrates, using control-flow diagrams and data-structure representations, one implementation of a contour-finding method and subsystem.

FIGS. 27A-G illustrate, using control-flow diagrams and data-structure representations, one implementation of a contour-finding method and subsystem. FIG. 27A provides a control-flow diagram for a routine "find contours." In step 2702, the digital image is received and an array contours of contour data structures is allocated and initialized. In step 2703, the minimum compression ration $C_{min}$ needed to compress the received image so that the difference between the height and width of the compressed image is less than a threshold number of pixels is determined. In step 2704, a maximum useful compression ration $C_{max}$ is determined. In the for-loop of steps 2705-2707, the routine "identify contours" is called to compress the original image by a compression ratio in the range [$C_{min}$, $C_{max}$] and identify contours within the compressed image. The number of compressed images generated may depend on a parameterized iteration compression-ratio interval, on the dimensions of the received digital image, and other factors. In certain cases, only a single compressed image is generated. In other cases, contours are identified in the original image, without compression, when the disparity and dimensions in the original image is less than the threshold number of pixels. In step 2708, the routine "combine identified contours" is called to combine the contours identified in the for-loop of steps 2705-2707. In step 2709, the routine "select final contours" is called in order to select a final set of contours as the identified contours for use in subsequent digital-image-processing processes.

Figure 27B:
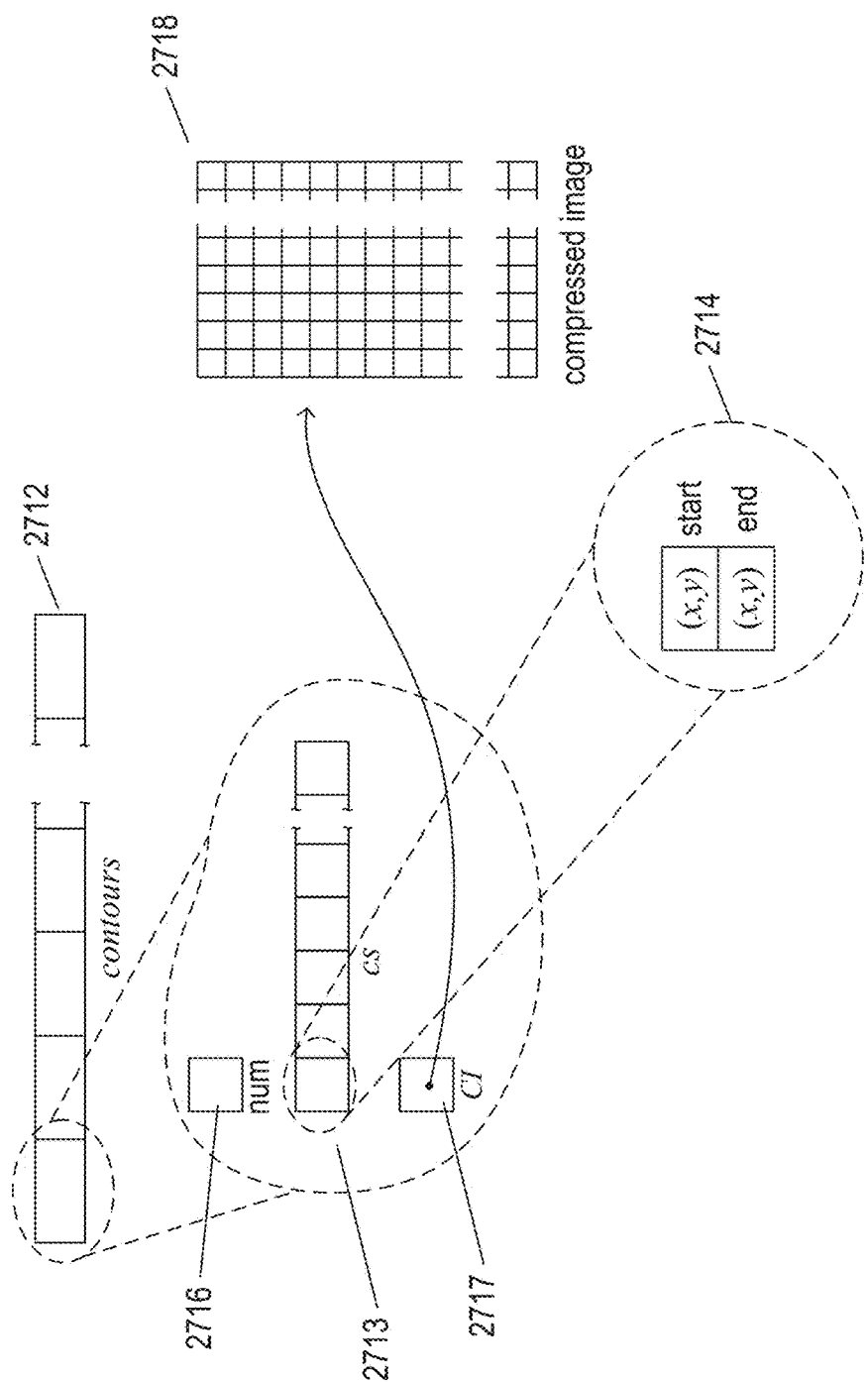
FIG. 27B illustrates, using control-flow diagrams and data-structure representations, one implementation of a contour-finding method and subsystem.

FIG. 27B shows a data structure used in the described implementation. The contours data structure 2712 is an array of contour data structures that each includes an array cs 2713 that stores the starting point and ending point 2714 for individual contours identified within a particular compressed image or, in certain cases, the original image. In addition, the contour data structure includes an indication of the number of found contours 2716 and a reference 2717 to the compressed image or, in certain cases, original image 2718 in which the contours are identified. This is, of course, merely one possible data structure used in one possible method to represent the contours identified in one or more digital images.

Figure 27C:
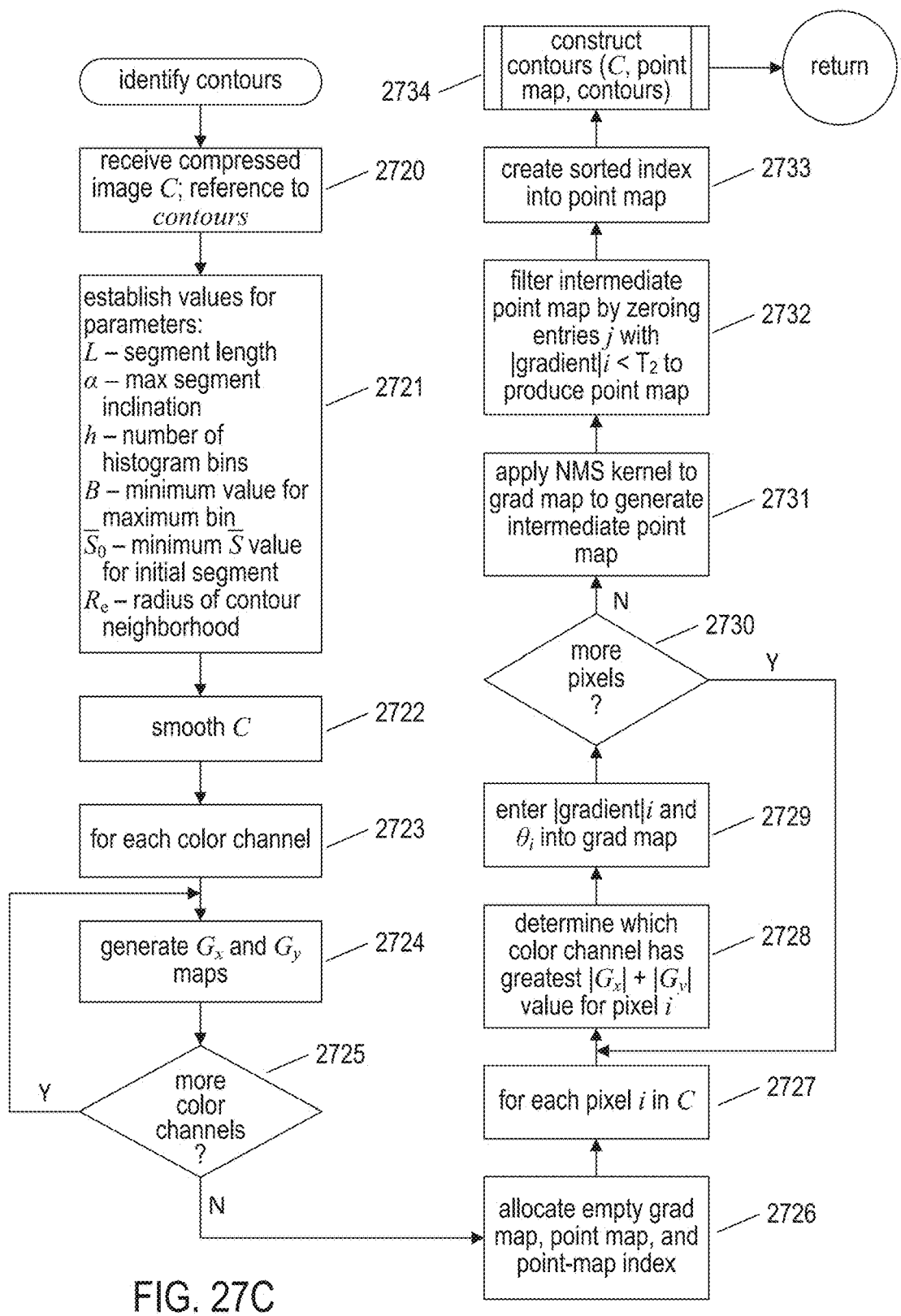
FIG. 27C illustrates, using control-flow diagrams and data-structure representations, one implementation of a contour-finding method and subsystem.

FIG. 27C provides a control-flow diagram for the routine "identify contours," called in step 2706 of FIG. 27A. In step 2720, an image, generally a compressed image C, is received and a reference to the data structure contours is received. In step 2721, values are established for a number of parameters that control contour identification. These include: (1) L, the length of segments used to construct contours; (2) α, the maximum inclination of a next segment from the direction of the current, final segment in a contour; (3) h, the number of histogram bins for the histograms $H_{(x,y,r)}$; (4) B, the minimum value for the maximum valued bin of a histogram; (5) $\overline{S}_0$, the minimum $\overline{S}$ value for an initial segment; and (6) $R_e$, the radius of a contour neighborhood. These values may be hard coded, obtained from a configuration file, or specified through a user interface.

In step 2722, the received image C is smooth, as discussed above with reference to step 1604 in FIG. 16. In the for-loop of steps 2723-2725 gradient-component maps for each of three color channels in the compressed image C are generated, as discussed above with reference to FIG. 16. In step 2726, a grad map and point map with index are allocated (1802 and 1812 in FIG. 18). In the for-loop of steps 2727-2730, a grad-map entry is entered into the grad map for each pixel i in the image C, as discussed above with reference to FIG. 16. In step 2731, an NMS kernel is applied to the grad map to generate an intermediate point map (1804 in FIG. 18). In step 2732, the intermediate point map is filtered to 0 entries j for which the gradient magnitudes are less than a threshold value (1806 in FIG. 18). In step 2733, a sorted index into the point map (1810 in FIG. 18) is created. Finally, in step 2734, the routine "construct contours" is called to construct contours coincident with certain of the seed pixels indicated by the point map generated in steps 2731-2733.

Figure 27D:
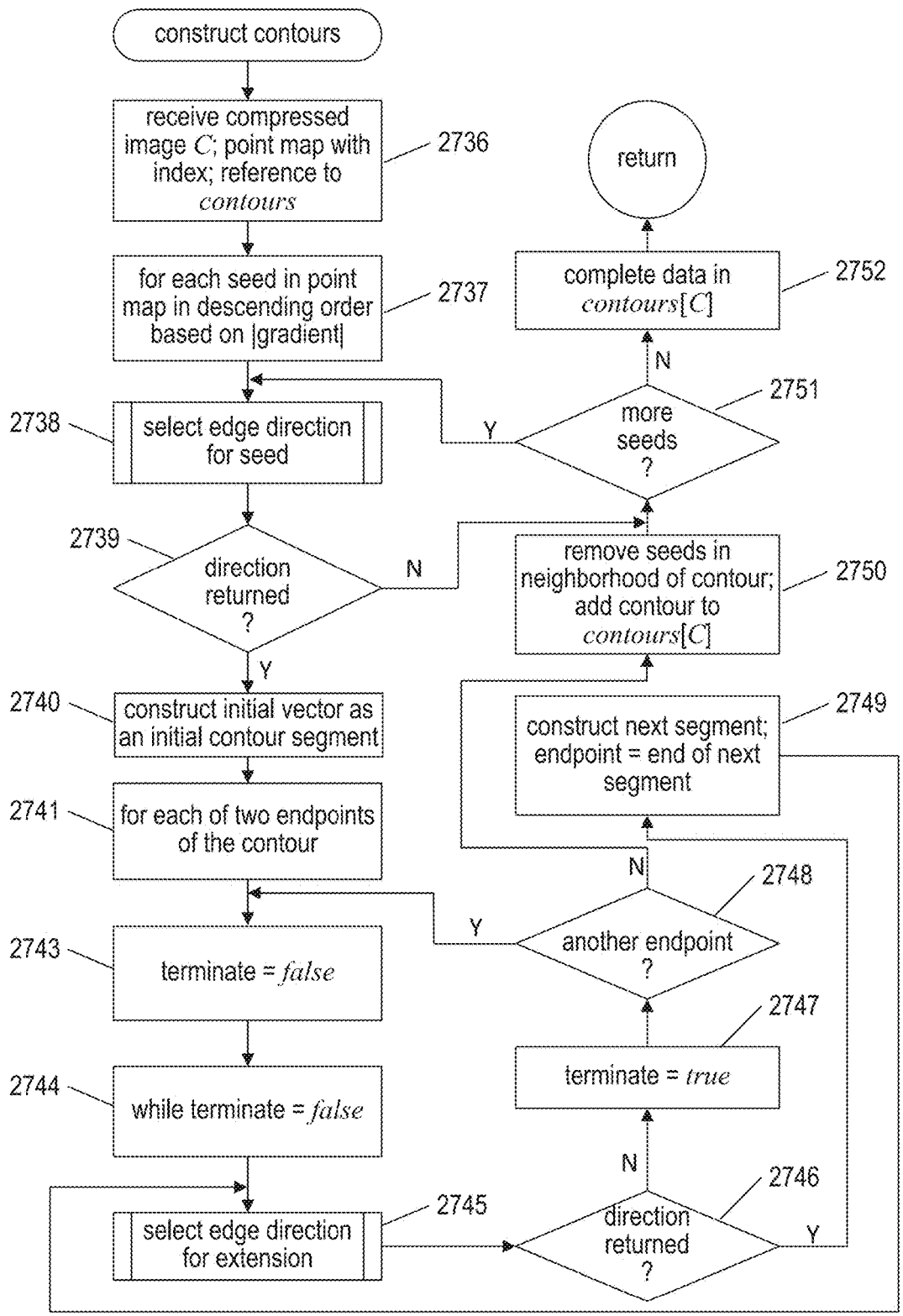
FIG. 27D illustrates, using control-flow diagrams and data-structure representations, one implementation of a contour-finding method and subsystem.

FIG. 27D provides a control-flow diagram for the routine "construct contours," called in step 2734 of FIG. 27C. In step 2736, the routine receives a compressed image C, a point map with index, and a reference to the contours data structure. In the for-loop of steps 2737-2751, each seed in the point map is considered in descending order based on gradient magnitude, by descending through the index associated with the point map. In step 2738, the routine "select edge direction for seed" is called to determine the direction for the incipient contour comprising the vector constructed to be coincident with the seed. Note that the routine "select edge direction for seed" is discussed above with reference to FIG. 22. When a direction is not returned, the current iteration of the for-loop of steps 2737-2751 ends and a next seed is considered. Otherwise, in step 2740, an initial vector is constructed from the seed according to the determined direction, as discussed above with reference to FIG. 19. In the inner for-loop of steps 2741-2749, the initial contour is extended, in both directions, via calls to the routine "select edge direction for extension" in step 2745. This routine is discussed above with reference to FIG. 24 and the overall process of contour construction is discussed above with reference to FIG. 25. Once a contour has been completed, any seeds in the neighborhood of the contour, defined by the radius Re, are removed from the point map and index to avoid initiating new contours too close to the current identified contour. Finally, after completion of the outer for-loop of steps 2737-2751, the contour data structure in the array contours is completed in step 2752.

Figure 27E:
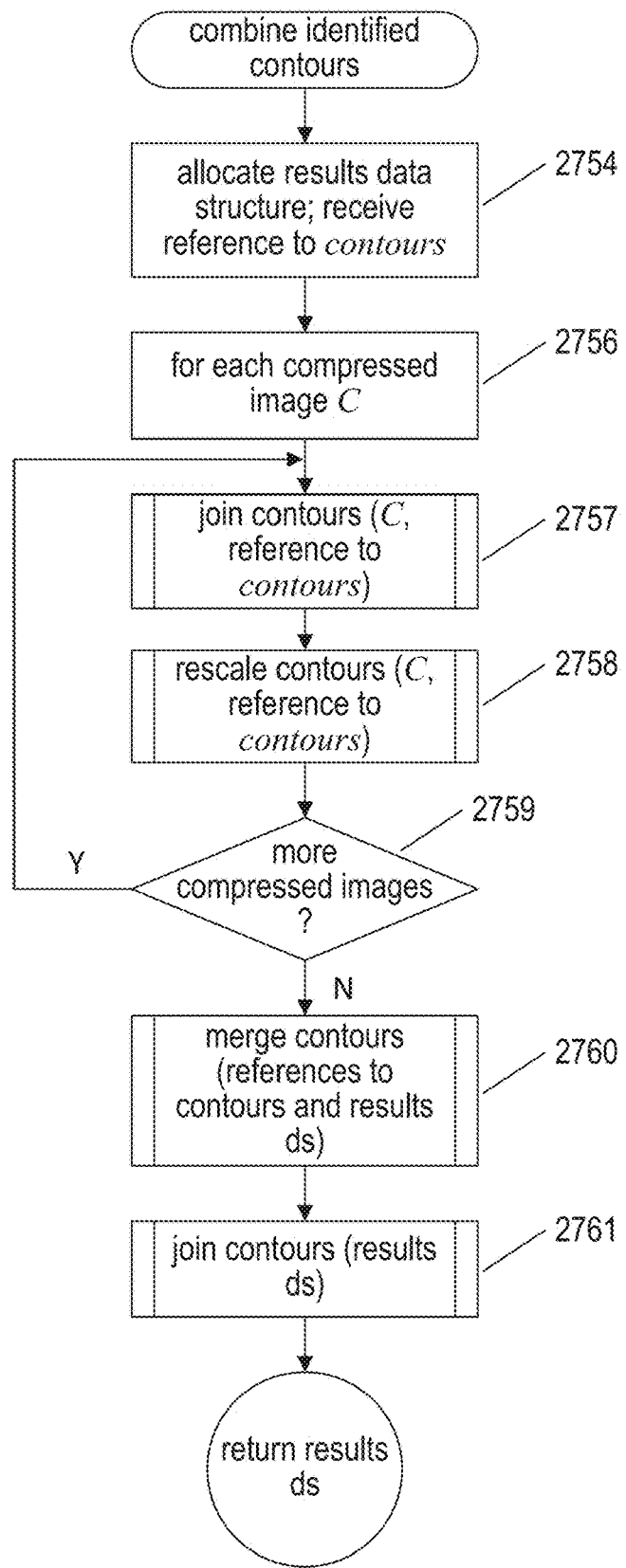
FIG. 27E illustrates, using control-flow diagrams and data-structure representations, one implementation of a contour-finding method and subsystem.

FIG. 27E provides a control-flow diagram for the routine "combine identified contours," called in step 2708 of FIG. 27A. In step 2754, a results data structure is allocated and a reference to the contours data structure is received. In the for-loop of steps 2756-2759, each contour data structure in the contours data structure is considered. Each contour data structure in the contours data structure corresponds to a particular compressed image or, in certain cases, the original image. In step 2757, the routine "join contours" is called to join together any portions of a longer contour separated by a gap, as discussed above with reference to FIG. 26, and the contours identified for the currently considered compressed image. In step 2758, the routine "rescale contours" is called to rescale the contours found in a compressed image back to the scale of the original image. In step 2760, the routine "merge contours" is called to merge together all of the contours found in all of the compressed images and, in step 2761, the merged contours, transferred to the results data structure, are joined by a call to the routine "join contours." Note that the routine "join contours" is assumed to be polymorphic, accepting either a reference to the contours data structure and a compressed-image index, as in the call in step 2757, or a single argument that references the results data structure.

Figure 27F:
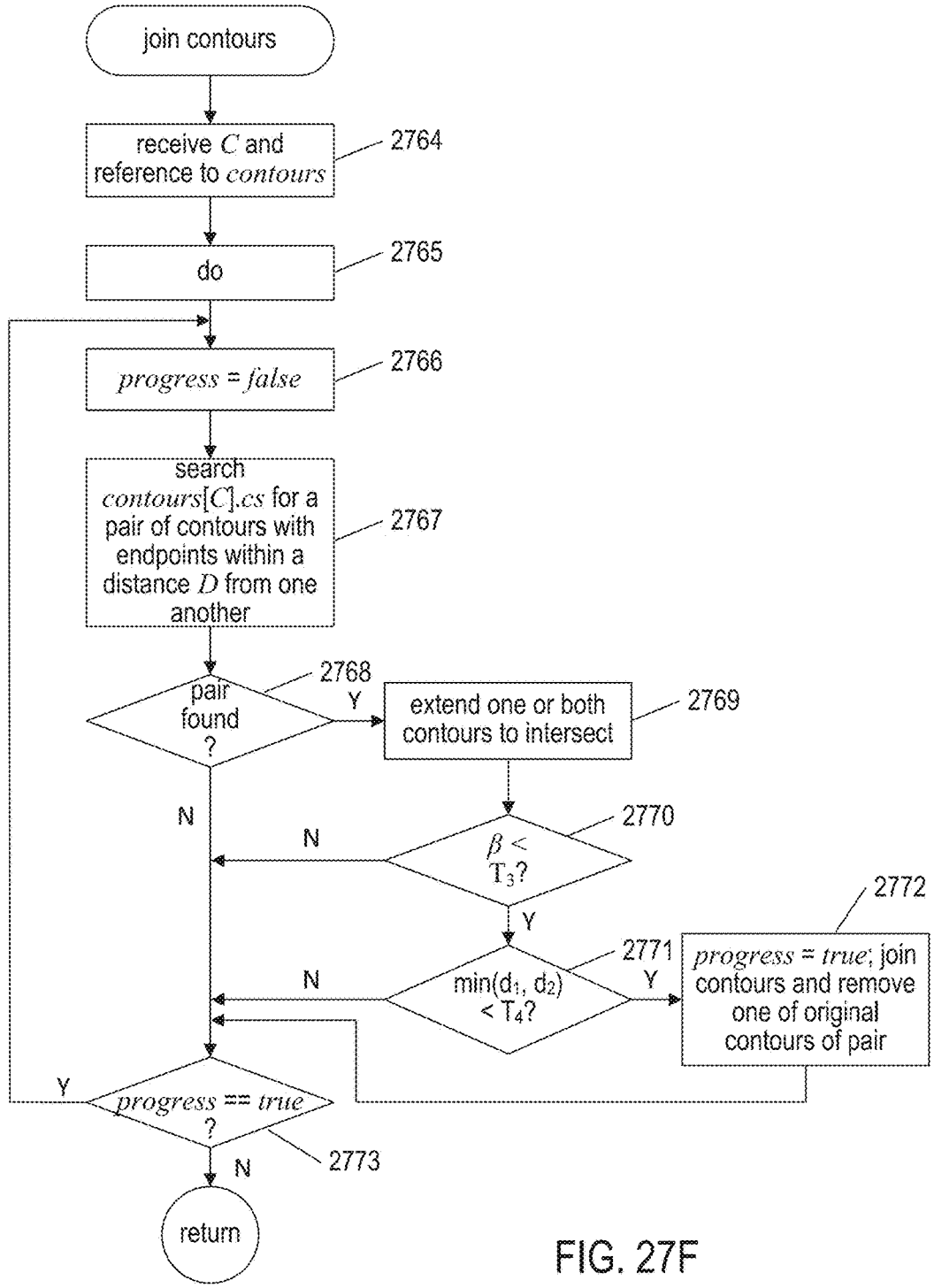
FIG. 27F illustrates, using control-flow diagrams and data-structure representations, one implementation of a contour-finding method and subsystem.

FIG. 27F provides a control-flow diagram for the routine "join contours" called in step 2757 of FIG. 27. In step 2764, the routine receives an indication of a compressed image C that is used as an index into the contours data structure, a reference to which is also received. In the do-while loop of steps 2765-2773, pairs of contours identified in the compressed image C are joined. In step 2766, a local variable progress is set to false. In step 2767, the identified contours are searched for a pair of contours with endpoints within a distance D from one another. Note that D may be parameterized, in certain implementations. When a next pair is found, as determined in step 2768, then, in steps 2769-2771, the considerations with respect to the endpoints and extensions of the two contours discussed above with reference to FIG. 26 are made to determine whether or not to join the two contours. When it is determined that the two contours are to be joined, then, in step 2772, the local variable progress is set to true, the two contours are joined, as discussed above with reference to FIG. 26, and one of the original contours of the pair are removed and the other is modified to represent the two joined contours. While the local variable progress continues to have the value true, as determined in step 2773, the do-while loop of steps 2766-2773 continues to iterate.

Figure 27G:
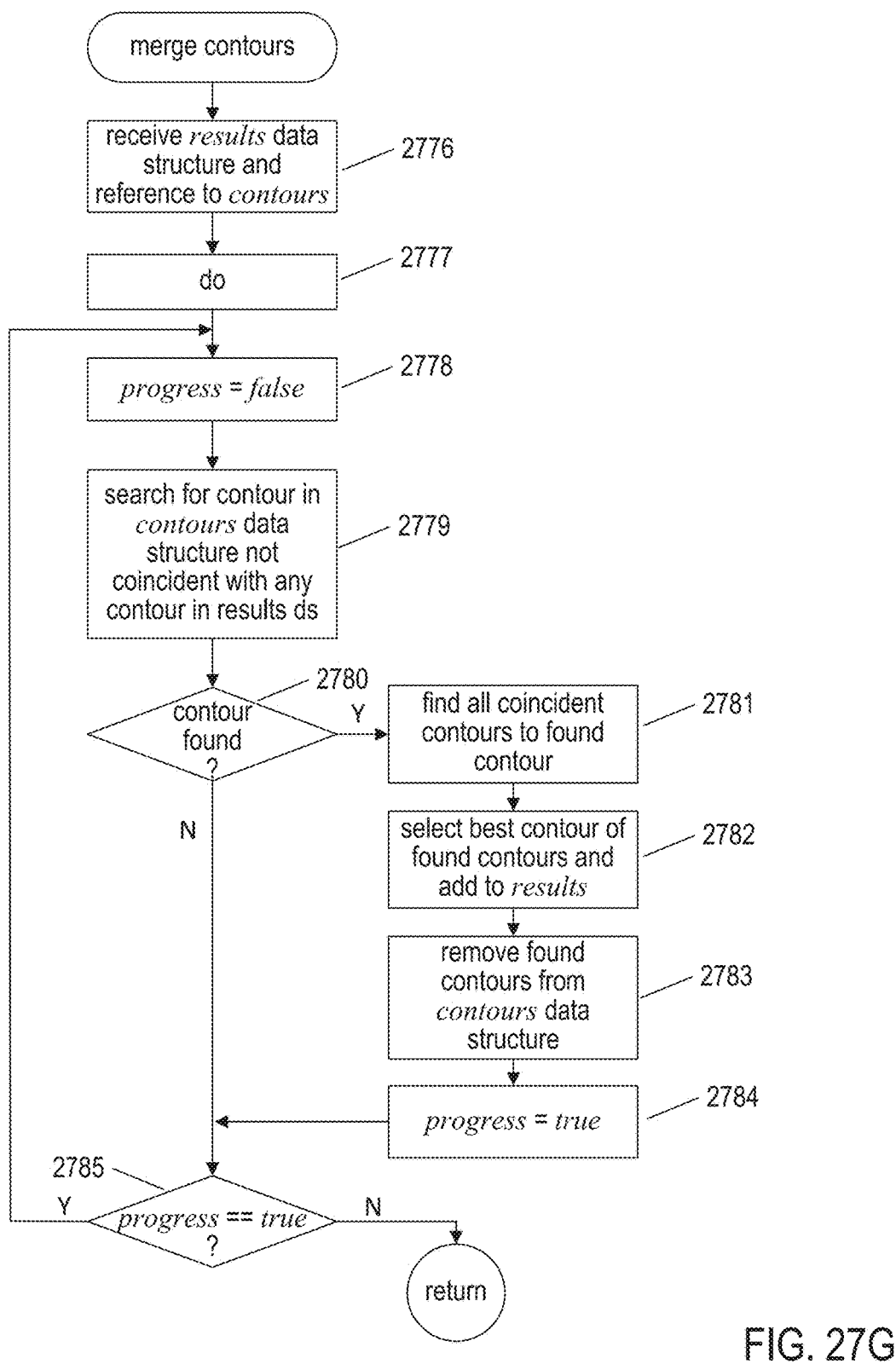
FIG. 27G illustrates, using control-flow diagrams and data-structure representations, one implementation of a contour-finding method and subsystem.

FIG. 27G provides a control-flow diagram for the routine "merge contours," called in step 2760 of FIG. 27E. In step 2776, the routine receives a reference to the results data structure and to the contours data structure. Then, in the do-while loop of steps 2777-2785, contours identified in compressed images are merged into the results data structure. In step 2778, the local variable progress is set to false. In step 2779, a next contour that is not coincident with any contour already in the results data structure is search for in the contours identified in the compressed images. When such a contour is found, as determined in step 2780, then in step 2781, all contours coincident with the found contour in the identified contours of the compressed images are found. The best of these found contours are selected, in step 2782, and added to the results data structure. The initially found contour and coincident contours are then removed from the contours data structure in step 2783. In step 2784, the local variable progress is set to true. The do-while loop iterates until the value of the local variable progress is false, in step 2785.

Methods and Systems to which the Current Document is Directed

Figure 28:
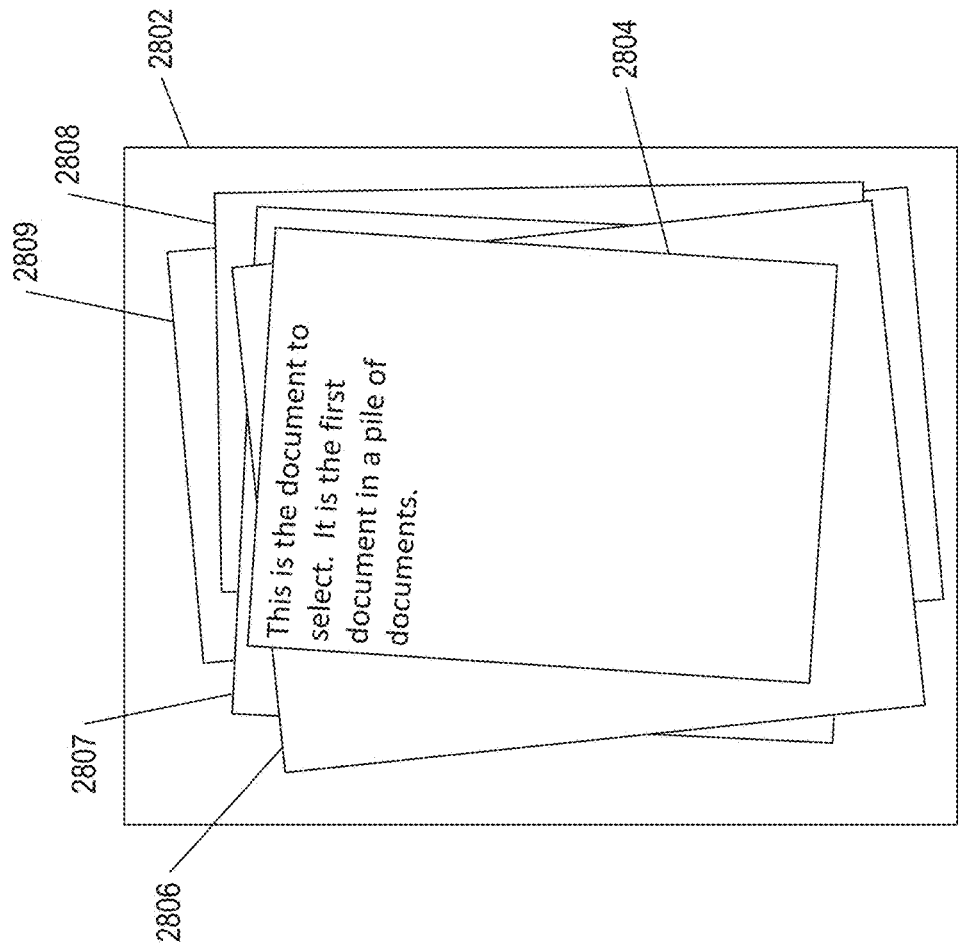
FIG. 28 illustrates an example image-processing scenario in which an automated image-processing system attempts to identify a document sub-image within a digital image.

FIG. 28 illustrates an example image-processing scenario in which an automated image-processing system attempts to identify a document sub-image within a digital image. In FIG. 28, the digital image 2802 shows a document 2804 lying on top of a stack of additional sheets of paper 2806-2809. The automated digital-image-processing system may, for example, be a subcomponent of an automated text-recognition system that seeks to identify text-containing documents within digital images and to generate electronic documents that correspond to the text-containing documents. It should be noted, at the onset, that the currently disclosed methods and systems can identify document sub-images with non-linear edges, including documents distorted during the imaging process, due to perspective and other optical effects, documents physically distorted by crumpling or folding, and documents that have curved edges in their normal, physical form. In the current example, both the text-containing document 2804 and the underlying sheets of paper 2806-2809 have linear edges, for ease of illustration and clarity of description, but images of documents with non-linear edges are readily recognized by the document-recognition processes discussed below.

Figure 29:
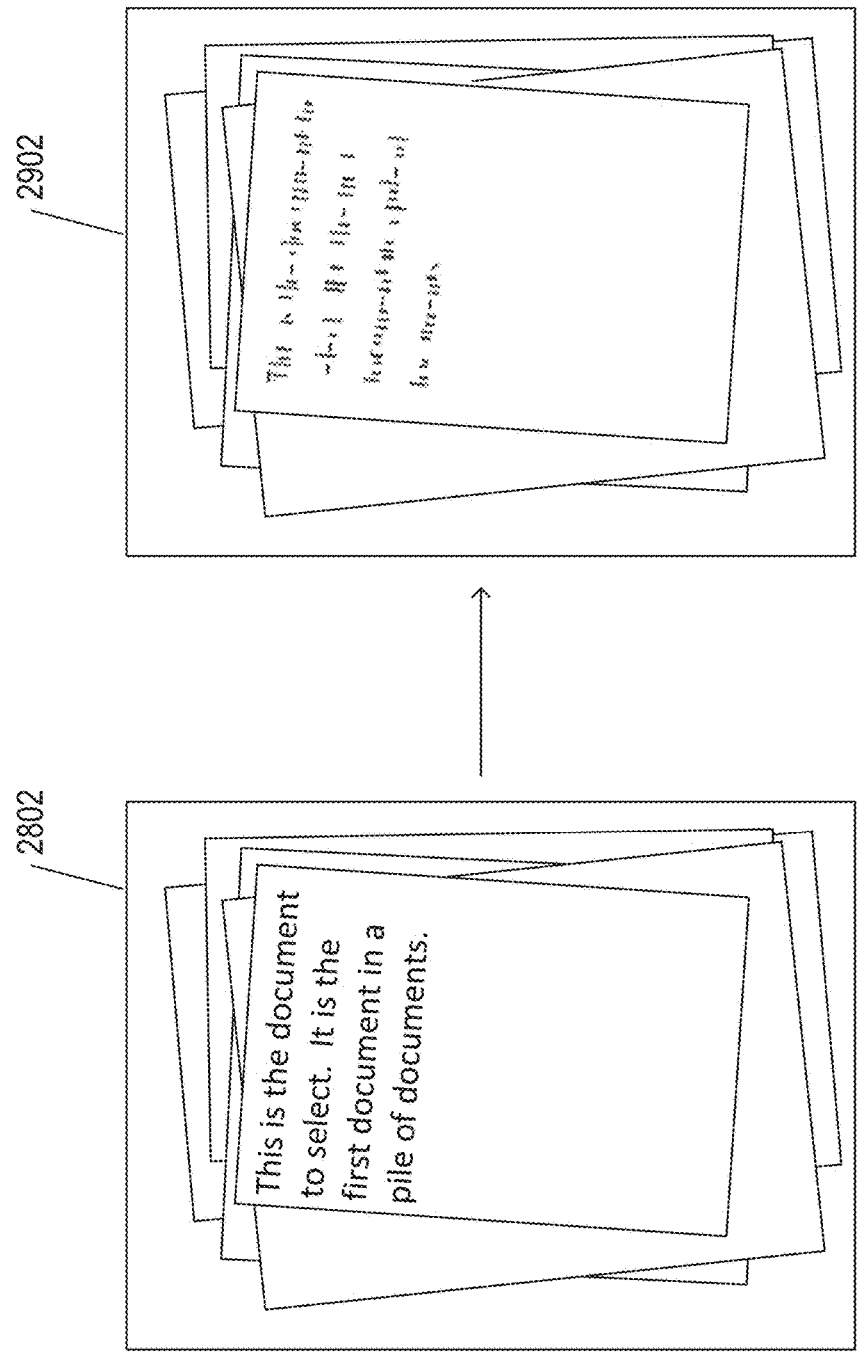
FIG. 29 shows a first step in the automated document-recognition process.

FIG. 29 shows a first step in the automated document-recognition process. The contour-finding methods and systems, discussed in a preceding subsection, are applied to the received digital image 2802 to produce a map or data structure 2902 that contains contours corresponding to intensity edges in the original image 2802. The values of parameters input to the contour-finding methods and systems are adjusted to identify contours most likely to correspond to the edges or portions of edges of documents. In this case, for example, sharply curved contours, such as the contours associated with curved text letters, such as the letter "s," are not identified as a result of the parameter values employed.

Figure 30:
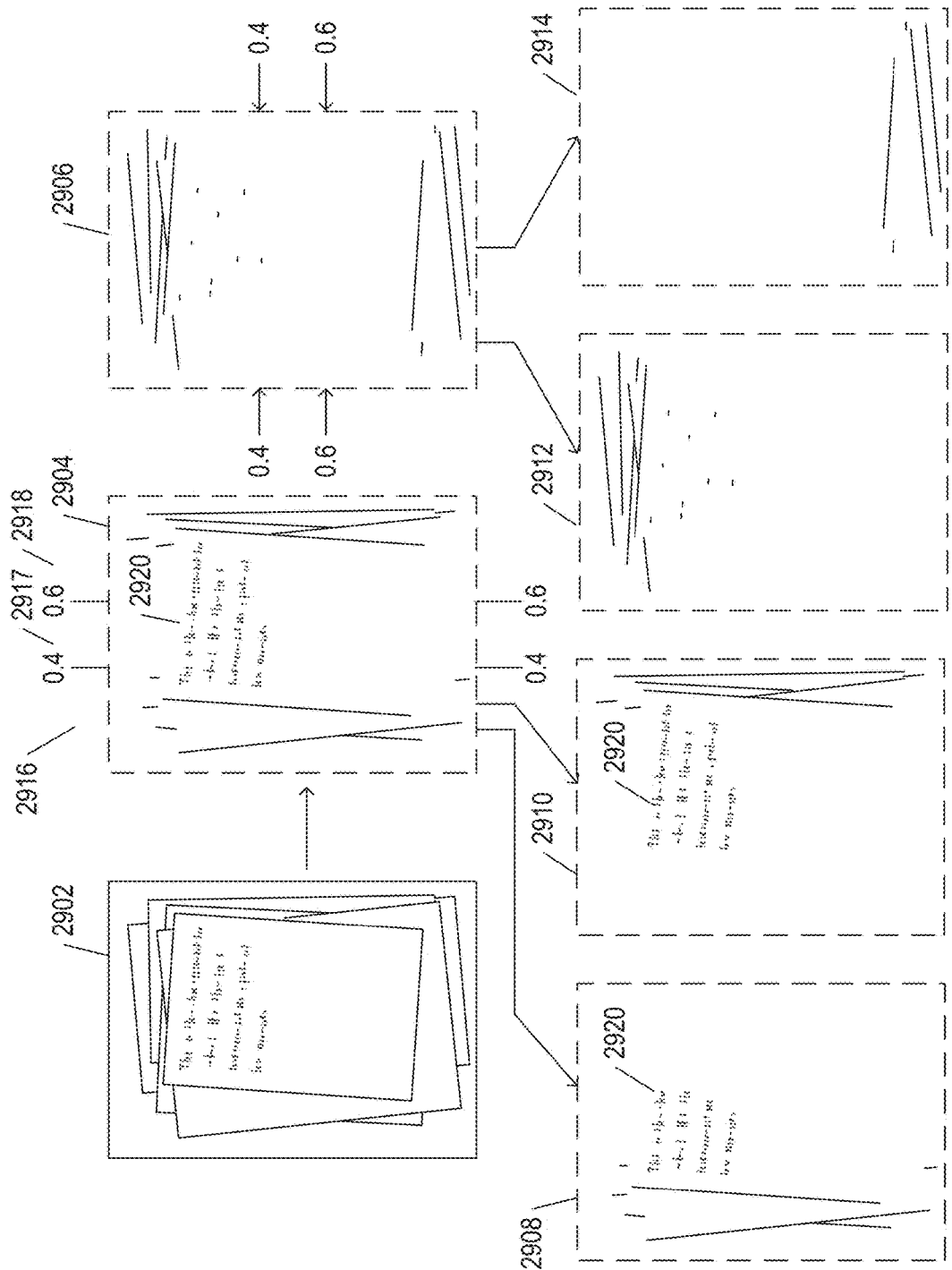
FIG. 30 illustrates two additional steps in the document-image-recognition process.

FIG. 30 illustrates two additional steps in the document-image-recognition process. The contours obtained by application of the contour-finding process 2902 are partitioned into a first set of contours 2904 that are predominately vertically oriented and a second set of contours 2906 that are predominately horizontally oriented. As one example, those contouring having an orientation direction of between 45° and 135° are considered to be vertically oriented, in one implementation, while contours with orientation directions from 0° to 45° and from 135° to 180° are considered to be horizontally oriented. An orientation direction can be obtained for curved lines by using one of many possible methods for fitting a line to a curved line, including commonly used linear-regression methods or simpler geometrical methods, such as approximating a curved line by a line coincident with the endpoints of the curved line or coincident with points near the endpoints of the curved line. The orientation direction for the curved line is then approximated as the orientation direction for the line fitted to the curved line.

Next, as also shown in FIG. 30, the predominantly vertically orientated contours 2904 are partitioned into left-side contours 2908 and right-side contours 2910. Similarly, the predominantly horizontally oriented contours 2906 are positioned into upper contours 2912 and lower contours 2914. In one implementation, these operations do not constitute a strict partitioning, since certain of the contours may end up in both partitions. In one implementation, the horizontal edge of the predominately vertically oriented contour map 2904 is divided into three vertical sections 2916-2918 defined as follows: (1) a left-hand section 2916 from x=0.0 to 0.4, where x is the coordinate for a horizontal Cartesian axis for the digital image; (2) a central region 2917 from x=0.4 to 0.6; and (3) a right-hand region 2918 from x=0.6 to 1.0. Note that the x coordinates are relative coordinates with respect to a digital-image width of 1.0. The left-hand contours 2908 are those predominately vertically oriented contours in the contour map 2904 contained in the left-hand and central vertical regions 2916 and 2917. The right-hand contours 2910 are those predominately vertically oriented contours that occur in the central 2917 and right-hand 2918 regions of the predominately vertically oriented contour map 2904. As a result of this non-strict partitioning, for example, the small set of contours 2920 occur in the right-hand-contours map 2908 and the left-hand-contours map 2910. A similar division of the vertical axis of the predominately horizontally orientated contour map 2906 is used to generate the upper 2912 and lower 2914 contour maps from the set of predominately horizontally oriented contours 2906.

It should be noted that, for ease of illustration and visual clarity, the sets of contours 2904 and 2906 produced by the first partitioning of the contours of the four sets of contours 2908, 2910, 2912, and 2914 produced by the second non-strict partitioning are shown as images or maps. They may, however, be represented electronically as data structures that include the coordinates of the endpoints of each contour, and may be represented in many other ways, as well. In the following discussion, the four non-strict partitions 2908, 2910, 2912, and 2914 are referred to as "contour sets," and, in particular, are referred to as the "left contours set" 2908, the "right contours set" 2910, the "upper contours set" 2912, and the "lower contours set" 2914.

In a next step, the four contour sets are filtered and sorted by contour length or, alternatively, by the number of pixels contained within the contours. The top n contours of each contour set are retained for subsequent processing, where n is a parameter. In one implementation, n is equal to 10. Selection of the top n contour candidates may be based on length, the number of pixels within the contour, or other such criteria. In certain implementations, these criteria are combined with additional criteria, including the average gradient magnitude for pixels within the contour, a measure of the uniformity of the gradient direction within the contour, and other such criteria. In addition, color information from the original digital image may be used in alternative filtering processes.

Figure 31:
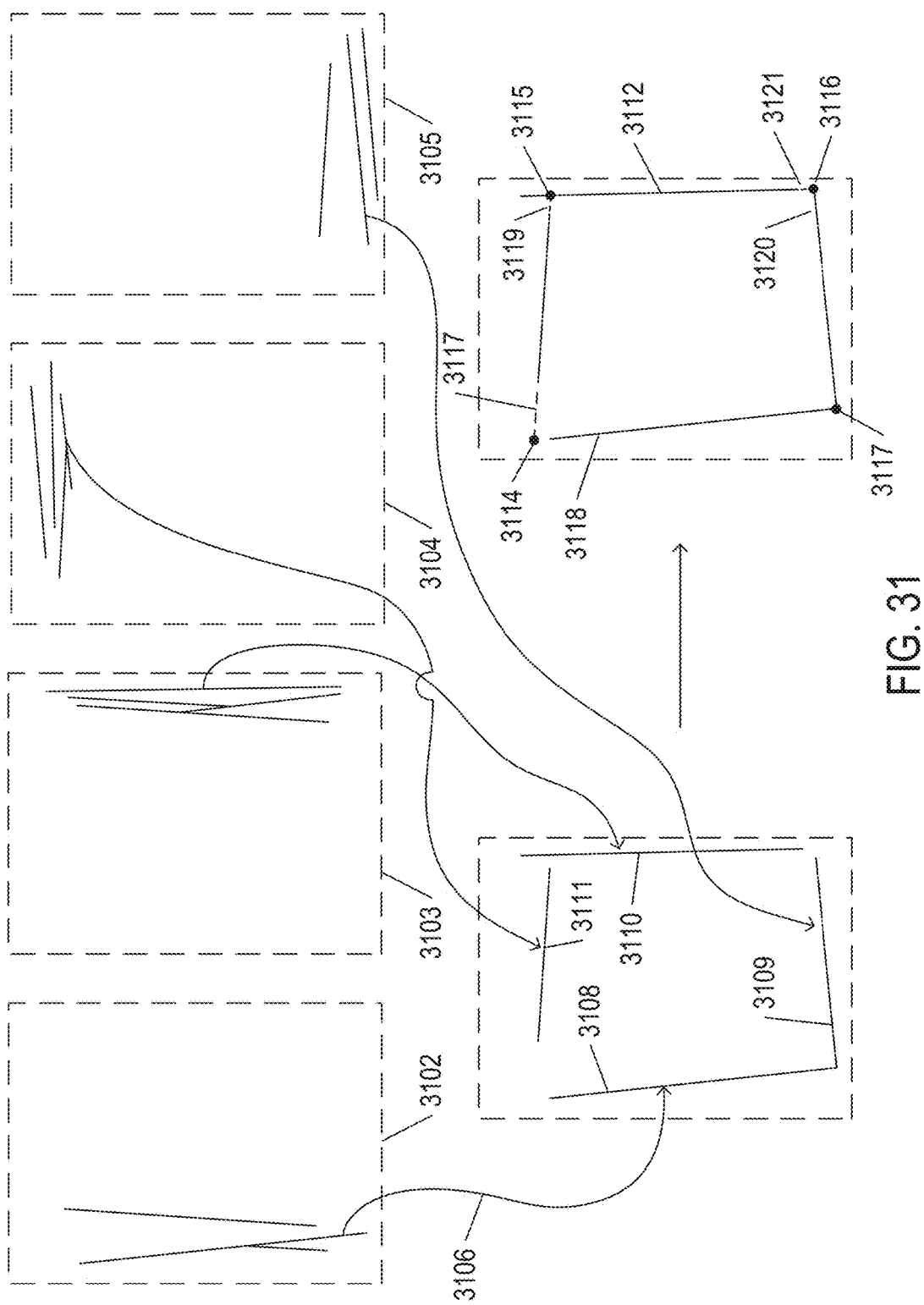
FIG. 31 illustrates hypothesis generation based on the four contour sets discussed with reference to FIG. 30.

FIG. 31 illustrates hypothesis generation based on the four contour sets discussed with reference to FIG. 30. In FIG. 31, the four contour sets are represented by the four contour maps 3102-3105. Again, the contour sets may be represented by data structures, maps, or any of many other types of representations of a set of contours. Also, again, it should be emphasized that the contours may be curved lines as well as straight lines. A hypothesis is generated by selecting one contour, from each contour set, and then constructing a polygon from the selected contours. In FIG. 31, curved arrows, such as curved arrow 3106, indicate selection of a contour from each contour set to produce the arrangement of contours 3108-3111 shown in the left, bottom portion of FIG. 31. Then, contours are extended, as necessary, to form a polygon 3112 with four vertices 3114-3117. Dashed lines, such as dashed lines 3117-3121, represent extension of the contours to form the polygon. These extensions can be obtained by any of various contour-extension techniques, including determining a best-fitting line to a curved contour using linear-regression methods, geometric extension, in which a curved segment is extended along a line connecting two points within the curved segment, or by other methods for fitting lines to curves. Linear segments are straightforwardly extended along the same orientation direction as the linear segment from either or both ends. It should be noted that, although the constructed polygon in FIG. 31 resides entirely within the boundaries of the original image, extension of contours may result in the polygon residing partly outside the boundaries of the original image. For example, contour extension of two roughly perpendicular contours may result in constructing a vertex beyond the edge of the original image. A polygon in which a portion of the edges and vertices lie outside the boundaries of the original image are allowed, under constraints discussed below. In general, the currently disclosed methods and systems construct all possible hypotheses or, in other words, all possible combinations of four contours, each selected from a different contour set, and evaluate the hypotheses in order to select a best candidate document outline.

Figure 32:
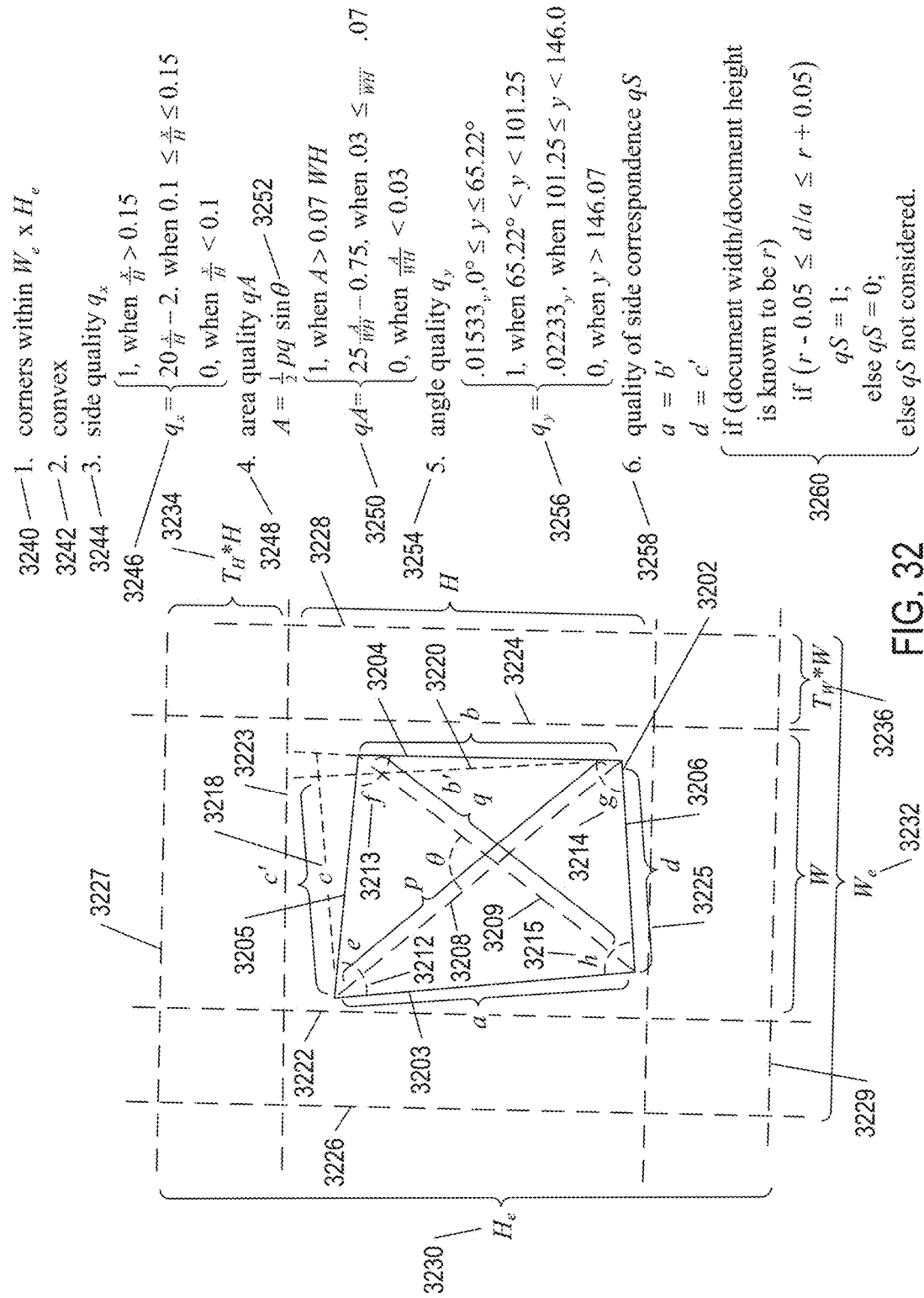
FIG. 32 illustrates a number of candidate-selection considerations and criteria.

FIG. 32 illustrates a number of candidate-selection considerations and criteria. The candidate hypothesis 3202 is a four-sided polygon, or quadrilateral, with sides of lengths a 3203, b 3204, c 3205, and d 3206. The polygon 3202 has two diagonals 3208 and 3209 of lengths p and q. The polygon has four angles e 3212, f 3213, g 3214, and h 3215. In addition, the hypothesis, or polygon 3202, can be straightened into a rectangle having sides of length c' 3218 and b' 3220, as indicated by dashed lines in FIG. 32. The dashed-line rectangle with sides 3222-3225 constitutes the original border of the digital image. This original border is extended, in the geometrical construction shown in FIG. 32, to a rectangle, shown with dashed lines 3226-3229, with height $H_e$ 3230 and width $W_e$ 3232. This extension may be parameterized using the parameters $T_H$ 3234 and $T_W$ 3236, as indicated in FIG. 32.

In the right-hand side of FIG. 32, six different criteria for evaluating a hypothesis are listed. A first criteria 3240 is that the corners of the polygon lie within the larger rectangle of height $H_e$ and width $W_e$, having sides 3226-3229. The second criteria 3242 is that the polygon needs to be convex. A convex polygon has all interior angles less than 180° and is a polygon such that a line segment connecting any two arbitrarily positioned points on the boundary of the polygon does not contain any points exterior to the polygon. A side-quality metric $q_x$ 3244 is computed for each side x of the polygon. This metric has one of three values:

$$1, 20\frac{x}{H} - 2, \text{ and } 0,$$

depending on the ratio x/H, as shown in the expression 3246 in FIG. 32. An area quality metric 3248 is similarly computed, as indicated by expression 3250, from the area of the polygon 3252. The area quality metric qA has one of three values $$1, 25\left(\frac{A}{WH}\right) - 0.75, \text{ and } 0,$$

and 0, depending on the value of the ratio $$\frac{A}{WH}.$$

An angle quality metric $q_y$ 3254 is computed for each angle y of the polygon according to expression 3256. The angle quality metric $q_y$ can take four values that range from 1 to 0, with higher values assigned to angles closer to 90°. A quality metric for side correspondence qS 3258 is computed according to pseudocode 3260 when the ratio of the document width to document height $$\frac{W}{H}$$

is known. In essence, the metric for quality of side correspondence qS has a value 1 when the ratio of the width to height of the straightened polygon, or rectangle, is close to the known document-width to document-height ratio and otherwise has a value of 0.

Figure 33:
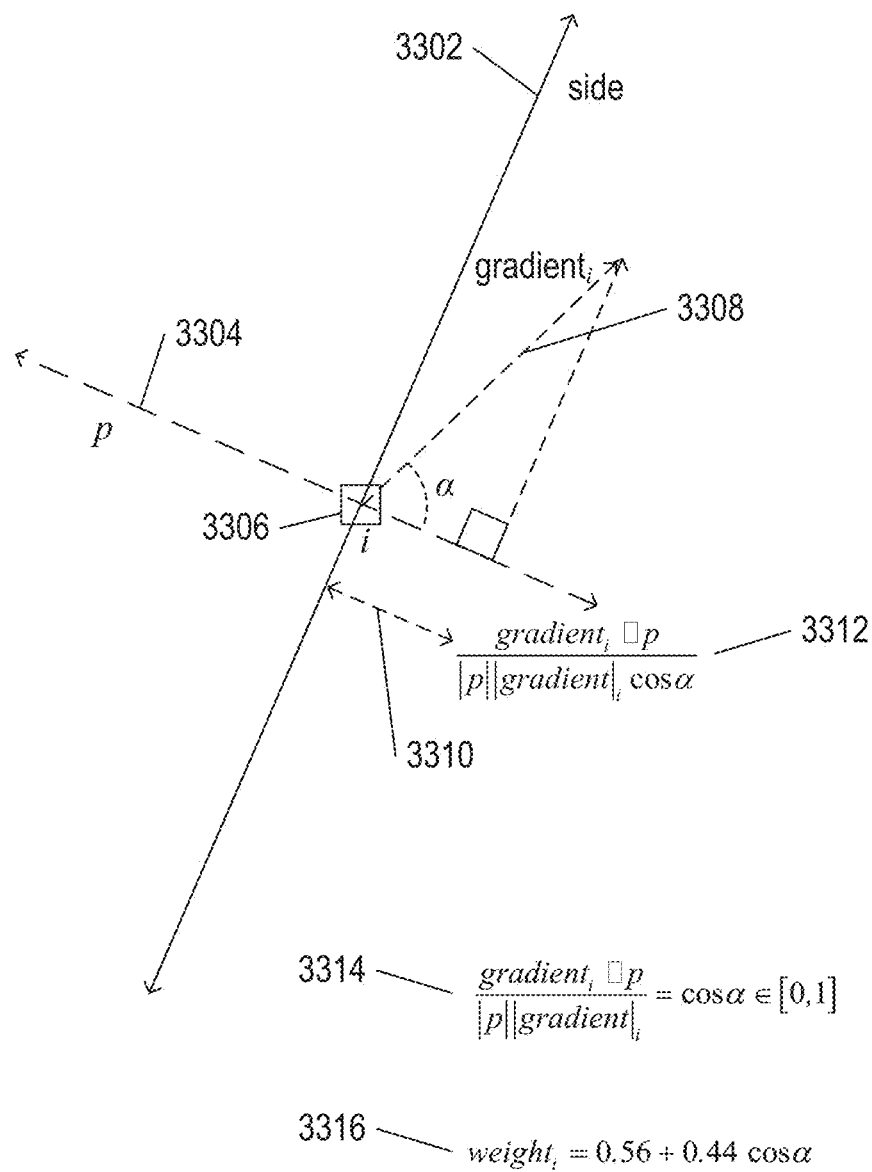
FIG. 33 illustrates computation of a side-weight metric value for the hypothesis.
Figure 34:
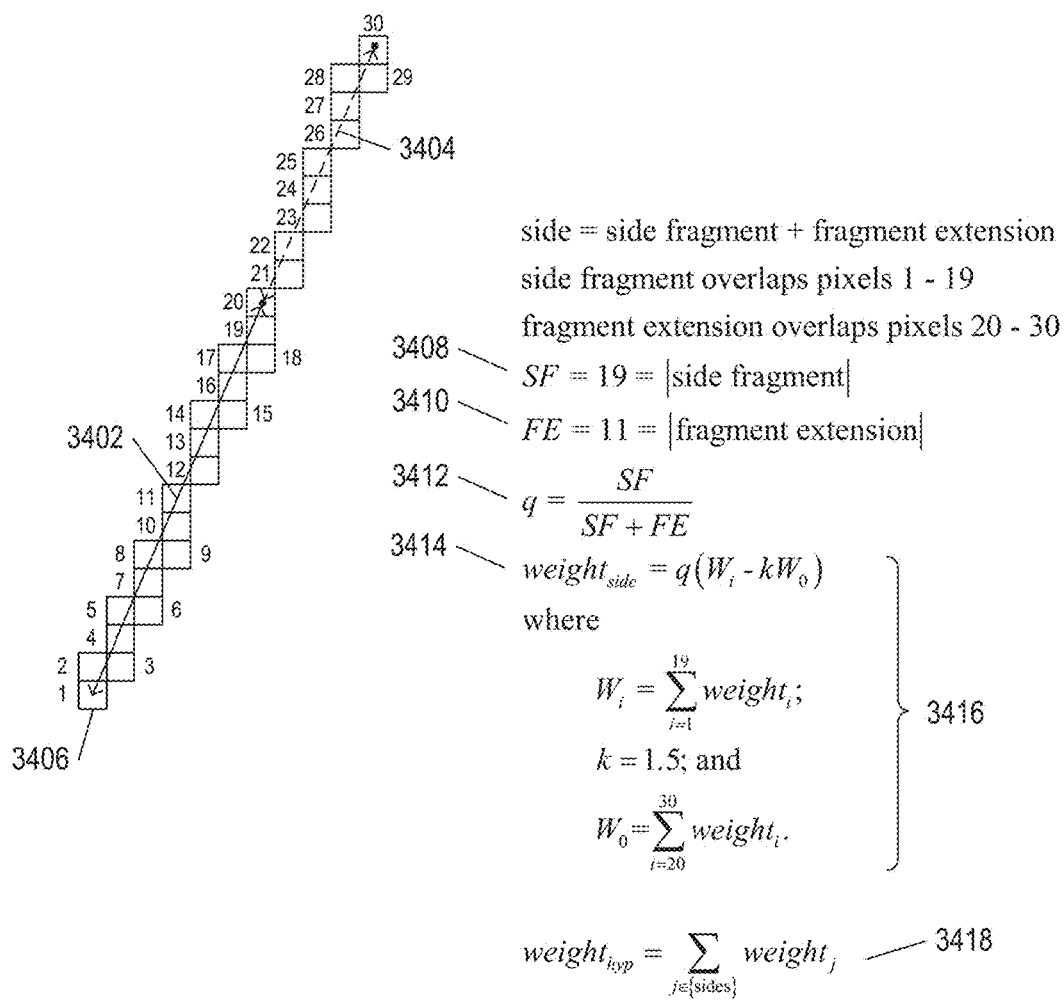
FIG. 34 illustrates computation of a side-weight metric value for the hypothesis.

FIGS. 33-34 illustrate computation of a side-weight metric value for the hypothesis. FIG. 33 illustrates computation of a weight for a pixel lying within or along one side of a hypothesis. Double-headed arrow 3302 represents the orientation of the side of the hypothesis and dashed double-headed arrow 3304 is a direction p perpendicular to side 3302. A pixel i 3306 lies along the side 3302 of the hypothesis. The pixel is associated with a gradient vector, $gradient_i$ 3308, as discussed in the preceding section. The length of the projection of the gradient 3308 onto a vector p having a direction equal to direction p can be computed from the dot product of the gradient and p, as indicated by expression 3312 in FIG. 33. The angle α 3314 between the gradient associated with the pixel and the direction p is computed by expression 3314 and serves as a numeric indication of how closely the orientation of the gradient of the pixel corresponds to the direction p, having a value 0 when the gradient direct and direction p are perpendicular and the value 1 when the gradient and direction p are parallel. The value of the angle α can then be used in expression 3316 to compute a weight, weight, for a given pixel i. The closer the gradient associated with the pixel corresponds to a direction perpendicular to the side of the polygon, the greater weight associated with the pixel.

FIG. 34 illustrates computation of a cumulative weight, $weight_{hyp}$, for a hypothesis. In FIG. 34, the side of a hypothesis is represented by a solid double-headed arrow 3402 and a dashed double-headed arrow 3404. Arrow 3402 represents a contour and dashed arrow 3404 represents extension of the contour in order to create a hypothesis. The arrow is superimposed over a number of pixels, shown with dashed lines, such as pixel 3406, of the original image. The number of pixels overlapped by the contour portion of the side, 3402, is equal to SF 3408, which has the numeric value 19 in the example shown in FIG. 34. The number of pixels overlapped by the extension portion of the side FE 3410 has the value 11 in the example shown in FIG. 34. The ratio q 3412 is the ratio SF to SF+FE. The weight for the side, weight$_{side}$ 3414 is computed by expression 3416. The metric weight$_{side}$ has a value based on weights of the pixels of the contour $W_i$ and the weights of the pixels associated with the extension portion of the side $W_O$. The side weight metric weight$_{hyp}$ for a hypothesis is the sum of the weights computed for the sides 3418. Alternatively, the average pixel weight can be used to for the values $W_i$ and $W_O$.

FIGS. 35A-E provide control-flow diagrams that illustrate one implementation of the document-identification method and system to which the current document is directed. In step 3502, a digital image that is either an image of a document or that contains a sub-image of a document is received. In step 3503, parameter values are established for finding contours within the received image according to the contour-finding method and system discussed in the previous subsection of the current document. Then, the routine "find contours," discussed above, is called, in step 3504, to find contours within the digital image. In step 3505, the identified contours are partitioned into vertical and horizontal contour sets (2904 and 2906 in FIG. 30, respectively). In step 3506, the vertical contour set is non-strictly partitioned into left and right contours sets (2908 and 2910 in FIG. 30). In step 3507, the horizontal contour set is non-strictly partitioned into upper and lower contours sets (2912 and 2914 in FIG. 30). In step 3508, the contour sets are filtered and sorted by length, by the number of pixels coincident with each contour, or by other or additional criteria. When the received image is associated with information that specifies the size-location, and orientation of one edge of the document, as determined in step 3509, the contour set corresponding to that edge of the document is replaced with the known side in step 3510. As one example, the received image may be an automated passport photo in which the passport has a predetermined position within the digital image, with the top edge of the passport horizontally oriented in position at a known relative distance from the top boundary of the digital image. In step 3511, the routine "select document" is called to identify the image or sub-image of a document within the received digital image. When a document is selected by a call to the routine "select document" as determined in step 3512, a pointer to the description of the document is returned in step 3513. Otherwise, a null pointer is returned in step 3514.

Figure 35A:
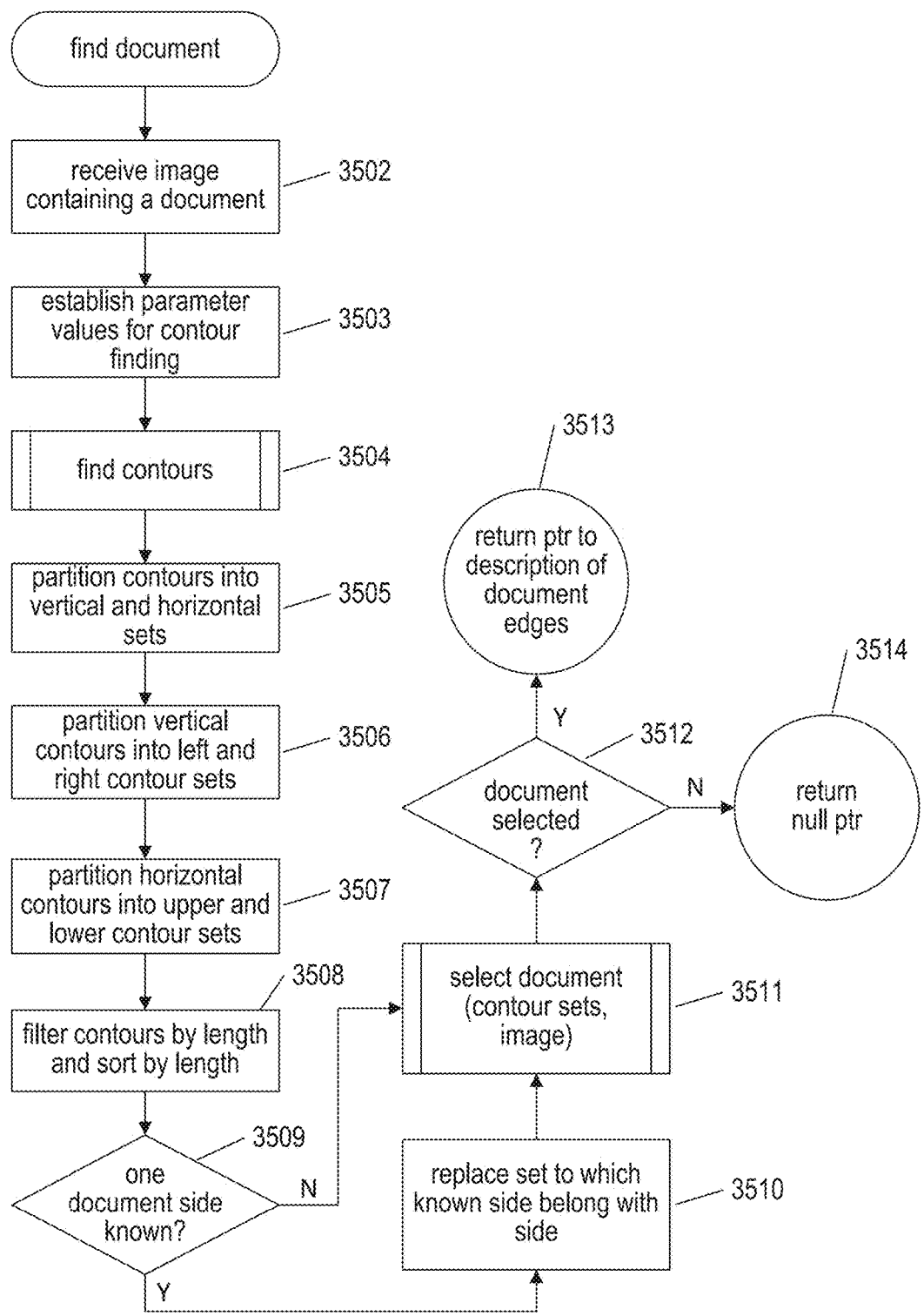
FIG. 35A provides control-flow diagrams that illustrate one implementation of the document-identification method and system to which the current document is directed.
Figure 35B:
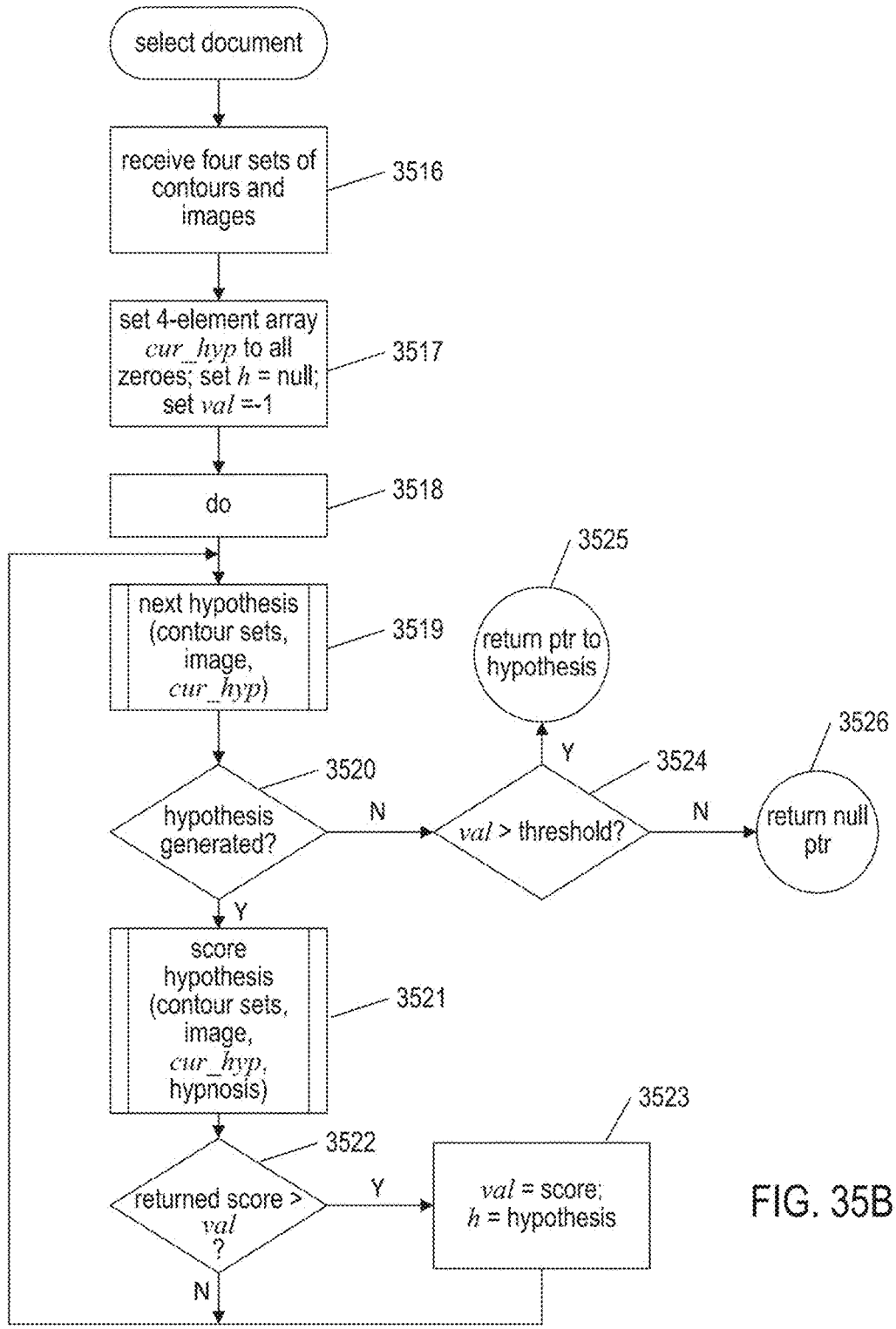
FIG. 35B provides control-flow diagrams that illustrate one implementation of the document-identification method and system to which the current document is directed.

FIG. 35B provides a control-flow diagram for the routine "select document," called in step 3511 of FIG. 35A. In step 3516, the routine "select document" receives four sets of contours, prepared in steps 3504-3510 in FIG. 35A, and the originally received image. In step 3517, a four-element array cur_hyp is initialized to all zeroes, a pointer h is set to null, and the local variable val is set to −1. Then, in the do-while loop of steps 3518-3523, the routine "select document" iteratively calls a routine "next hypothesis," in step 3519, to generate a next hypothesis. When a hypothesis is generated, as determined in step 3520, the routine "select document" scores the hypothesis via a call to the routine "score hypothesis," in step 3521, saving the score and a pointer to the generated hypothesis, in step 3523, when the score returned by the routine "score hypothesis" is greater than the value stored in local variable val, as determined in step 3522. When no further hypotheses are generated, as determined in step 3520, and when the current value stored in local variable val is greater than a threshold value, as determined in step 3524, a pointer to the best generated hypothesis is returned in step 3525. Otherwise, a null pointer is returned in step 3526. The best hypothesis, in the described implementation, has the score with greatest magnitude.

Figure 35C:
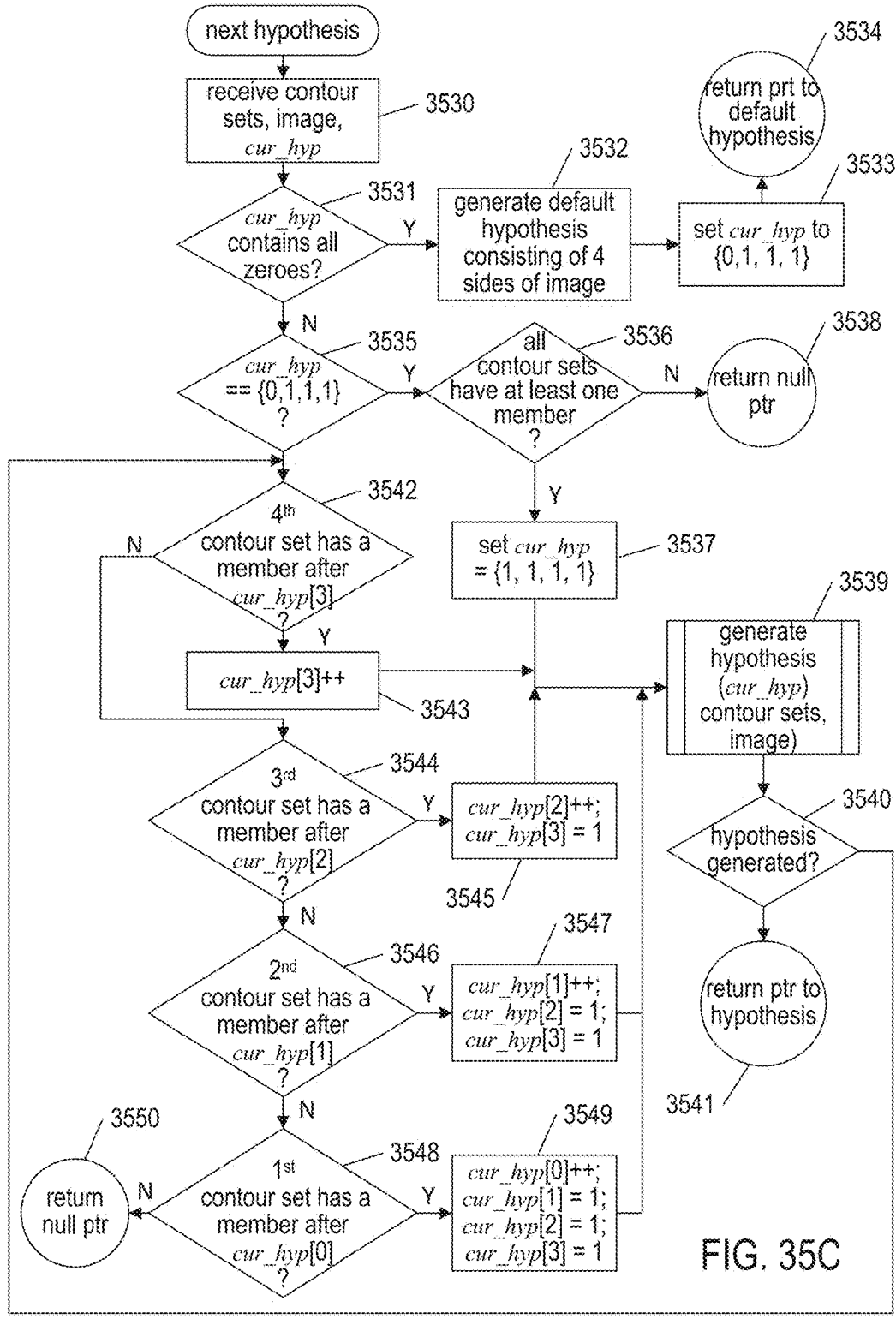
FIG. 35C provides control-flow diagrams that illustrate one implementation of the document-identification method and system to which the current document is directed.

FIG. 35C provides a control-flow diagram for the routine "next hypothesis," called in step 3519 of FIG. 35B. In step 3530, the routine "next hypothesis" receives the four contour sets, the original image, and the array variable cur_hyp. When cur_hyp contains all zeroes, as determined in step 3531, the routine "next hypothesis" generates a default hypothesis consisting of the four sides of the original image, in step 3532. Then, the array variable cur_hyp is set to the value {0,1,1,1}, in step 3533 and a pointer to the default hypothesis is returned in step 3534. The default hypothesis assumes that the entire received digital image constitutes an image of a document. When the array variable cur_hyp does not contain all zeroes, as determined in step 3531, then, when the array variable cur_hyp contains the values {0,1, 1,1}, as determined in step 3535, and when all of the contour sets have at least one member, or contour, as determined in step 3536, the array variable cur_hyp is set to the values {1,1,1,1}, in step 3537 to initiate generation of all possible hypotheses from the members of the four contour sets. Otherwise, a null pointer is returned in step 3538. When the combinatorial hypothesis generation ensues, with the values stored in cur_hyp equal to {1,1,1,1}, the routine "generate hypothesis" is called, in step 3539, to generate a hypothesis based on the current values in the array variable cur_hyp. These four values indicate the identities of the contours to select from each of the four contour sets in order to generate the next hypothesis. Because the contour sets are sorted, the initially generated hypothesizes may be most likely to represent the edges of a document, and generation of hypotheses may be short-circuited, in certain implementations, when initial hypothesizes of sufficient quality are generated. When the routine "generate hypothesis" successfully generates a hypothesis based on the values in the array cur_hyp, as determined in step 3540, a pointer to the hypothesis is returned in step 3541. Otherwise, control flows to step 3542, the first step in a series of conditional steps used to set the values stored in the array cur_hyp to designate contours for a next hypothesis. When the fourth contour set has a contour member following the member designated by the current value of the fourth element in the array cur_hyp, as determined in step 3542, then the fourth element in the array cur_hyp is incremented, in step 3543 and the routine "generate hypothesis" is called, instep 3539. Otherwise, when the third contour set has a member following the member designated by the third value in the array cur_hyp, as determined in step 3544, the value stored in the third element of the array cur_hyp is incremented and the fourth value of the array cur_hyp is set to 1, in step 3545, following which the routine "generate hypothesis" is called in step 3539. Otherwise, when the value stored in the second contour set has a member following the member identified by the current value of the second element of the array cur_hyp, as determined in step 3546, the second element of the array cur_hyp is incremented and the third and fourth elements of the array cur_hyp are set to 1, in step 3547, followed by a call to the routine "generate hypothesis" in step 3539. Otherwise, when the first contour set has a member following the member identified by the current value of the first element of the array cur_hyp, as determined in step 3548, then, in step 3549, the first value stored in the array cur_hyp is incremented and the remaining values are set to 1 prior to a call to the routine "generate hypothesis," in step 3539. Otherwise, there are no further candidate hypotheses, and a null pointer is returned in step 3550.

Figure 35D:
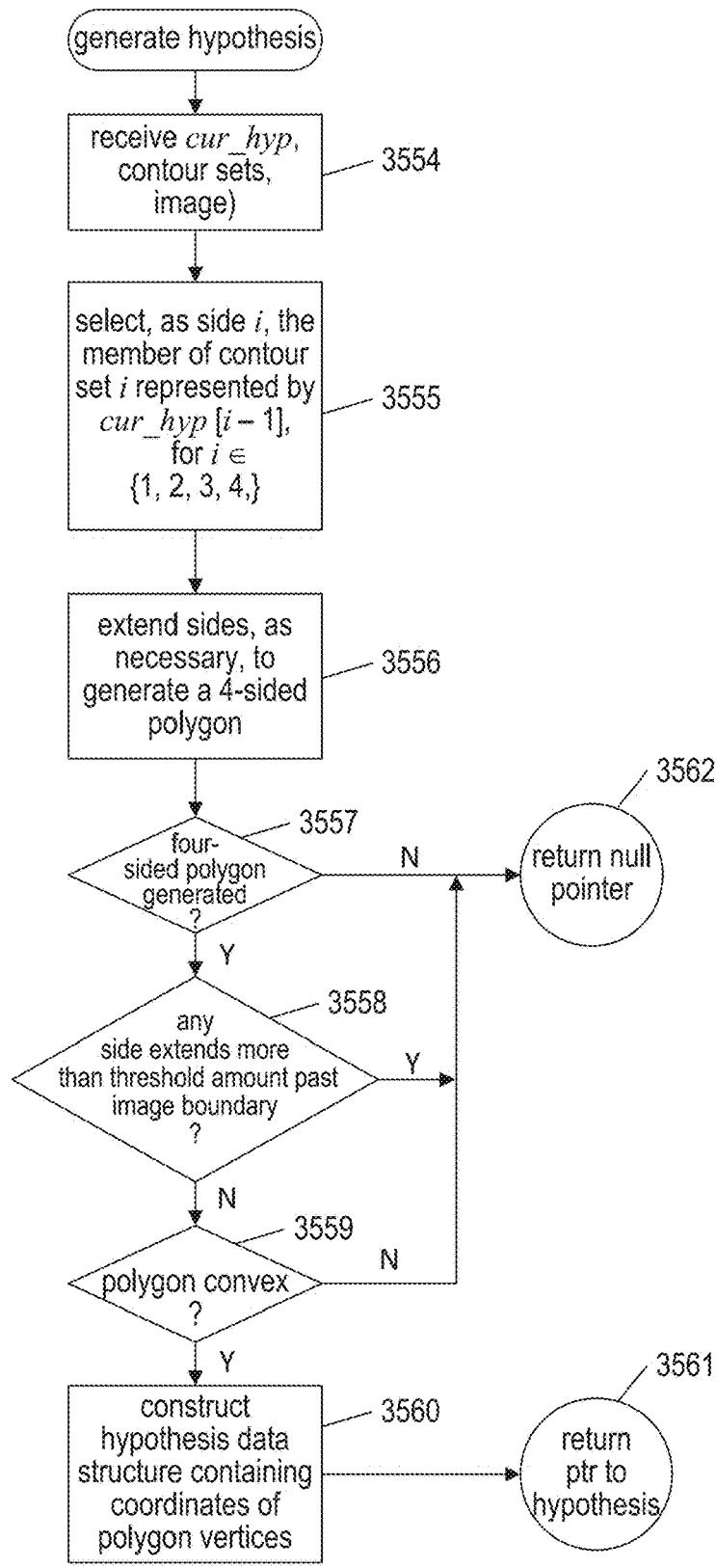
FIG. 35D provides control-flow diagrams that illustrate one implementation of the document-identification method and system to which the current document is directed.

FIG. 35D provides a control-flow diagram for the routine "generate hypothesis," called in step 3539 in FIG. 35C. In step 3554, the routine "generate hypothesis" receives the array variable cur_hyp, the four contour sets, and the original digital image. In step 3555, the values in the elements of the array cur_hyp are used to select corresponding contours from the four contour sets, as discussed above with reference to FIG. 31. Then, in step 3556, the sides are extended, as necessary, to generate a four-sided polygon, as also discussed above with reference to FIG. 31. Side extension may be carried out by determining a best-fitting line segment to correspond to a curved contour and extending that line segment or by extending one or both ends of a linear contour. When a four-sided polygon is successfully generated by steps 3555 and 3556, as determined in step 3557, then, in step 3558, the routine determines whether the four-sided polygon extends more than a threshold distance past the boundaries of the original image, as discussed above with reference to FIG. 32. When the four-sided polygon does not extend more than a threshold distance past the boundaries of the original image, and when the four-sided polygon is convex, as determined in step 3559, a hypothesis data structure is constructed to contain the coordinates of the vertices of the polygon, in step 3560 and the pointer to the hypothesis is returned in step 3561. Of course, in many implementations, an empty hypothesis data structure may be passed into the routine "generate hypothesis" for storing coordinates of new vertices corresponding to the currently generated hypothesis, with a Boolean return value indicating whether or not a hypothesis was constructed. When a four-sided polygon cannot be generated, when the polygon extends past threshold distances over the boundaries of the digital image, or when the generated polygon is not complex, a null pointer is returned, in step 3562.

Figure 35E:
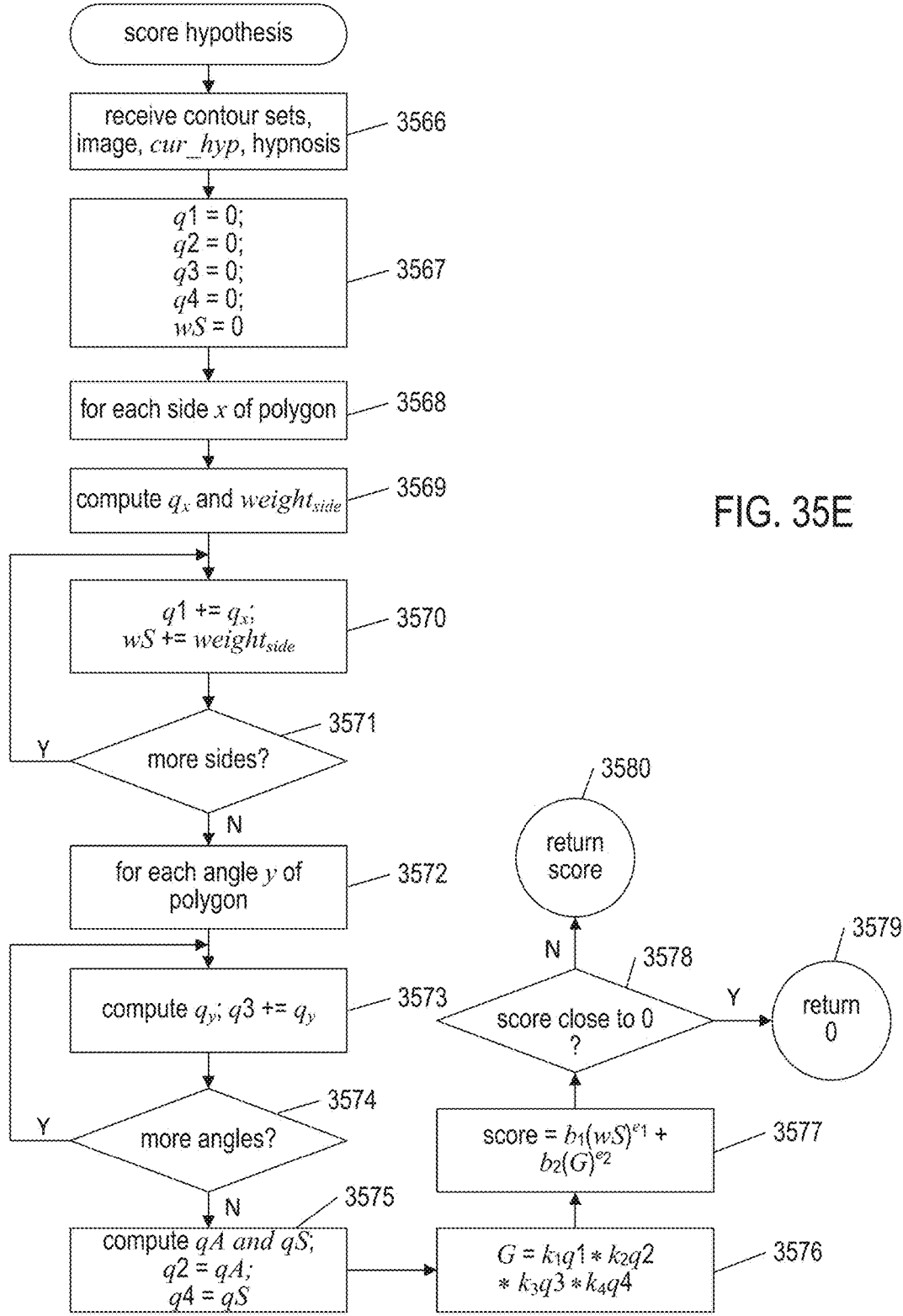
FIG. 35E provides control-flow diagrams that illustrate one implementation of the document-identification method and system to which the current document is directed.

FIG. 35E provides a control-flow diagram for the routine "score hypothesis," called in step 3521 of FIG. 35B. In step 3566, the routine "score hypothesis" receives the four contour sets, the original digital image, the array cur_hyp, and a reference to a hypothesis data structure. In step 3567, the routine "score hypothesis" sets the four local variables q1, q2, q3, and q4 to 0, along with the local variable wS. In the for-loop of steps 3568-3571, the routine "score hypothesis" considers each side of the hypothesis polygon, for each side computing the value for the side-quality metric $q_x$, discussed above with reference to FIG. 32, as well as the weight for the side, discussed above with reference to FIGS. 33-34. In step 3570, the computed side-quality metric is added to local variable q1 and the computed side weight is added to local variable wS. In the for-loop of steps 3572-3574, an angle-quality metric is computed for each angle of the polygon and added to local variable q3. The angle-quality metric is discussed above with reference to FIG. 32. In step 3575, the area-quality and quality of side correspondence metrics qA and qS are computed and added to local variables q2 and q4, respectively. The area-quality metric and quality of side correspondence metric are discussed above with reference to FIG. 32. In step 3576, the value G is set to the weighted sum of the values of the four local variables q1, q2, q3, and q4. Then, in step 3577, a hypothesis score is computed as the weighted sums of local variables wS and G, the value stored in the local variables G and wS potentially raised to an integral or fractional power $e_1$ and $e_2$. When the computed score is close to zero, or within a threshold distance of zero, as determined in step 3578, the value zero is returned in step 3579. Otherwise, the computed score is returned in step 3580.

Although the present invention has been described in terms of particular embodiments, it is not intended that the invention be limited to these embodiments. Modifications within the spirit of the invention will be apparent to those skilled in the art. For example, any of many different design and implementation parameters, including modular organization, programming language, hardware platform, control structures, data structures, and other such design and implementation parameters, may be varied to provide a variety of different implementations of the disclosed methods and systems.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An image-processing subsystem to identify a document sub-image within a digital image, the image-processing subsystem comprising:
a memory; and
a processor, operatively coupled to the memory, being configured to:
receive the digital image;
identify contours corresponding to intensity edges within the digital image;
generate four contour sets that each includes either predominantly vertically oriented or predominantly horizontally oriented contours selected from the identified contours, wherein to generate the four contour sets, the processor is to partition the identified contours into a first set of predominantly vertically oriented contours and a second set of predominantly horizontally oriented contours, select contours from the first set of predominantly vertically oriented contours to add to right and left contour sets, and select contours from the second set of predominantly horizontally oriented contours to add to upper and lower contour sets;
generate hypotheses, each comprising data that describes a four-sided polygon positioned and oriented with respect to the received digital image, by combining contours selected from each of the right, left, upper, and lower contour sets from the four contour sets;
score the generated hypotheses;
select a hypothesis among the generated hypotheses based on the generated scores; and
store the selected hypothesis in memory as an indication of boundaries of the document sub-image.

2. The image-processing subsystem of claim 1 wherein the image-processing subsystem identifies contours corresponding to intensity edges within the digital image by:
employing multiple parameter values that control contour identification; and identifying contours by identifying seed pixels within the digital image coincident with intensity edges, and for each of multiple seed pixels, constructing an incipient contour that includes the seed pixel, and iteratively extending both ends of the incipient contour along an intensity edge to generate an identified contour.

3. The image-processing subsystem of claim 1, wherein selecting contours from the first set of predominantly vertically oriented contours to add to the right contours set further comprises selecting those contours that he within a right-hand region of the received digital image having a width greater than half the width of the received digital image, a right-hand border of the right-hand region coincident with a right-hand border of the received digital image; and wherein selecting contours from the first set of predominantly vertically oriented contours to add to the left contours set further comprises selecting those contours that he within a left-hand region of the received digital image having a width greater than half the width of the digital image, a left-hand border of the left-hand region coincident with a left-hand border of the received digital image.

4. The image-processing subsystem of claim 1, wherein selecting contours from the second set of predominantly horizontally oriented contours to add to the upper contours set further comprises selecting those contours that are within an upper-hand region of the received digital image with a height greater than half the height of the digital image, a top border of the upper-hand region coincident with a top border of the received digital image; and wherein selecting contours from the second set of predominantly horizontally oriented contours to add to the lower contours set further comprises selecting those contours that are within a lower region of the received digital image with a height greater than half the height of the digital image, a bottom border of the upper-hand region coincident with a bottom border of the received digital image.

5. The image-processing subsystem of claim 1, wherein, following generation of the four contour sets that each includes either predominantly vertically oriented or predominantly horizontally oriented contours selected from the identified contours, the image-processing subsystem:

filters each of the right, left, upper, and lower contour sets from the four contour sets, using a filtering criteria, to remove contours so that each contour set contains no more than a threshold number of contours.

6. The image-processing subsystem of claim 5, wherein the filtering criteria include at least one or more of:

contour length;

extent of contour curvature; or number of pixels overlain by contour in the received digital image.

7. The image-processing subsystem of claim 5, wherein, following filtering, each contour set is sorted by one of length and a number of pixels overlain by contour in the received digital image.

8. The image-processing subsystem of claim 1, wherein the image-processing subsystem generates hypotheses by:

iteratively generating a next combination of four contours selected from the four contour sets;

attempting to use the four contours of the generated combination to generate a four-sided polygon; and when a four-sided polygon is successfully generated, when the four-sided polygon is convex, and when no vertex of the four-sided polygon lies outside a rectangle representing an extended received-digital-image boundary, encoding the four-sided polygon in a hypothesis data structure for scoring until no additional combinations of four contours selected from the four contour sets can be generated.

9. The image-processing subsystem of claim 8, wherein the image processing subsystem attempts to use the four contours of the generated combination to generate a four-sided polygon by extending one or more line segments fitted to one or more of the contours.

10. The image-processing subsystem of claim 1, wherein the image-processing subsystem uses an encoding of a four-sided polygon that corresponds to a generated hypothesis to score the generated hypothesis by:

for each four-sided-polygon side, computing a side-quality metric and a side weight; for each four-sided-polygon angle, computing an angle-quality metric; computing a four-sided-polygon area-quality metric;

when a ratio of width to height for a document corresponding to the document sub-image is known, computing a side-correspondence quality metric; and combining the side-quality metrics, side weights, area-quality metric, and correspondence quality metric to generate a numerical score for the generated hypothesis.

11. The image-processing subsystem of claim 10, wherein the value assigned to a side-quality metric increases with an increase of the ratio of the length of the side to the length of a corresponding edge of the received digital image;

wherein the value assigned to an angle-quality metric increases as the angle nears 90°;

wherein the value assigned to the area-quality metric increases as the ratio of the area of the four-sided polygon to the area of the received digital image increases; and wherein the side-correspondence quality metric increases as the width-to-height ratio of a rectangle corresponding to the four-sided polygon approaches the known ratio of width to height for the document corresponding to the document sub-image.

12. The image-processing subsystem of claim 10, wherein the weight computed for a side is related to the difference between a sum of pixel weights of pixels of a contour corresponding to the side and a sum of pixel weights associated with pixels associated with the side that are not associated with the contour; and a ratio of the number of pixels of the contour corresponding to the side to the number of pixels associated with the side.

13. The image-processing subsystem of claim 12, wherein a pixel weight is computed from the projection of an intensity gradient associated with the pixel and a vector perpendicular to the side.

14. A method that identifies a document sub-image within a digital image, the method comprising:

receiving the digital image;

identifying contours corresponding to intensity edges within the digital image;

generating four contour sets that each includes either predominantly vertically oriented or predominantly horizontally oriented contours selected from the identified contours by partitioning the identified contours into a first set of predominantly vertically oriented contours and a second set of predominantly horizontally oriented contours, selecting contours from the first set of predominantly vertically oriented contours to add to right and left contour sets, and selecting contours from the second set of predominantly horizontally oriented contours to add to upper and lower contour sets;

generating hypotheses, each comprising data that describes a four-sided polygon positioned and oriented with respect to the received digital image, by combining contours selected from each of the right, left, upper, and lower contour sets from the four contour sets;

scoring the generated hypotheses;

selecting a hypothesis among the generated hypotheses based on the generated scores; and storing the selected hypothesis in memory as an indication of boundaries of a document sub-image within the received digital image.

15. The method of claim 14, wherein identifying contours corresponding to intensity edges within the digital image further comprises:

employing multiple parameter values that control contour identification; and identifying contours by identifying seed pixels within the digital image coincident with intensity edges, and for each of multiple seed pixels, constructing an incipient contour that includes the seed pixel, and iteratively extending both ends of the incipient contour along an intensity edge to generate an identified contour.

16. The method of claim 14, wherein generating hypotheses further comprises:

iteratively generating a next combination of four contours selected from the four contour sets;

attempting to use the four contours of the generated combination to generate a four-sided polygon; and when a four-sided polygon is successfully generated, when the four-sided polygon is convex, and when no vertex of the four-sided polygon lies outside a rectangle representing an extended received-digital-image boundary, encoding the four-sided polygon in a hypothesis data structure for scoring until no additional combinations of four contours selected from the four contour sets can be generated.

17. The method of claim 16, wherein attempting to use the four contours of the generated combination to generate a four-sided polygon further includes extending one or more line segments fitted to one or more of the contours.

18. The method of claim 14, further including using an encoding of a four-sided polygon that corresponds to a generated hypothesis to score the generated hypothesis by:

for each four-sided-polygon side, computing a side-quality metric and a side weight;

for each four-sided-polygon angle, computing an angle-quality metric; computing a four-sided-polygon area-quality metric;

when a ratio of width to height for a document is known, computing a side-correspondence quality metric; and combining the side-quality metrics, side weights, area-quality metric, and—correspondence quality metric to generate a numerical score for the generated hypothesis.

19. A non-transitory computer-readable medium for identifying a document sub-image within a digital image, the non-transitory computer-readable medium having recorded thereon instructions that when executed by one or more computer processors, perform operations comprising:

receiving the digital image;

identifying contours corresponding to intensity edges within the digital image;

generating four contour sets that each includes either predominantly vertically oriented or predominantly horizontally oriented contours selected from the identified contours by partitioning the identified contours into a first set of predominantly vertically oriented contours and a second set of predominantly horizontally oriented contours, selecting contours from the first set of predominantly vertically oriented contours to add to right and left contour sets, and selecting contours from the second set of predominantly horizontally oriented contours to add to upper and lower contour sets;

generating hypotheses, each comprising data that describes a four-sided polygon positioned and oriented with respect to the received digital image, by combining contours selected from each of the right, left, upper, and lower contour sets from the four contour sets;

scoring the generated hypotheses;

selecting a hypothesis among the generated hypotheses based on the generated scores; and storing the selected hypothesis in memory as an indication of boundaries of the document sub-image.

* * * * *